US012577824B2

(12) United States Patent
Hall et al.

(10) Patent No.: US 12,577,824 B2
(45) Date of Patent: *Mar. 17, 2026

(54) AUTOMATED WINDOW MECHANISM WITH COUNTER FORCE

(71) Applicant: D&D-SW, LLC, Temecula, CA (US)

(72) Inventors: David R. Hall, Provo, UT (US); Jerome Miles, Spanish Fork, UT (US); Mark Madsen, Provo, UT (US); Christopher Jones, Spanish Fork, UT (US)

(73) Assignee: D&D-SW, LLC, Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/192,139

(22) Filed: Apr. 28, 2025

(65) Prior Publication Data

US 2025/0257603 A1 Aug. 14, 2025

Related U.S. Application Data

(63) Continuation-in-part of application No. 17/686,386, filed on Mar. 3, 2022, and a continuation of application No. 17/686,384, filed on Mar. 3, 2022, now Pat. No. 12,286,828.

(60) Provisional application No. 63/156,347, filed on Mar. 3, 2021, provisional application No. 63/156,322, filed on Mar. 3, 2021.

(51) Int. Cl.
*E05F 15/00* (2015.01)
*E05F 15/665* (2015.01)

(52) U.S. Cl.
CPC ......... *E05F 15/665* (2015.01); *E05Y 2201/21* (2013.01); *E05Y 2201/246* (2013.01);
(Continued)

(58) Field of Classification Search
CPC .... E05F 15/00; E05F 15/665; E05Y 2201/21; E05Y 2201/246; E05Y 2201/434; E05Y 2201/716; E05Y 2201/722; E05Y 2400/32; E05Y 2400/322; E05Y 2400/40; E05Y 2400/44; E05Y 2400/52; E05Y 2400/61; E05Y 2400/612; E05Y 2800/10;
(Continued)

(56) References Cited

U.S. PATENT DOCUMENTS 6,581,332 B1 6/2003 Kim
10,221,615 B2 * 3/2019 Meyerink ............... E06B 7/096
(Continued)

*Primary Examiner* — Chi Q Nguyen
(74) *Attorney, Agent, or Firm* — Knobbe, Martens, Olson & Bear, LLP

(57) ABSTRACT

An automated window mechanism has an electric motor attached to a sliding panel of a window configured to open and close the window by moving the sliding panel. The electric motor has a locked state in which the electric motor and sliding panel are stationary. The automated window mechanism also includes a monitor configured to detect an external force applied to the sliding panel while the electric motor is in the locked state. In response to the monitor detecting the external force while the electric motor is in the locked state, the positive lead and the negative lead are grounded, rendering the electric motor an electric brake, or the electric motor opposes the external force to prevent unwanted movement of the sliding panel. A method and system for preventing unwanted movement of an automated window are also disclosed.

23 Claims, 35 Drawing Sheets

(52) U.S. Cl.
CPC ... *E05Y 2201/434* (2013.01); *E05Y 2201/716* (2013.01); *E05Y 2201/722* (2013.01); *E05Y 2400/32* (2013.01); *E05Y 2400/40* (2013.01); *E05Y 2400/44* (2013.01); *E05Y 2400/52* (2013.01); *E05Y 2400/612* (2013.01); *E05Y 2800/10* (2013.01); *E05Y 2800/70* (2013.01); *E05Y 2900/148* (2013.01)

(58) Field of Classification Search
CPC ............. E05Y 2800/70; E05Y 2900/00; E05Y 2900/148; Y05Y 2201/00
See application file for complete search history.

(56) References Cited

U.S. PATENT DOCUMENTS

| | | | | |
|---|---|---|---|---|
| 10,407,977 | B2 * | 9/2019 | Fraser | E05F 15/619 |
| 10,612,301 | B2 * | 4/2020 | Derk, Jr. | E06B 9/88 |
| 10,876,343 | B2 * | 12/2020 | Erickson | E05F 11/10 |
| 11,002,057 | B1 * | 5/2021 | Micinski | E05F 15/622 |
| 11,015,385 | B2 * | 5/2021 | Fraser | E05F 15/619 |
| 11,591,840 | B1 * | 2/2023 | Plummer | E05F 15/63 |
| 11,686,146 | B2 * | 6/2023 | Hall | E05F 15/71<br>49/362 |
| 11,788,348 | B2 * | 10/2023 | Blair | E06B 9/42<br>160/10 |
| 12,286,828 | B2 * | 4/2025 | Hall | E05F 15/665 |
| 2012/0191305 | A1 * | 7/2012 | Ersek | H02H 7/0851<br>701/49 |
| 2015/0240560 | A1 * | 8/2015 | Blair | E06B 9/262<br>160/310 |
| 2016/0376826 | A1 | 12/2016 | Wu | |
| 2016/0376834 | A1 * | 12/2016 | Meyerink | E06B 9/02<br>49/82.1 |
| 2020/0024898 | A1 | 1/2020 | Eichstetter | |
| 2020/0031207 | A1 | 1/2020 | Henes | |
| 2022/0149757 | A1 | 5/2022 | Krushel et al. | |
| 2022/0154518 | A1 | 5/2022 | Bayley et al. | |
| 2022/0381078 | A1 | 12/2022 | Hall et al. | |
| 2023/0287727 | A1 * | 9/2023 | Campbell | E05F 15/71 |

* cited by examiner

AUTOMATED WINDOW MECHANISM WITH COUNTER FORCE

CROSS-REFERENCE TO RELATED PATENT APPLICATIONS

Any and all applications for which a foreign or domestic priority claim is identified in the Application Data Sheet as filed with the present application are incorporated by reference and made a part of this specification.

TECHNICAL FIELD

This invention relates to automated window openers and mechanisms.

BACKGROUND

Many improvements and developments have been made in the field of Smart Home devices. However, many devices, especially existing devices in a residence or business (such as sliding windows and window openings, for example), simply were not designed or configured to be smart.

Traditionally, windows are opened and closed manually for ventilation, energy or security or safety needs. For example, a window may be closed and locked while the owners are away from home to protect the home from entry by an intruder. A window may be opened in order to vent noxious gases from the interior of the home to the outside. When the inside of the house is hot, a window may be opened to allow cooler outside air to enter the house.

In order to enable these traditional functions to be carried out in an automated smart system, motorized devices are needed to open and close the windows.

Automatic opening and closing of sliding windows generally may require planning ahead along with using frames that are designed specifically for automatic sliding windows. However, when automation of an existing installation is desired, a complete replacement of the existing frame is costly and requires more construction skill than the typical homeowner possesses.

Therefore, a retrofit mechanism is needed to allow a simple installation of a system that provides motorized control of an existing sliding window, allowing a controller to open and close the window. A mechanism that is retrofittably attached to an existing window would be cost effective and require minimal construction skill.

SUMMARY

Embodiments of the present disclosure are directed to an automated window mechanism having an electric motor attached to a sliding panel of a window configured to open and close the window by moving the sliding panel. The electric motor has a locked state in which the electric motor and sliding panel are stationary. The automated window mechanism also includes a monitor configured to observe an external force applied to the sliding panel while the electric motor is in the locked state. In response to the monitor identifying the external force while the electric motor is in the locked state the electric motor grounds the positive lead and the negative lead to a same electric potential thereby rendering the electric motor an electric brake impeding the external force from moving the sliding panel.

Further embodiments of the present disclosure are directed to a method of preventing unwanted movement of a sliding panel of a window with an automated window mechanism having an electric motor with a positive lead and a negative lead. The method includes placing the automated window mechanism into a locked state in which the electric motor and sliding panel are stationary, and while the automated window mechanism is in the locked state, monitoring for an external force applied to the sliding panel. The method also includes grounding the positive lead and the negative lead of the electric motor to a same electric potential in response to the external force, thereby rendering the electric motor an impediment to the external force.

Further embodiments of the present disclosure are directed to a system including an automated window mechanism having an electric motor and being attached to a sliding panel of a window and being configured to open and close the sliding panel of the window. The electric motor has a positive lead and a negative lead. The automated window mechanism has a locked state in which the electric motor and sliding panel are stationary. The system also includes a monitor for an external force applied to the sliding panel while the automated window mechanism is in the locked state. The system also includes a processor and a memory storing computer-readable instructions that cause the processor to enable the automated window mechanism to, in response to the external force, ground the positive lead and negative lead to the same electric potential, thereby impeding the external force from moving the sliding panel.

Embodiments of the present disclosure are directed to an automated window mechanism including an electric motor attached to a sliding panel of a window configured to open and close the window by moving the sliding panel. The electric motor has a locked state in which the electric motor and sliding panel are stationary. The mechanism also includes a monitor configured to detect an external force applied to the sliding panel and a direction of the external force while the electric motor is in the locked state. In response to the monitor identifying the external force while the electric motor is in the locked state the electric motor applies a counter force in a direction opposite the external force to counteract the external force.

Other embodiments of the present disclosure are directed to a method of preventing unwanted movement of a sliding panel of a window with an automated window mechanism having an electric motor. The method includes placing the automated window mechanism into a locked state in which the electric motor and sliding panel are stationary. While the automated window mechanism is in the locked state, monitoring for an external force applied to the sliding panel. The method also includes, in response to the external force, opposing the external force by applying power to the electric motor.

Further embodiments of the present disclosure are directed to a system including an automated window mechanism having an electric motor and being attached to a sliding panel of a window and being configured to open and close the sliding panel of the window, the automated window mechanism having a locked state in which the electric motor and sliding panel are stationary. The system also includes a monitor for an external force applied to the sliding panel while the automated window mechanism is in the locked state. The system also includes a processor and a memory storing computer-readable instructions that cause the processor to, in response to the external force, apply a counter force to the sliding panel to oppose the external force.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

Figure 1A:
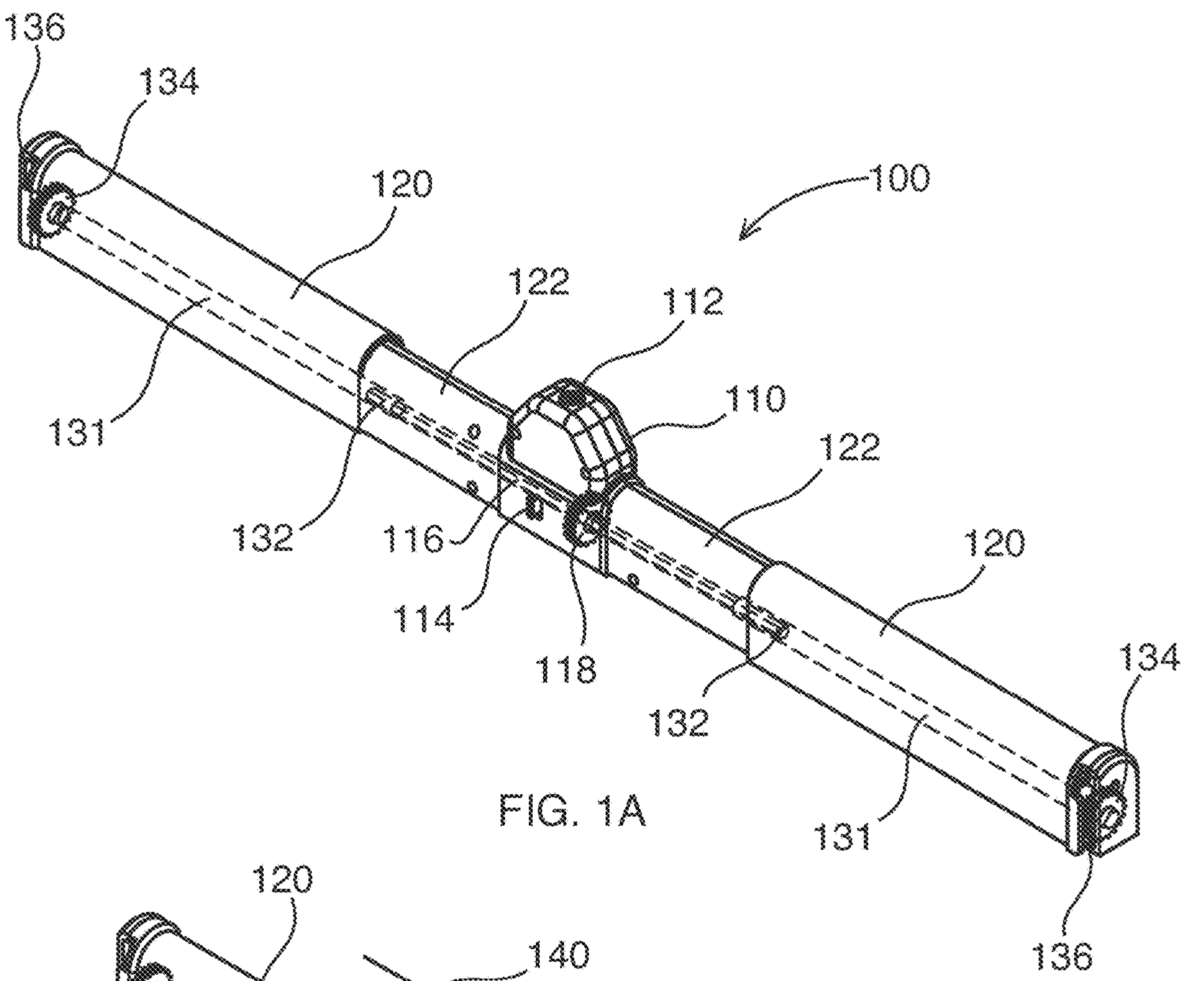
FIG. 1A is an isometric view of an automated window mechanism with telescoping arms extended.

FIG. 1A is an isometric view of an automated window mechanism 100 with telescoping arms 120 extended. Mounting assembly 110 is shown with telescoping arms 120 that slide on stationary arm extensions 122 that are extended out from the main body of the mounting assembly 110. Actuator assembly 112 is located at the center of the mechanism in this embodiment, and both telescoping arms 120 extend out from the actuator assembly 112 as shown. An actuator inside the actuator assembly 112 rotates main gear 118 that is attached to a first section 116 of the drive shaft 132. Each end of the drive shaft 132 slide in to an end of a telescoping drive shaft 131 as shown. Each of the two telescoping drive shafts 131 extend out to interface gears 134 at one end of each drive shaft as shown. Each one end is extended out with the telescoping arms 120 to fit a window opening as required. The gear teeth of interface gear 134 engage with the rack teeth (not shown) that are adhesively attached to the window frame. The shape of the cross section of the drive shaft 132 may be an octagon, hexagon or some other shape that matches and mates with the cross section of the telescoping drive shaft 131, allowing the telescoping drive shaft to slide out to extend to the window frame as required. The unique shape prevents the drive shaft 132 from rotating inside of the telescoping drive shaft 131. In this way, as the main gear rotates it transfers that rotational force to the interface gears 134.

In alternative embodiments, the telescoping drive shaft fits within the drive shaft. In still other embodiments the drive shaft and the telescoping drive shaft are not configured to rest one within the other, but instead a configured so as to mate and be connected side by side.

The mounting assembly 110 has slot openings 136 on the end of the telescoping arms 120 as shown to allow the teeth of the interface gears 134 to mesh with rack teeth. The mounting assembly 110 may also have a latching device that mates to a latching receiver attached to the slidable window, wherein mating prevents movement of the slidable window. Gears within the gearbox may release the gearbox and actuator from the window mechanism so that a user may have full control of the window to slide it open or close it. This provides a way for a user to open the window in an emergency situation. The manual release 114 operates even when the power is off and allows the window to operate completely independently from the automated window mechanism. A user may engage or disengage the manual release 114 in order to have manual control of the window, enabling the user to have full control of the opening and closing mechanism of the window, thus overriding the control system and actuator in case of an emergency.

The components of the automated window mechanism 100 that convey power through drive shafts 132, telescoping arms 120, any gears, or any other mechanism can be collectively referred to as transmission components. The transmission components may vary in different embodiments and include some or all of the features disclosed herein and shown in the figures.

The latching receiver may also include a communication device that generates a signal when the latching device is mated and transmits that signal to the controller, which generates a control signal that deactivates the motor. The latching device may also have a release mechanism configured to automatically release a first gear from a first gear track, thereby allowing the slidable frame to be moved to an open position by the user, in response to an emergency condition as detected by at least one of the one or more sensors.

Figure 1B:
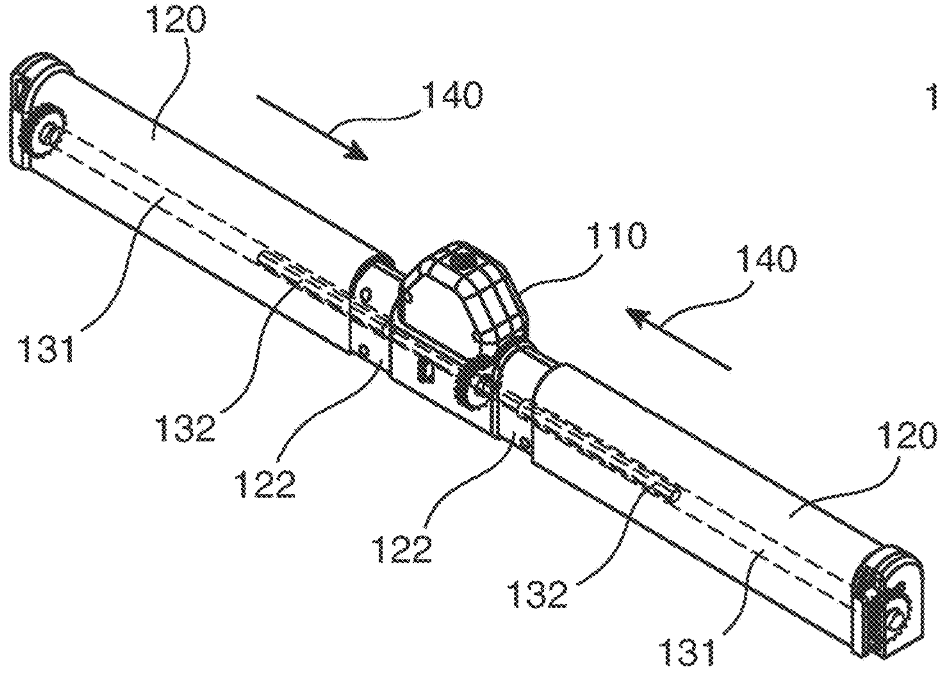
FIG. 1B is an isometric view of an automated window mechanism with telescoping arms not extended.

FIG. 1B is an isometric view of an automated window mechanism with telescoping arms not extended. The position of the telescoping arms 120 in this example embodiment are in a retracted 140 position. The telescoping arms are retracted 140 before the mounting assembly 110 is installed or retrofitted to an existing window assembly. In this example, each end of the drive shaft 132 is partially retracted inside of each of the telescoping drive shafts 131 as shown. The telescoping arms 120 are also slid in further, thus overlapping sections of the stationary arm extensions 122 as shown in this embodiment.

Figure 2A:
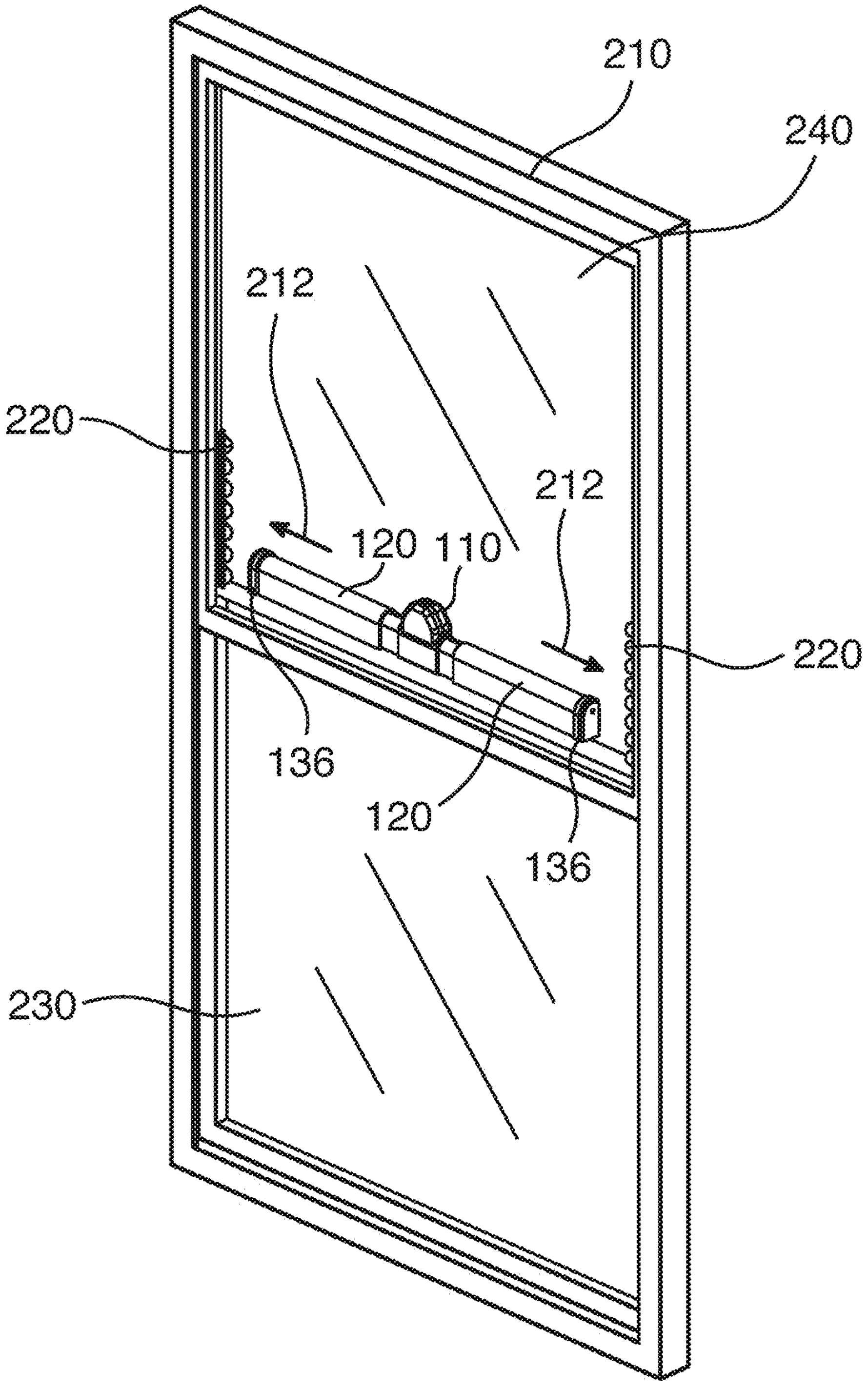
FIG. 2A is an isometric view of a window assembly with an automated window mechanism mounted to a window frame with telescoping arms not extended.

FIG. 2A is an isometric view of a window assembly with an automated window mechanism mounted to a window frame with telescoping arms 120 not extended. Window assembly 210 is shown with stationary window 240 and sliding window 230. Mounting assembly 110 is shown with telescoping arms 120 in a retracted position, prior to being fully installed or retrofitted to the window frame. In this embodiment, the mounting assembly 110 has already been attached to top of the frame of the sliding window 130 as shown. The telescoping arms are ready to be extended 212 out to fit the window opening. Racks 220 have already been adhesively attached to the frame of the window assembly 210 as shown. Each of the ends of the telescoping arms 120 align with the racks 220, allowing the interface gears to align with the rack teeth once the telescoping arms 120 have been fully extended to fit the window opening. Slot openings 136 are shown on the ends of the telescoping arms.

Figure 2B:
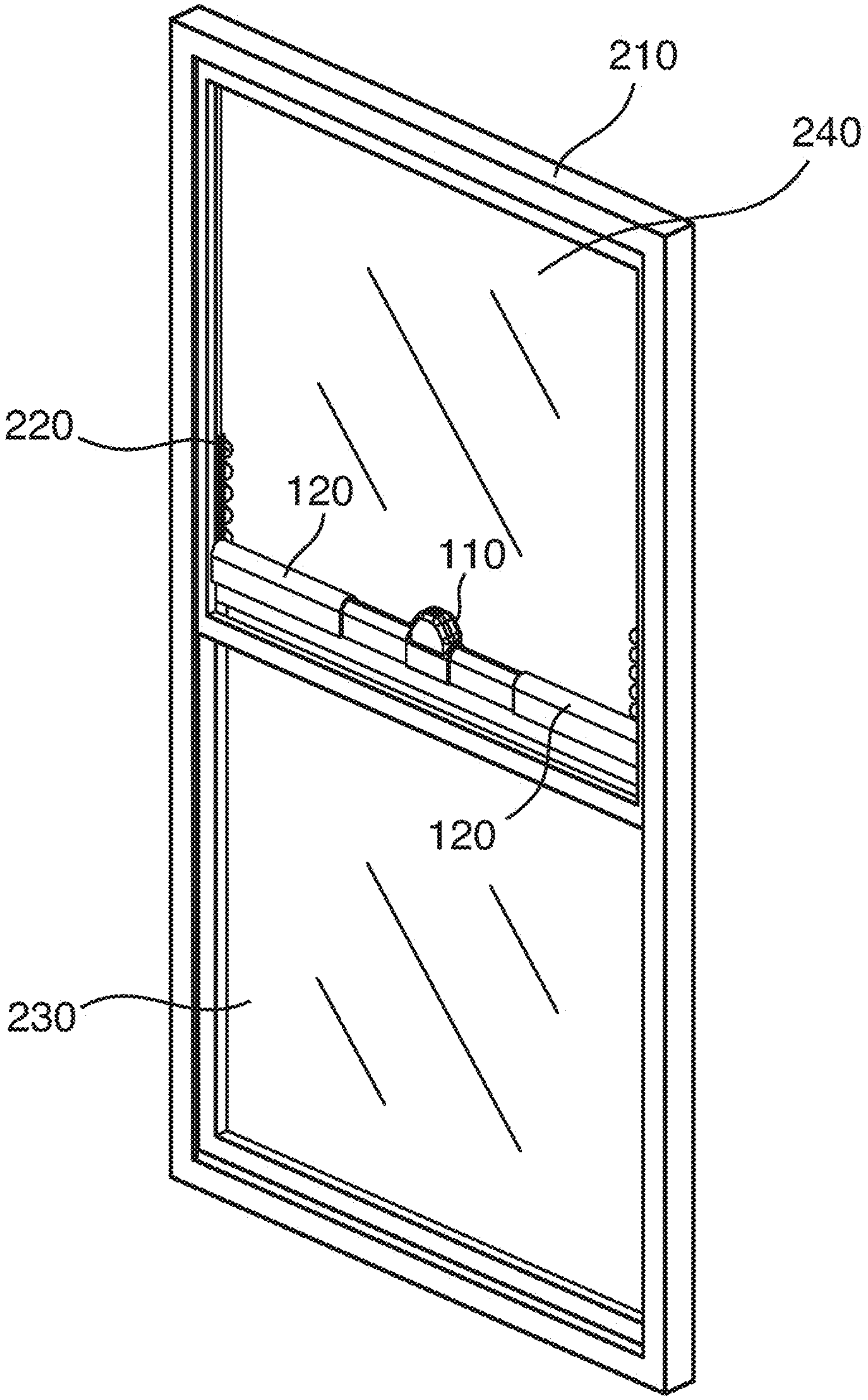
FIG. 2B is an isometric view of a window assembly with an automated window mechanism mounted to a window frame with telescoping arms fully extended.

FIG. 2B is an isometric view of a window assembly with an automated window mechanism mounted to a window frame with telescoping arms fully extended. In this embodiment, window assembly 210 is shown with stationary window 240 and sliding window 230. Mounting assembly 110 is shown with telescoping arms 120 in a fully extended position, having been fully installed or retrofitted to the window frame. In this embodiment, the telescoping arms 120 are extended out to fit the window opening. Each of the ends of the telescoping arms 120 have been fully extended to align with the racks 220, engaging the interface gears with the rack teeth. In this example, the system is now completely installed and ready to be controlled by a controller.

Figure 3A:
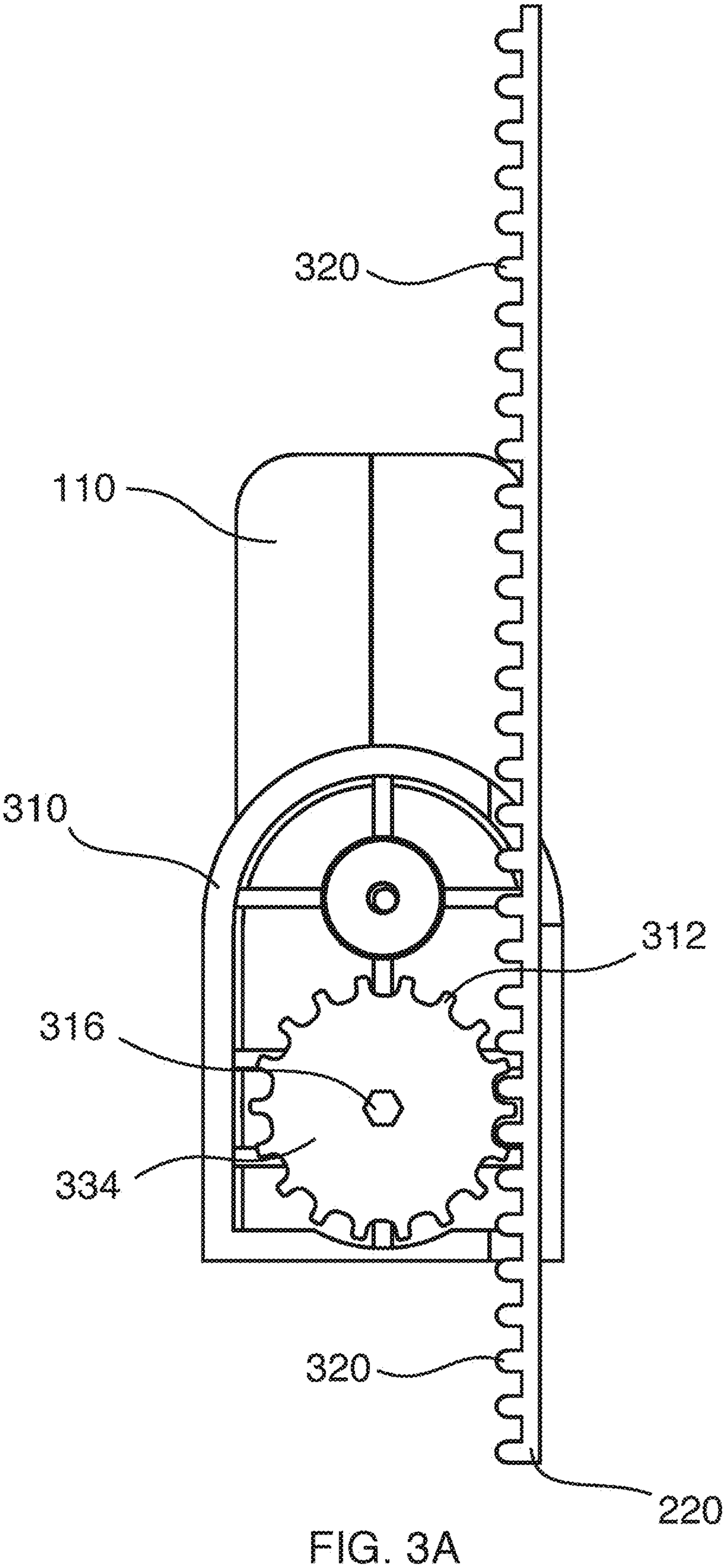
FIG. 3A is a side view of a gear on the end of a drive shaft engaging with a rack.

FIG. 3A is a side view of a gear on the end of a drive shaft engaging with a rack. Mounting assembly 110 is shown with gearbox 310. Rack 220 is shown, along with interface gear 134. Interface gear 134 is further shown with gear teeth 312 meshing with rack teeth 320. The end of the drive shaft is attached 316 to interface gear 314 as shown. In this embodiment, as the actuator rotates the drive shaft, interface gear 314 is rotated by the actuator and causes the mounting assembly to either up or down along the rack 220, thus opening or closing the sliding window the mounting assembly is attached to. In this example embodiment, rotating the interface gear 134 clockwise may open the window, and rotating the interface gear 134 counterclockwise may close the window.

Figure 3B:
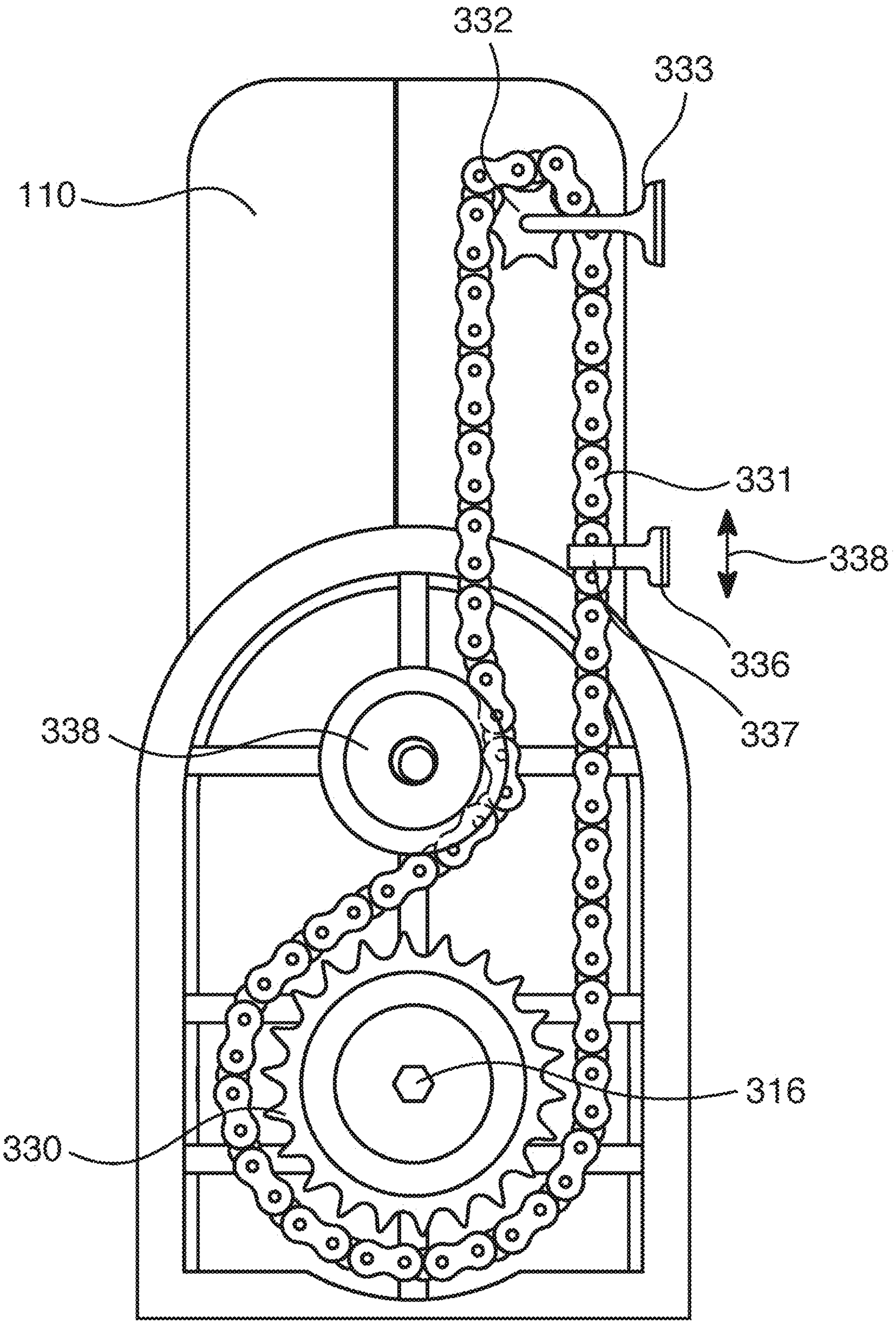
FIG. 3B is a side view of a gear on the end of a drive shaft engaging with a chain.

FIG. 3B is a side view of a gear on the end of a drive shaft engaging with a chain. Drive shaft 316 is attached to transfer gear 330. Transfer gear 330 engages with interface chain 331 and rotates chain 331 around gear 332 supported by bracket 333 which is attached to a frame component of the window assembly. Bracket 336 is attached 337 to the chain 331 as shown, and slides 338 the window open and closed as the drive shaft 316 rotates.

Figure 3C:
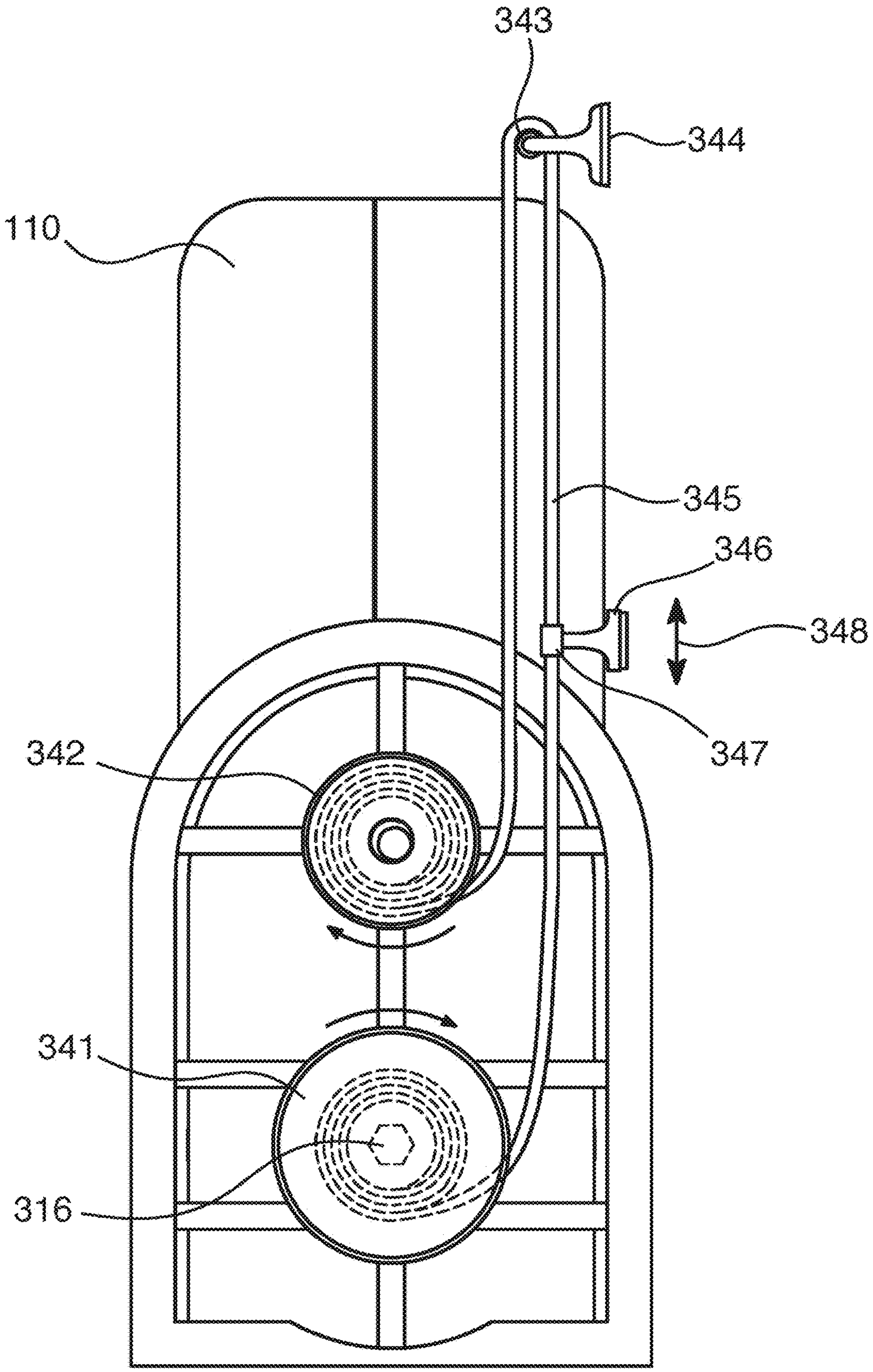
FIG. 3C is a side view of a gear on the end of a drive shaft engaging with a pulley belt.

FIG. 3C is a side view of a gear on the end of a drive shaft engaging with a pulley belt. Drive shaft 316 is attached to interface pulley 341. Interface pulley 341 engages with interface belt 345 and rotates belt 343 around pulley 343 supported by bracket 344 which is attached to a frame component of the window assembly. Bracket 346 is attached 347 to the belt 345 as shown, and slides 348 the window open and closed as the drive shaft 316 rotates.

Figure 3D:
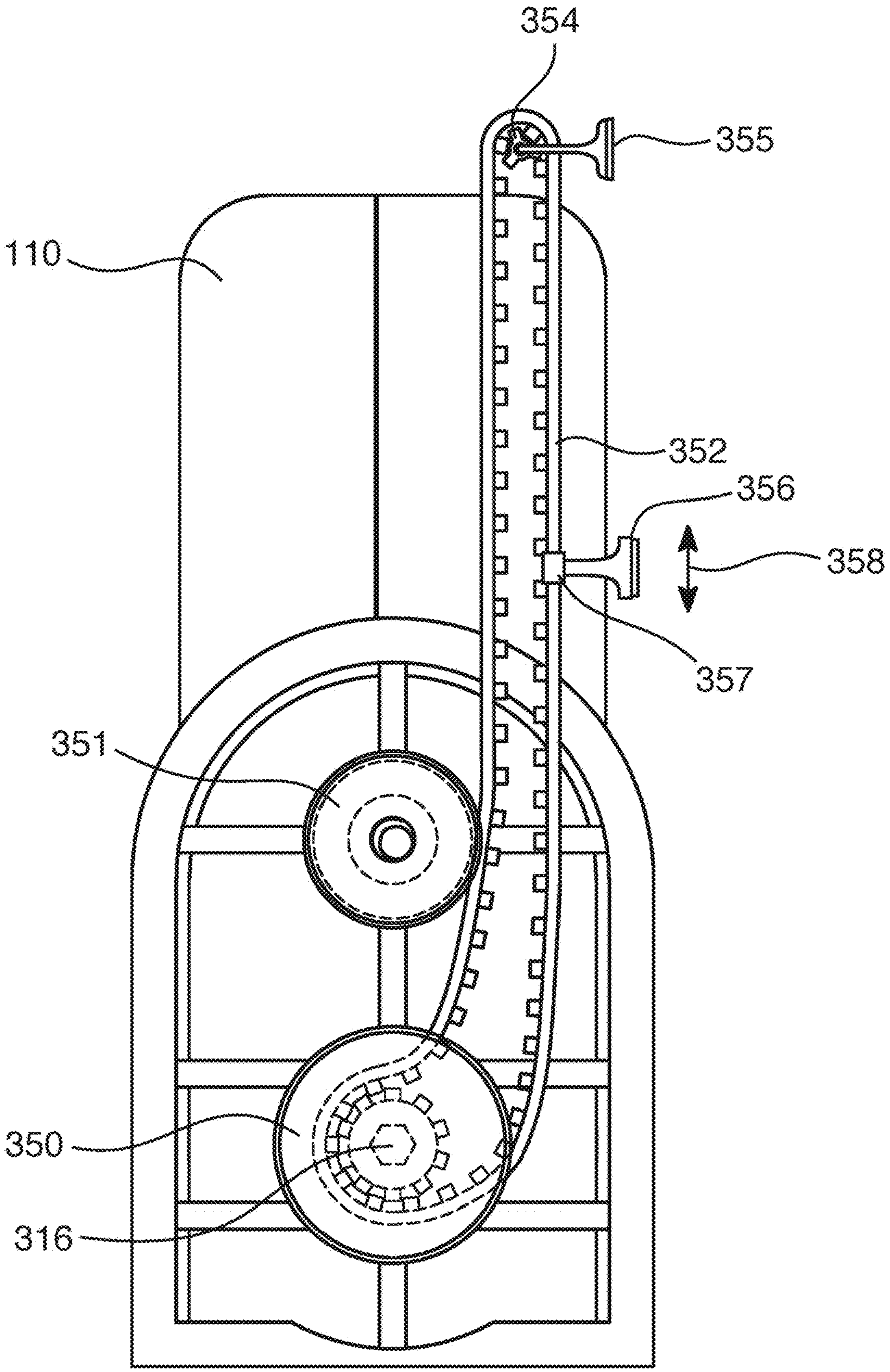
FIG. 3D is a side view of a gear on the end of a drive shaft engaging with a toothed belt.

FIG. 3D is a side view of a gear on the end of a drive shaft engaging with a toothed belt. Drive shaft 316 is attached to interface pulley 350. Interface pulley 350 engages with toothed belt 352 and rotates belt 352 around pulley 354 supported by bracket 355 which is attached to a frame component of the window assembly. Bracket 356 is attached 357 to the toothed belt 352 as shown, and slides 358 the window open and closed as the drive shaft 316 rotates.

Figure 3E:
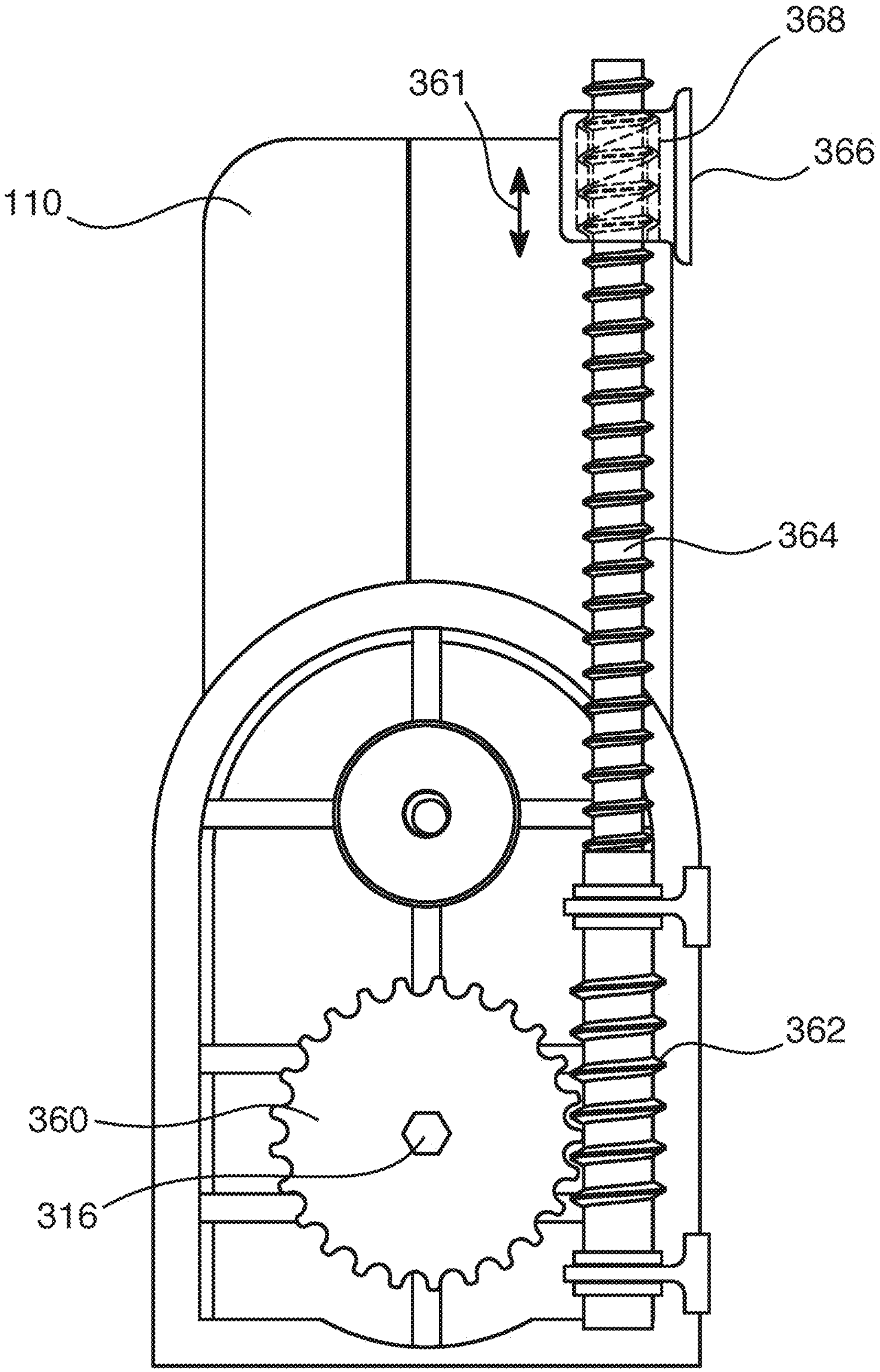
FIG. 3E is a side view of a helical gear on the end of a drive shaft engaging with a worm gear drive.

FIG. 3E is a side view of a helical gear on the end of a drive shaft engaging with a worm gear drive. Drive shaft 316 is attached to helical gear 360. Helical gear 360 engages with worm gear 362 and rotates threaded shaft 364. Threaded shaft 364 rotates inside threaded sleeve 368 of bracket 366. Bracket 366 is attached to the frame of the sliding window in this embodiment, and slides 361 the window open and closed as the drive shaft 316 rotates.

Figure 3F:
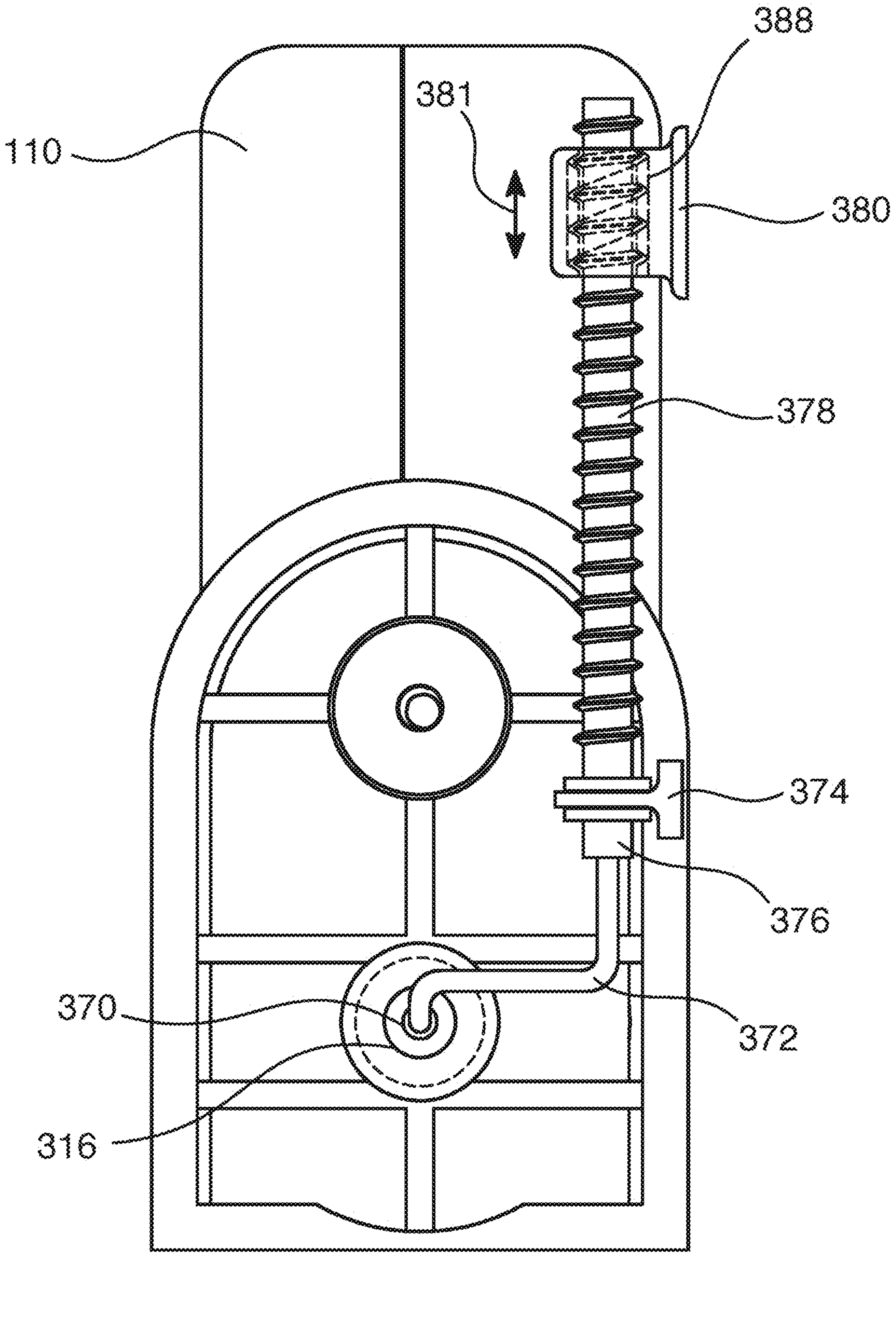
FIG. 3F is a side view of a gear on the end of a drive shaft engaging with a flexible drive shaft.

FIG. 3F is a side view of a gear on the end of a drive shaft engaging with a flexible drive shaft. Drive shaft 316 is attached 370 to flexible drive shaft 372. Flexible drive shaft 372 is attached 376 to threaded shaft 378. Threaded shaft 378 is supported by bracket 374, and rotates inside threaded sleeve 388 of bracket 380. Bracket 380 is attached to the frame of the sliding window in this embodiment, and slides 381 the window open and closed as the drive shaft 316 rotates.

Figure 4B:
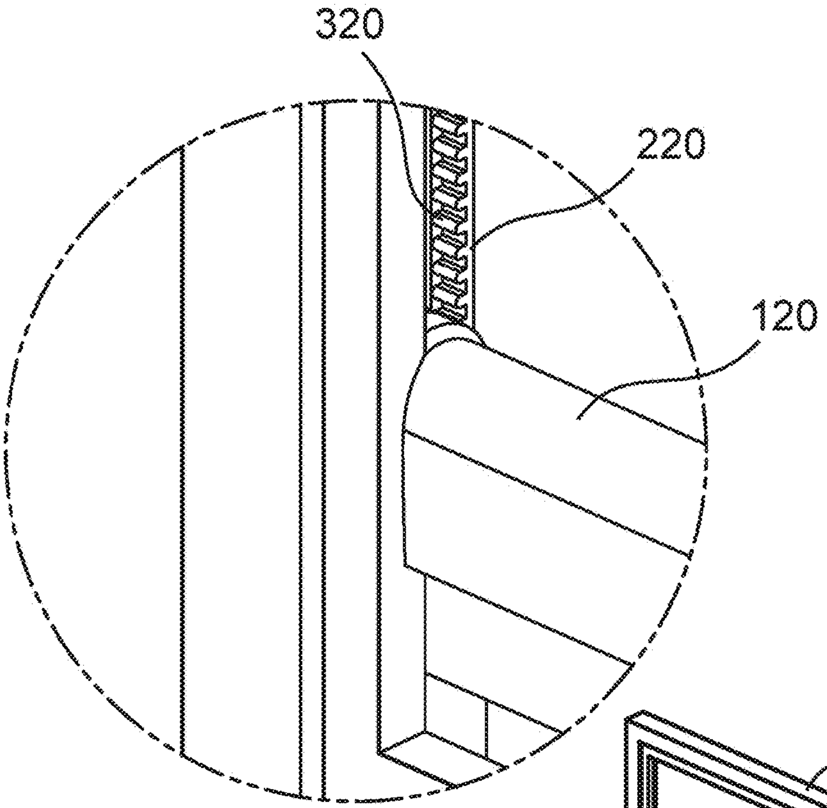
FIG. 4B is an enlarged view of the end of an extended arm in a window frame where it interfaces with a rack.
Figure 4C:
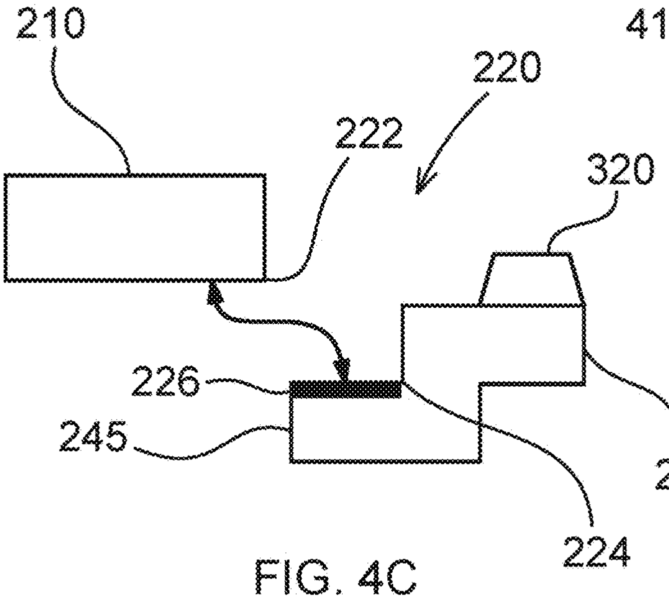
FIG. 4C is a top view of a rack and a window assembly according to embodiments of the present disclosure.
Figure 4A:
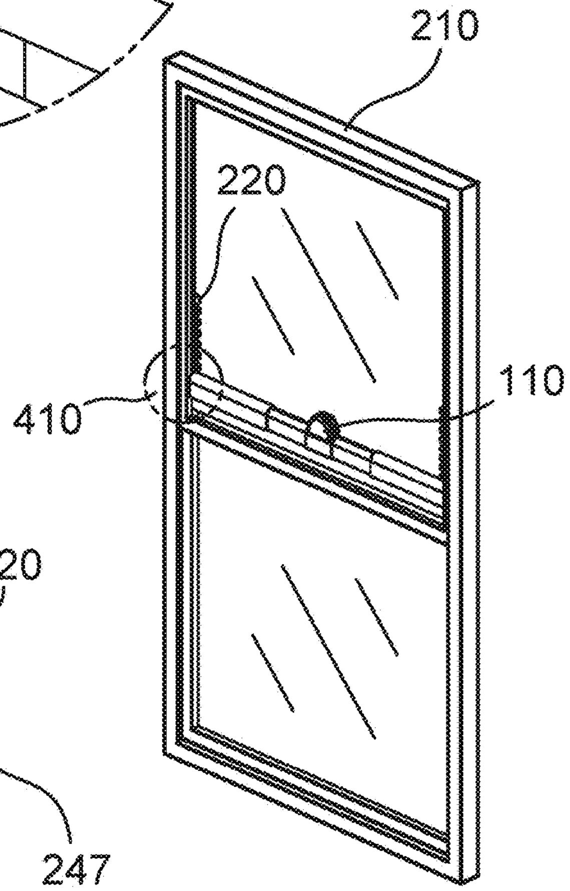
FIG. 4A is an isometric view of a window assembly with an automated window mechanism mounted to a window frame with telescoping arms fully extended.

FIG. 4A is an isometric view of a window assembly with an automated window mechanism mounted to a window frame with telescoping arms fully extended. In this embodiment, window assembly 210 is shown along with mounting assembly 110 is shown with telescoping arms in a fully extended position, having been fully installed or retrofitted to the window frame. Interface view 410 of the mounting assembly 110 with the rack 220 is further detailed in an enlarged view as shown in FIG. 4B.

FIG. 4B is an enlarged view of the end of an extended arm in a window frame where it interfaces with a rack. This enlarged view details the interface between the telescoping arm 120 which is fully extended to fit the window frame, with rack 220 shown along with rack teeth 320.

FIG. 4C is a top view of a rack 220 and a window assembly 210 according to embodiments of the present disclosure. The window assembly 210 has a parallel surface 222 that is parallel to a direction of movement of the window relative to the window assembly. The rack 220 has a concave right-angle profile 224 with an adhesive 226 that fastens to the parallel surface 222. Fastening mechanisms other than adhesives can be used. The parallel surface 222 is a convex right-angle profile. Many window assemblies have such a profile on a portion of a frame of a metal support feature to which the rack 220 can be fastened. The rack 220 has a uniform thickness which makes for convenient injection molding during manufacture. The rack 220 can be considered two plates: a first plate 245 carrying the adhesive 226, and a second plate 247 connected to the first plate 245. A union between the first plate 245 and second plate 247 forms the concave right-angle profile 224. The second plate 247 has teeth 320 protruding therefrom. The shape of the rack 220 accordingly allows installation without measuring and guesswork.

Figure 5A:
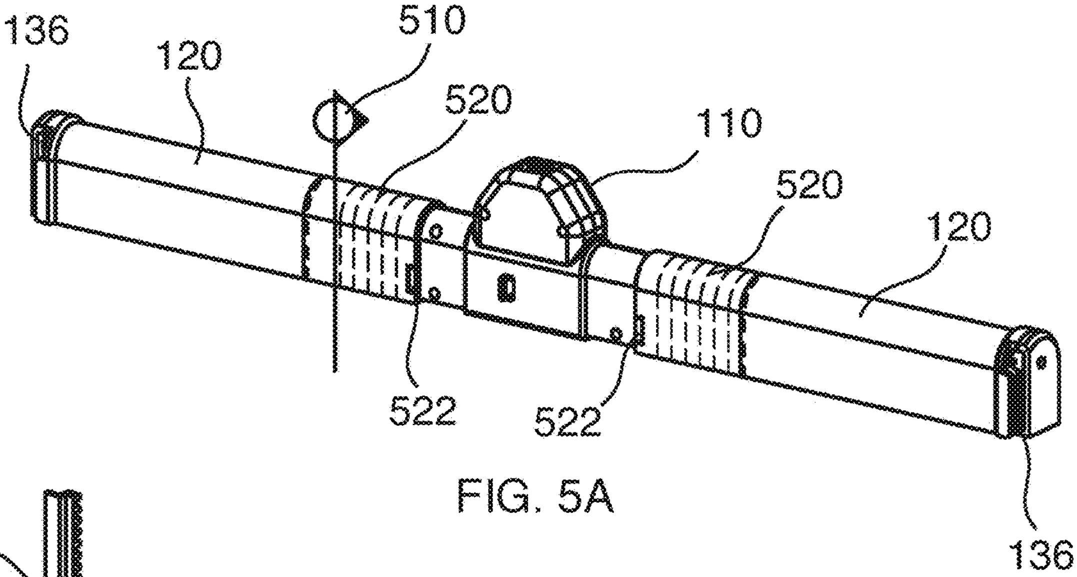
FIG. 5A is an isometric view an automated window mechanism.

FIG. 5A is an isometric view an automated window mechanism. Mounting assembly 110 is shown with telescoping arms 120 extended out from the main body of the mounting assembly 110. In this embodiment, telescoping arms 120 are locked into place by frictional protrusions 520 on an interior surface of the telescoping arms 120. In addition to these frictional protrusions, there are also locking mechanisms 522 that may be activated by a user in order to further lock the arms in place. These locking mechanisms 522 may also include a mechanical release allowing the user to release the lock if needed to reposition the telescoping arms 120, or to remove the mounting assembly 110 in order to uninstall the system if needed. Slot openings 136 on the end of the telescoping arms 120 are shown ready to be aligned with a rack. Section view 510 is further detailed in FIG. 6.

Figure 5B:
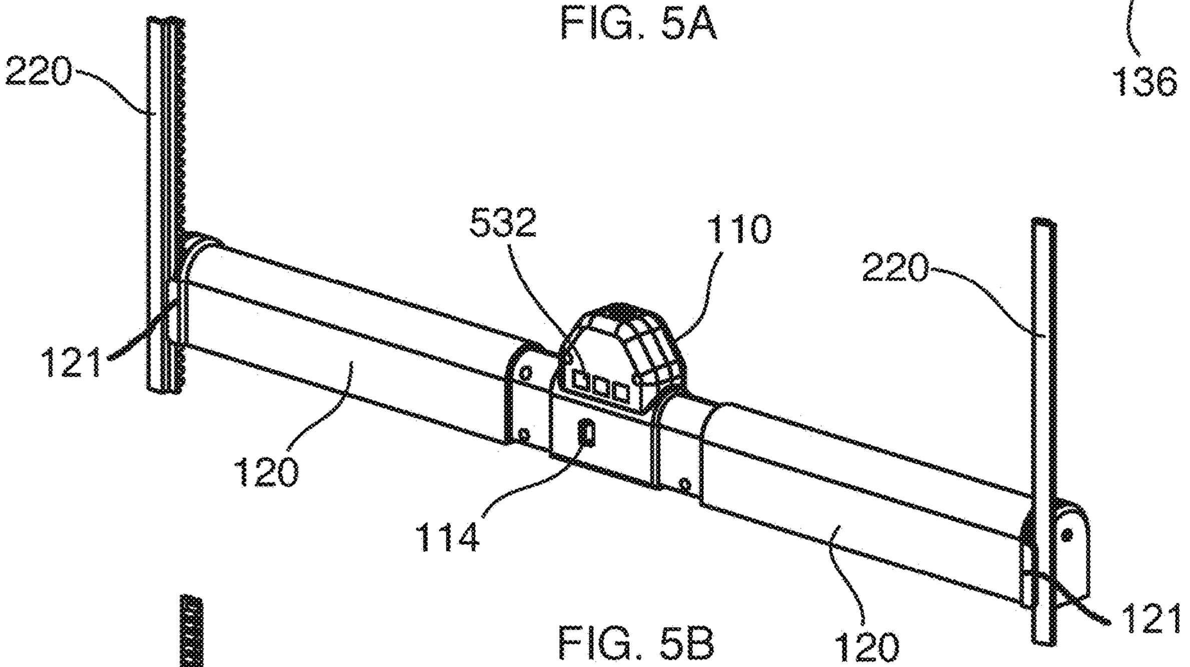
FIG. 5B is an isometric view an automated window mechanism with rack teeth facing away from a user's view.

FIG. 5B is an isometric view an automated window mechanism with rack teeth facing away from a user's view. Mounting assembly 110 is shown with telescoping arms 120 extended out from the main body of the mounting assembly 110. A user interface device is shown in this embodiment as three buttons 532 on the front (user facing side) of the mounting assembly 110. Each of the buttons 532 may cause the actuator to open or close the window or activate other actions as needed. The manual release 114 is also shown. In this embodiment, racks 220 are facing away from the window and away from the user. At distal ends of the telescoping arms 120 there are guidance panels 121 that extend from the telescoping arms 120 and engage with a base of the rack 220 opposite the teeth 320 of the rack 220. The guide panels 121 help to maintain the gear in a meshed engagement with the rack 220.

Figure 5C:
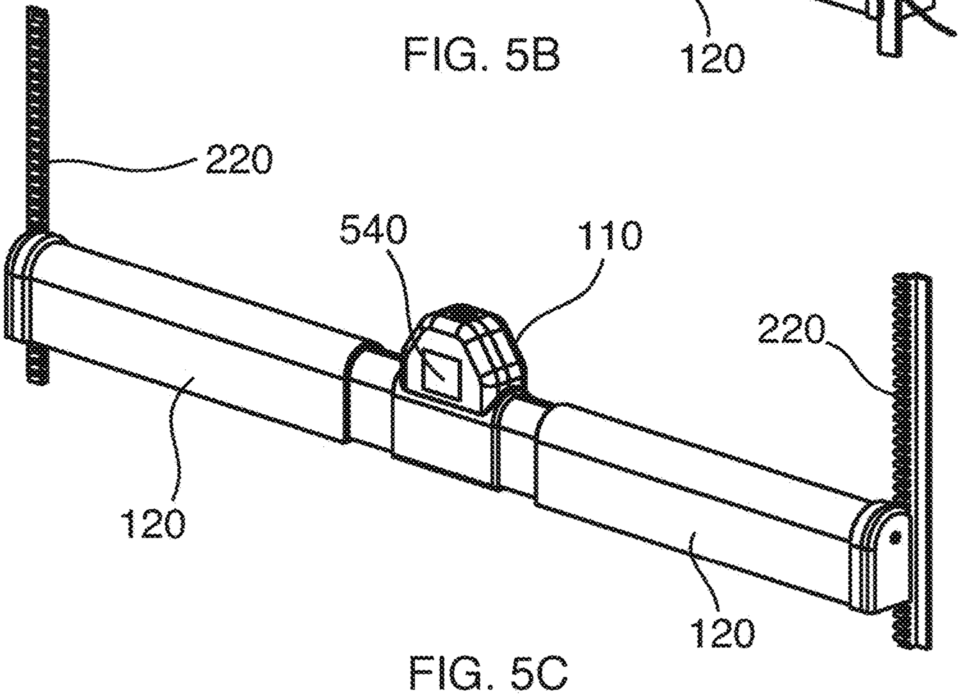
FIG. 5C is an isometric view an automated window mechanism with rack teeth facing towards a user's view.

FIG. 5C is an isometric view an automated window mechanism with rack teeth facing towards a user's view. Mounting assembly 110 is shown with telescoping arms 120 extended out from the main body of the mounting assembly 110. A user interface device is shown in this embodiment as touch screen 540 on the front (user facing side) of the mounting assembly 110. In this embodiment, racks 220 are facing towards the window and towards the user.

Figure 6:
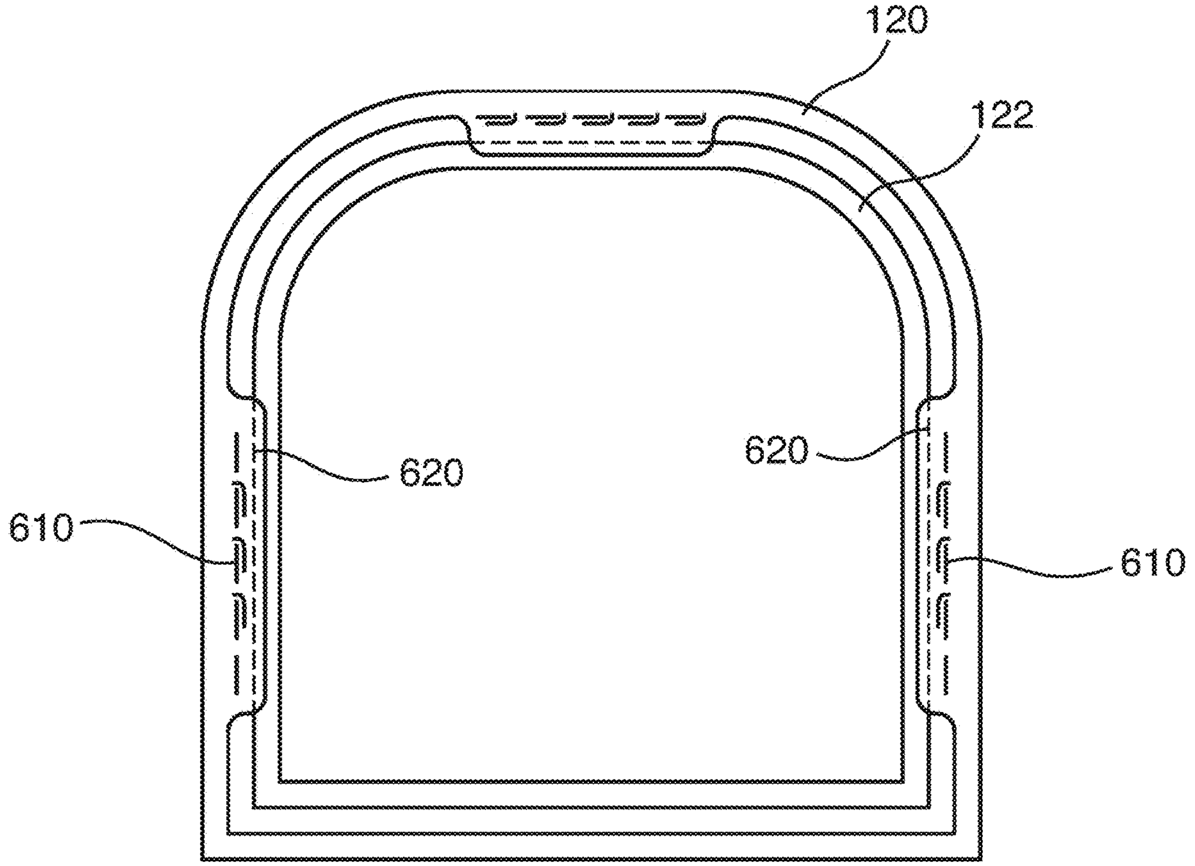
FIG. 6 is a section view of the arm extension of FIG. 5A.

FIG. 6 is a section view of the arm extension of FIG. 5A. This cross section of telescoping arms 120 shows stationary arm extensions 122 with interfacing protrusions 620 locking in with frictional protrusions 610 on an interior surface of the telescoping arms 120.

Figure 7A:
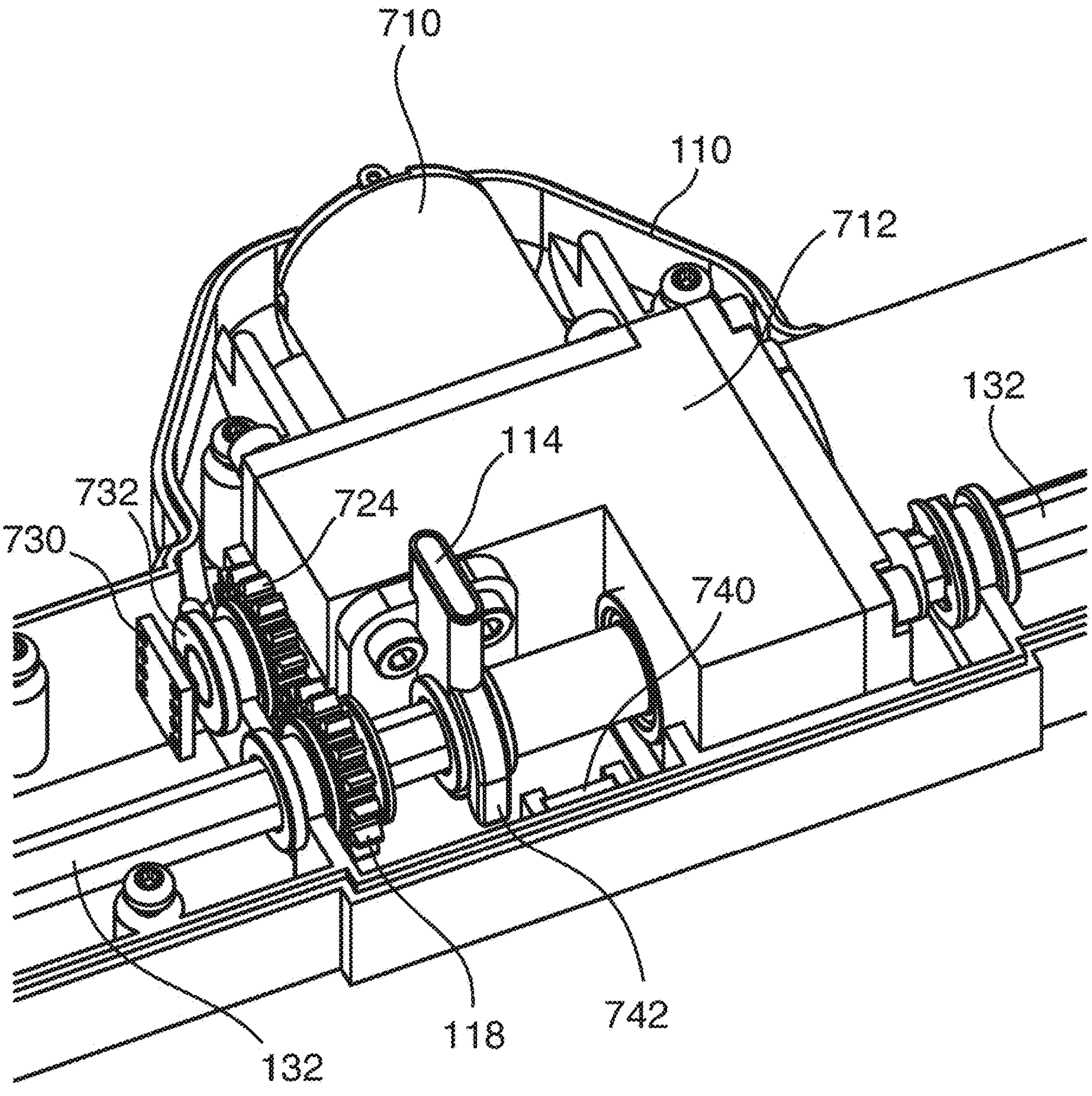
FIG. 7A is a close-up isometric view of an actuator assembly with a manual release mechanism in an open position.

FIG. 7A is a close-up isometric view of an actuator assembly with a manual release mechanism in an open position. A close-up view of mounting assembly 110 is shown. Motor actuator 710 drives gears within gearbox 712 that in turn cause position gear 724 to engage with main gear 118, thus rotating drive shaft 132. Rotary position encoder 730 aligns with magnetic position indicator 732 as shown. The rotary position encoder 730 may inform the control system regarding the current rotational position of the drive shaft 132. As the window opens and closes, the end points of the fully open and fully closed positions may be determined by the rotary position encoder 730. In addition to these end points, the rotary position encoder 730 may further communicate specific positions of the drive shaft 132 that have more friction or a potential obstruction. Any changes to a default window travel model may be discovered by the sensors and control system in real time. A default window travel model may be established when the system is first installed on the window assembly. This model may be referred to by the control system to determine any real-time departures from the model that may indicate a problem. An alert may be sent to the user indicating this aberration or departure from the established model. The user may then indicate that this is OK (no obstruction was found) to update the default model. The user may alternatively remove an obstruction, then indicate that the obstruction has been cleared by entering an "OK" button on an app—indicating that the obstruction has been clear and it is now "OK" to return to the original model and to now re-engage the control system.

A user may also partially open a window and enter that as a desired position for ventilating a room for example. The user may select this window position by setting a position name (for example "ventilation") in the app. The control system may then control the opening of the window to this specific position when called on by a preset for "ventilation" in the app. Other positions such as "morning cooling" may also be identified either as factory presets, or as defined by a user for a schedule that is adhered to by the control system. For example, the control system may be programmed to open several windows in the morning according to the preprogrammed position of "morning cooling" in order to allow a whole house fan to bring in cool morning air in the early morning hours in the summer.

The manual release 114 is shown in this embodiment in an engaged position wherein the control system has full control of the operation of the window. Position indicator 742 is not aligned with position sensor 740 in this example. Position sensor 740 indicates to the control system that the system is fully engaged and may control the opening and closing of the window.

Figure 7B:
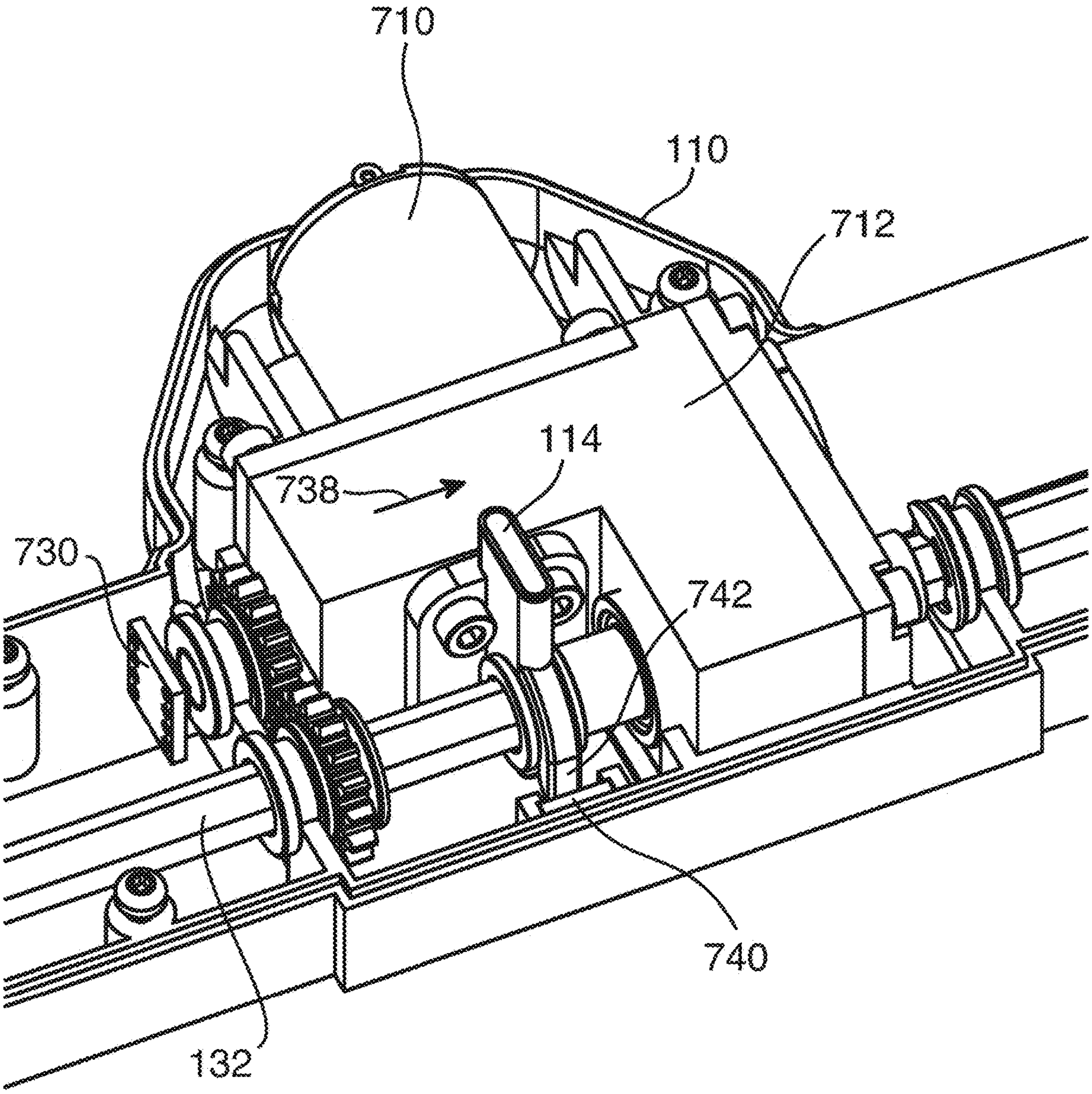
FIG. 7B is a close-up isometric view of an actuator assembly with a manual release mechanism in a closed position.

FIG. 7B is a close-up isometric view of an actuator assembly with a manual release mechanism in a closed position. A close-up view of mounting assembly 110 is shown. In this embodiment, a user has slid 738 to the right, thus activating the manual release 114 into a manual override position, allowing the user to fully control the opening and closing of the window. The manual release 114 is shown in this embodiment in a dis-engaged position wherein the control system does not have control of the operation of the window. Position indicator 742 is aligned with position sensor 740 in this example. Position sensor 740 indicates to the control system that the system is dis-engaged and may not control the opening and closing of the window. The user now has full control of the window.

In FIG. 7B, the control system has now been disengaged by disengaging a gear connected to the motor actuator 710 from one or more gears inside the gearbox 712. With the gearbox 712 in this condition (disengaged), it is still necessary for the system to keep track of the window position after the user has slid it open or closed or partially open). Once the system is re-engaged and takes control of the window in the future, it may not know the position the window was left in by the user. In order to communicate the user selected position to the control system, the user selected window position is indicated to the control system by the rotary position encoder 730. While the gears are disengaged within the gearbox 712, the position of the window may still be communicated to the control system via the rotary position encoder 730 since the drive shaft 132 will still rotate as the window is slid open and closed by the user.

Figure 8:
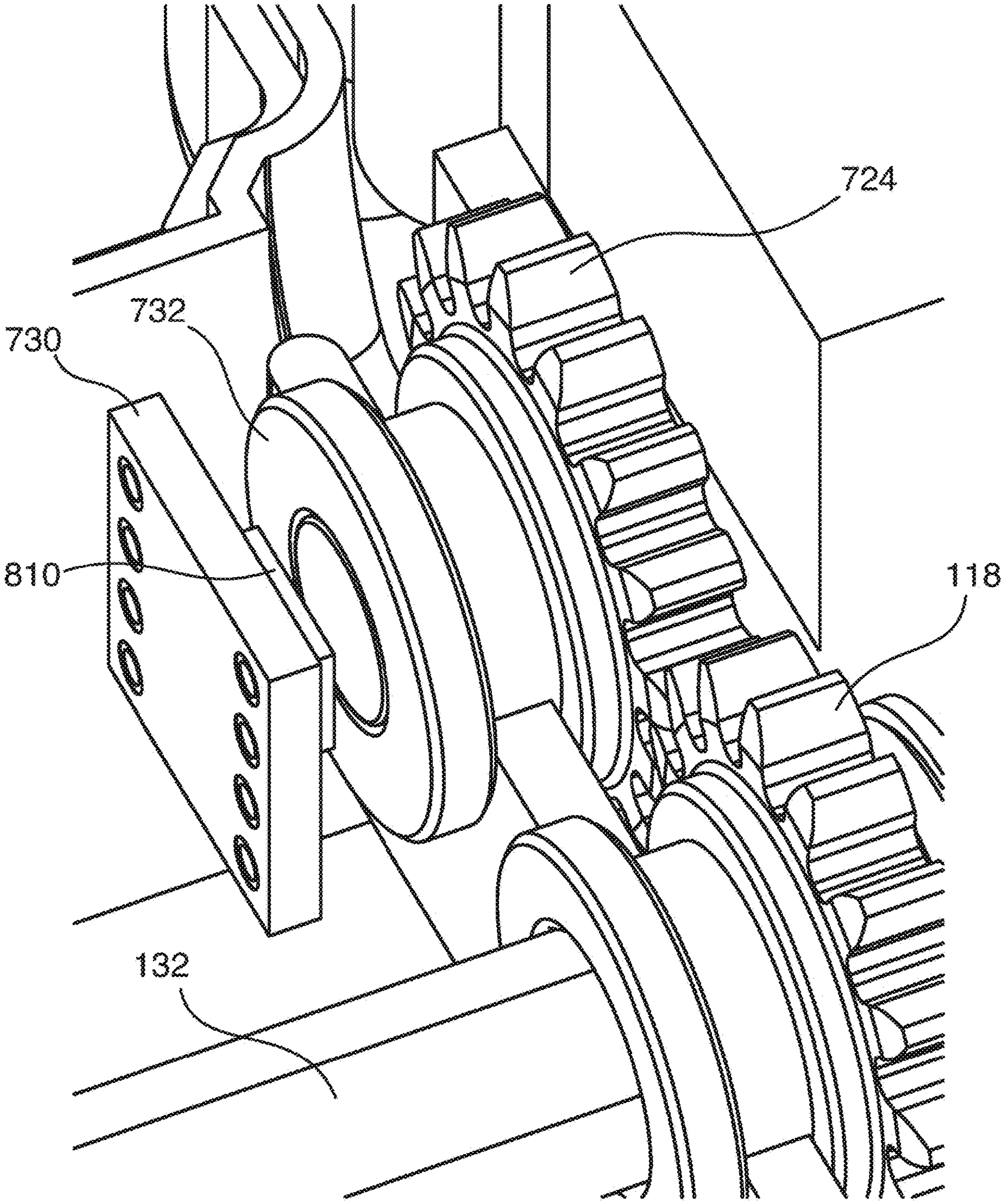
FIG. 8 is a close-up isometric view a gearbox gear interfacing with a drive shaft gear.

FIG. 8 is a close-up isometric view a gearbox gear interfacing with a drive shaft gear. Position gear 724 is shown engaged with main gear 118, thus rotating drive shaft 132. Rotary position encoder 730 aligns with magnetic position indicator 732 as shown. Sensor 810 may send a signal to the control system indicating the current rotational position of drive shaft 132.

Figure 9A:
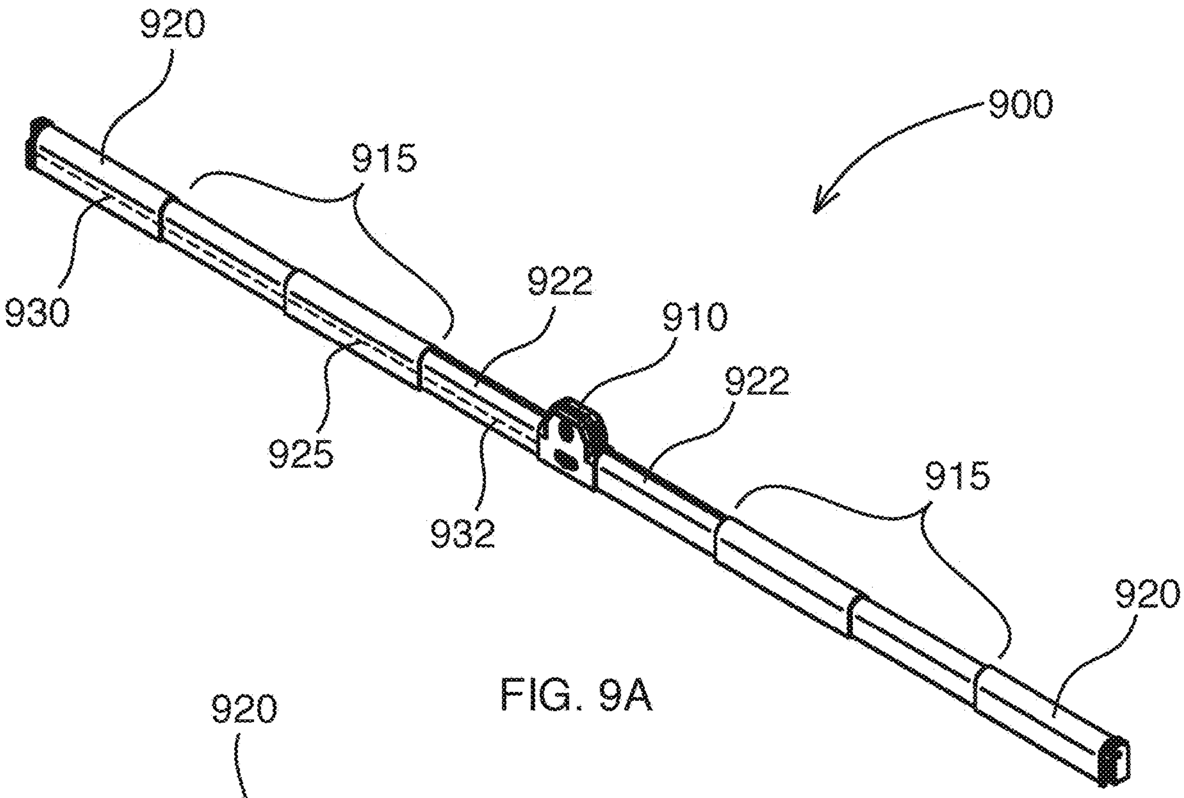
FIG. 9A is an isometric view of an automated window mechanism with telescoping arm extensions extended.

FIG. 9A is an isometric view of an automated window mechanism with telescoping arm extensions extended. Mounting assembly 900 is shown with extension arm assemblies on either side of the main body 910 of the actuator assembly with stationary arms 922 extending out to telescoping arm extensions 915 and on to interface arms 920 as shown. Main drive shaft 932 is connected to telescoping drive shaft 925. Telescoping drive shaft 925 is connected to interface drive shaft 930 as shown. Main drive shaft 932 is rotated by the actuator, and in turns rotates both telescoping drive shaft 925 along with interface drive shaft 930. All of the drive shafts have a similar keyed configuration that allows for them to be slid together and operate together as a single drive shaft.

Figure 9B:
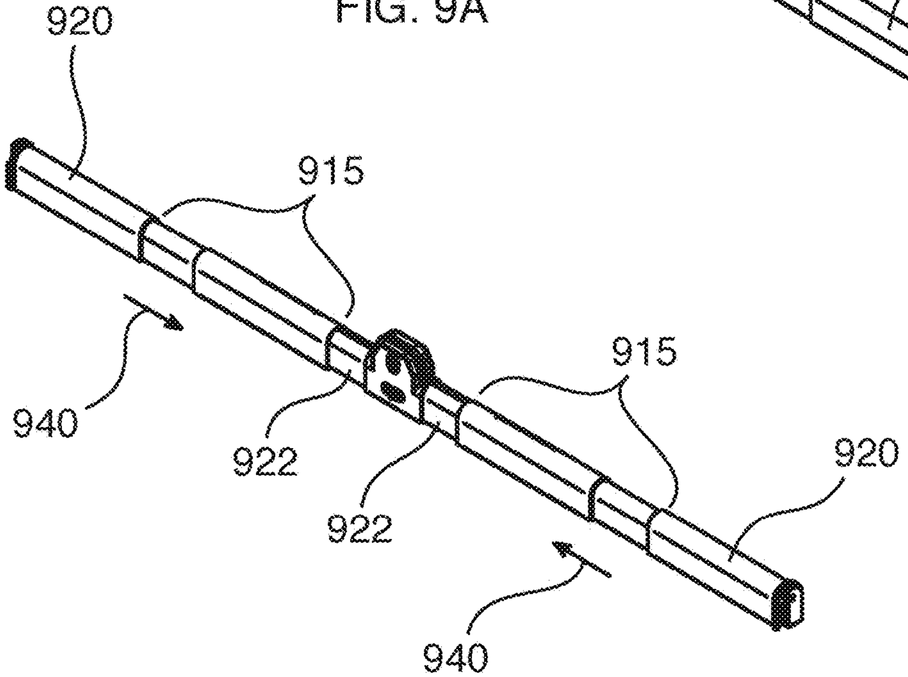
FIG. 9B is an isometric view of an automated window mechanism with telescoping arm extensions partially retracted.

FIG. 9B is an isometric view of an automated window mechanism with telescoping arm extensions partially retracted. The position of the telescoping arm extensions 915 in this example embodiment are in a retracted 940 position. The telescoping arm extensions 915 are retracted 940 before the mounting assembly is installed or retrofitted to an existing window assembly. In certain embodiments, a window may be too wide for the stationary arms 922 together with the interface arms 920 to reach. In this case, the assembly is extended by adding the telescoping arm extensions 915 to extend the arms out far enough to reach the width of the larger window. The telescoping feature allows the assembly to be adjusted to fit the larger size as needed.

Figure 9C:
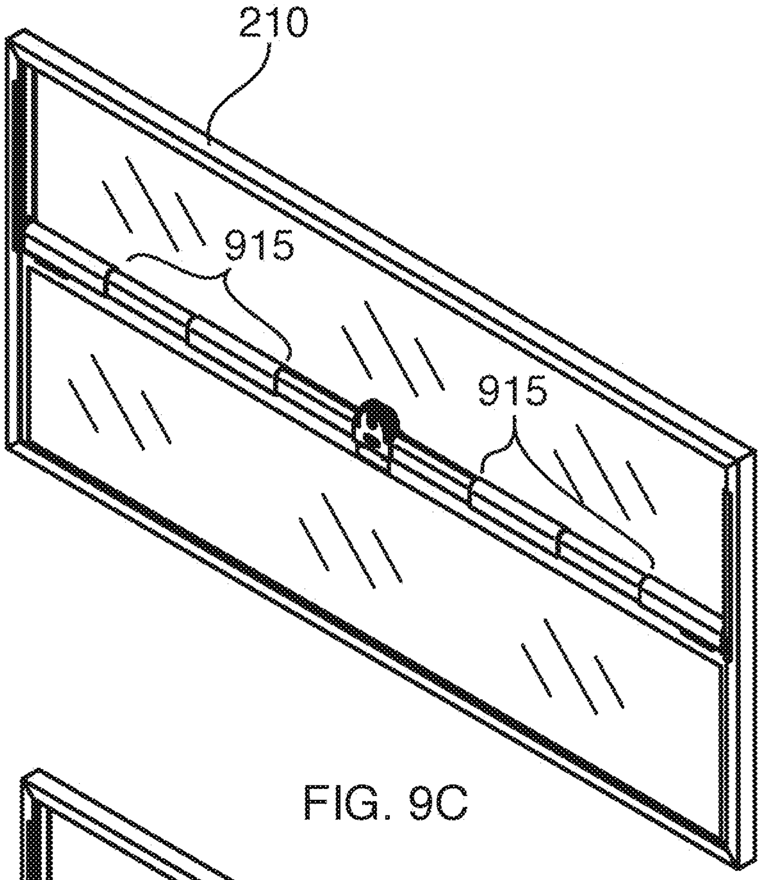
FIG. 9C is an isometric view of a window assembly with an automated window mechanism mounted to a window frame with telescoping arm extensions fully extended.

FIG. 9C is an isometric view of a window assembly with an automated window mechanism mounted to a window frame with telescoping arm extensions fully extended. Window assembly 210 is shown with the mounting assembly telescoping arm extensions 915 fully extended to fit the window as required.

Figure 9D:
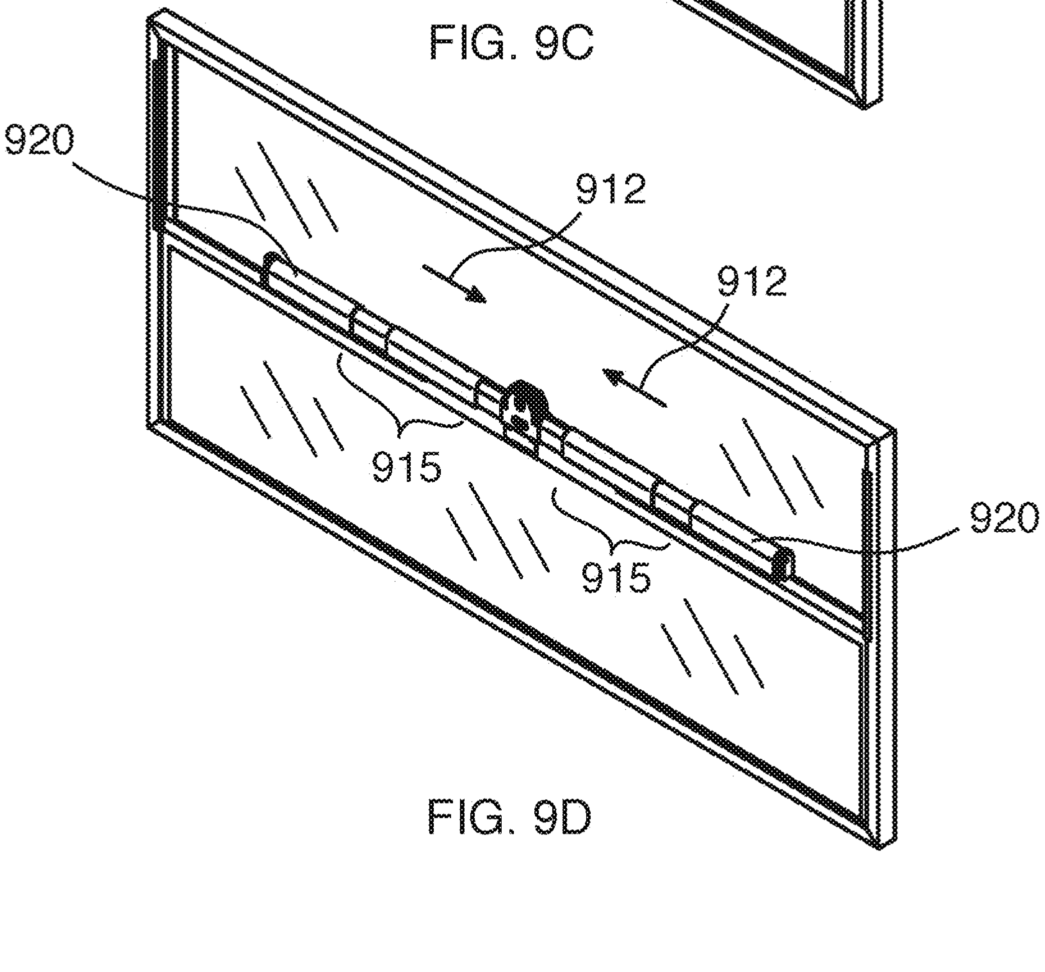
FIG. 9D is an isometric view of a window assembly with an automated window mechanism mounted to a window frame with telescoping arm extensions partially retracted.

FIG. 9D is an isometric view of a window assembly with an automated window mechanism mounted to a window frame with telescoping arm extensions partially retracted. In this embodiment, the telescoping arm extensions 915 are partially retracted 912 to allow the mounting assembly to be placed in position prior to installation. Interface arms 920 are ready to be extended out towards the window frame as needed for installation.

Figure 10:
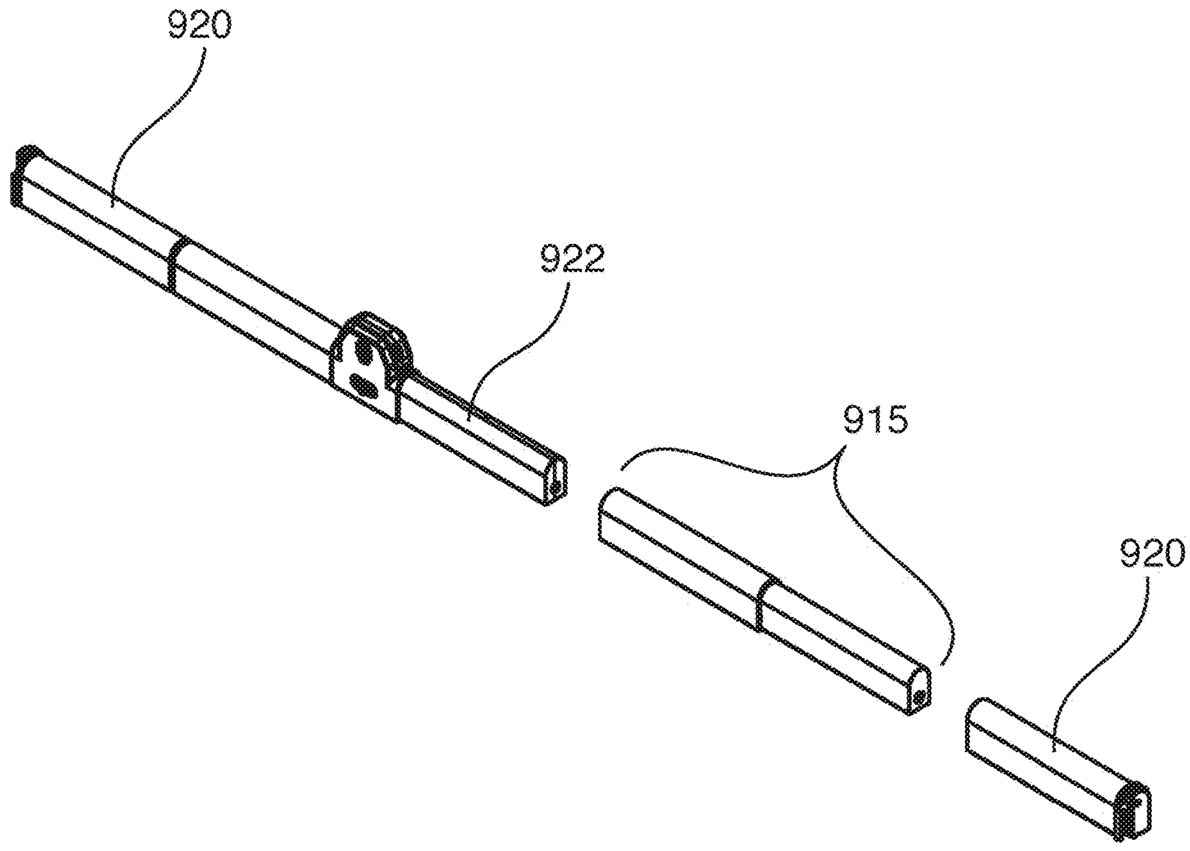
FIG. 10 is an isometric view of an extension arm assembly separated into the three components of: stationary arm, telescoping arm extension and interface arm.

FIG. 10 is an isometric view of an extension arm assembly separated into the three components of: stationary arm, telescoping arm extension and interface arm. In this example embodiment, the three components of the extension arm assembly have not been connected together yet. In some cases, the window size may be too large for the stationary arm 922 together with the interface arm 920 to reach. Telescoping arm extension 915 is shown placed between the stationary arm 922 and the interface arm 920 in order to extend out the arm assembly to reach to the wide width of a larger window opening. The length of the telescoping arm extension 915 is adjustable and held in place, once adjusted to fit the opening as required, by a locking mechanism.

Figure 11:
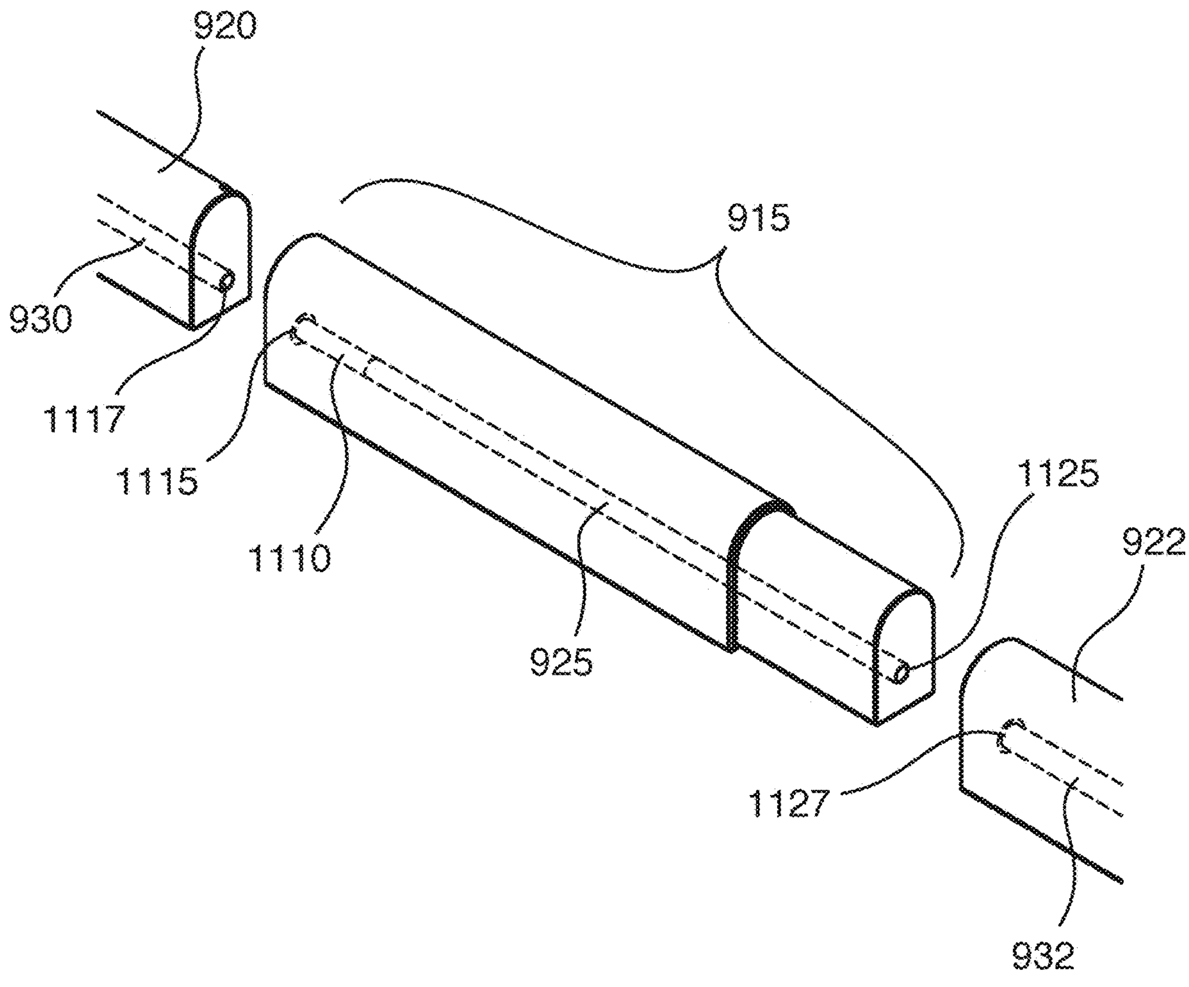
FIG. 11 is an isometric view of an extension arm assembly separated into the three components of stationary arm, telescoping arm extension and interface arm.

FIG. 11 is an isometric view of an extension arm assembly separated into the three components of stationary arm, telescoping arm extension and interface arm, with drive shafts and connection fittings shown. Interface arm 920 is shown with interface drive shaft 930. Interface drive shaft 930 has a male keyed connector 1117 that mates with female keyed connector 1115 of telescoping drive shaft 925. Sliding section 1110 of drive shaft 925 allows the length of the telescoping drive shaft 925 to be adjusted as needed. Telescoping drive shaft 925 connects via male connector 1125 to female connector 1127 of main drive shaft 932 in stationary arm 922 as shown.

Figure 12:
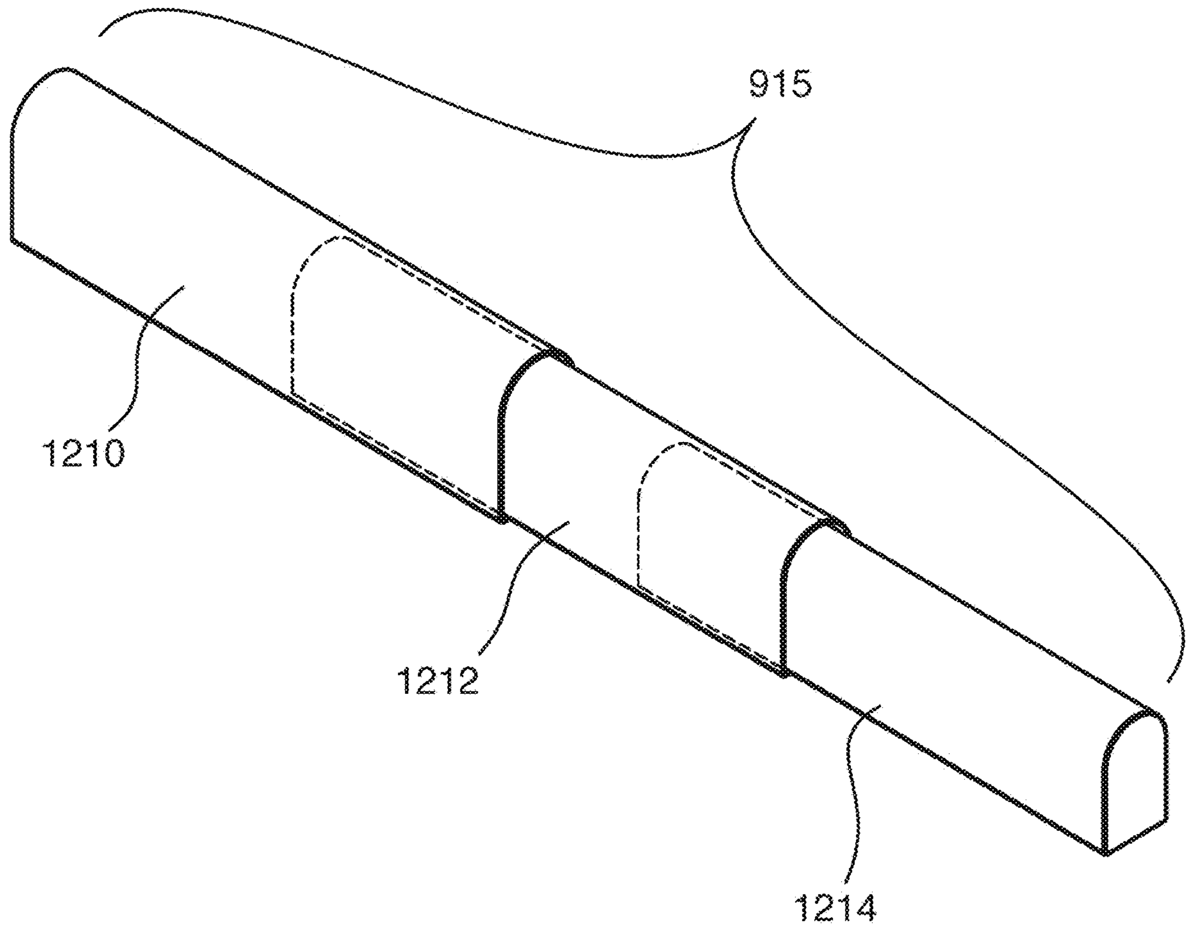
FIG. 12 is an isometric view of a telescoping arm extension with three sections.

FIG. 12 is an isometric view of a telescoping arm extension with three sections. In this example embodiment, telescoping drive shaft 925 is illustrated with three sections. In some cases, two sections may not be long enough to accommodate a very large window. In this case 3 or more sections may be needed to reach. Section 1210 slides into section 1212. Section 1211 slides into section 1214. All of these sections function as one assembly to extend out the arm as required.

Figure 13B:
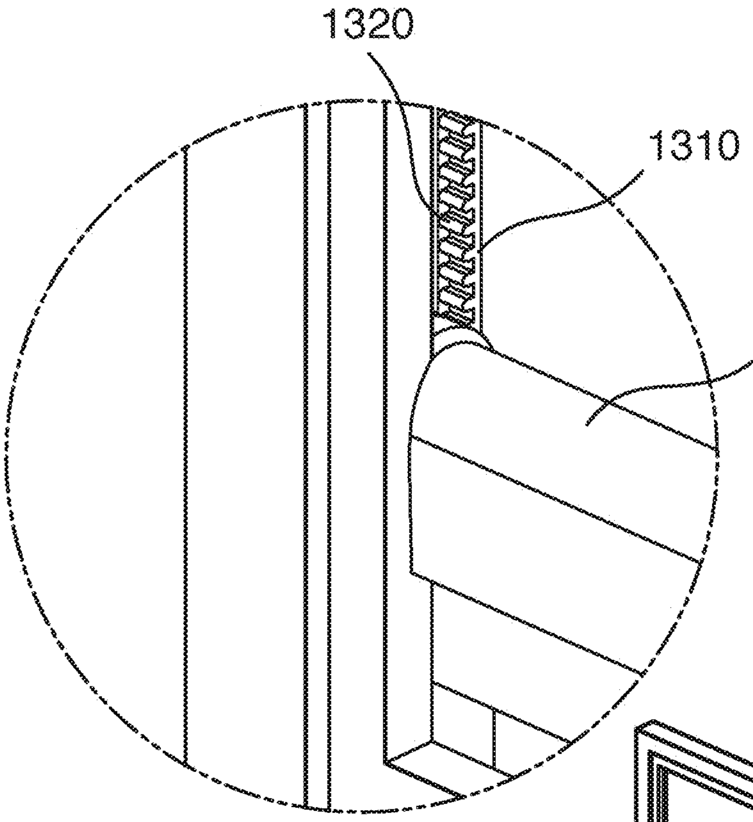
FIG. 13B is an enlarged view of the end of an interface arm in a window frame where it interfaces with a rotational force transfer mechanism.
Figure 13A:
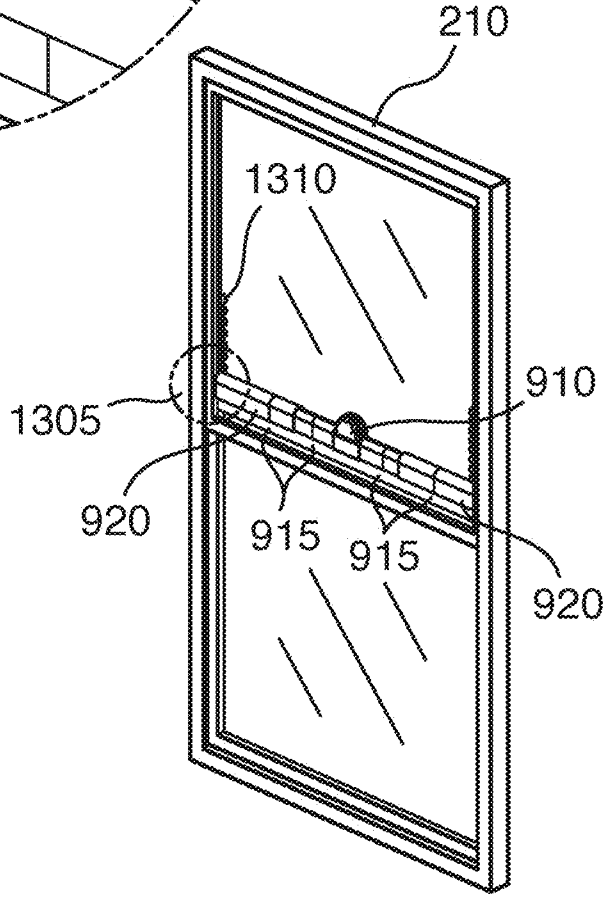
FIG. 13A is an isometric view of a window assembly with an automated window mechanism mounted to a window frame with extension arm assembly fully extended.

FIG. 13A is an isometric view of a window assembly with an automated window mechanism mounted to a window frame with extension arm assembly fully extended. In this embodiment, main body 910 of the mounting assembly is shown mounted in window assembly 210. telescoping arm extensions 915 are shown partially extended to interface arms 920 in order to retrofit the assembly to the window frame. Interface view 1305 of rack 1310 is further detailed in an enlarged view as shown in FIG. 13B.

FIG. 13B is an enlarged view of the end of an interface arm in a window frame where it interfaces with a rotational force transfer mechanism. This enlarged view details the interface between the interface arm 920 which is fully extended to fit the window frame, with rack 1310 shown along with rack teeth 1320. The rotational force transfer mechanism in this example embodiment is the rack type assembly. Other embodiments of the rotational force transfer mechanism are shown in FIGS. 3B, 3C, 3D, 3E, and 3F.

Figure 14A:
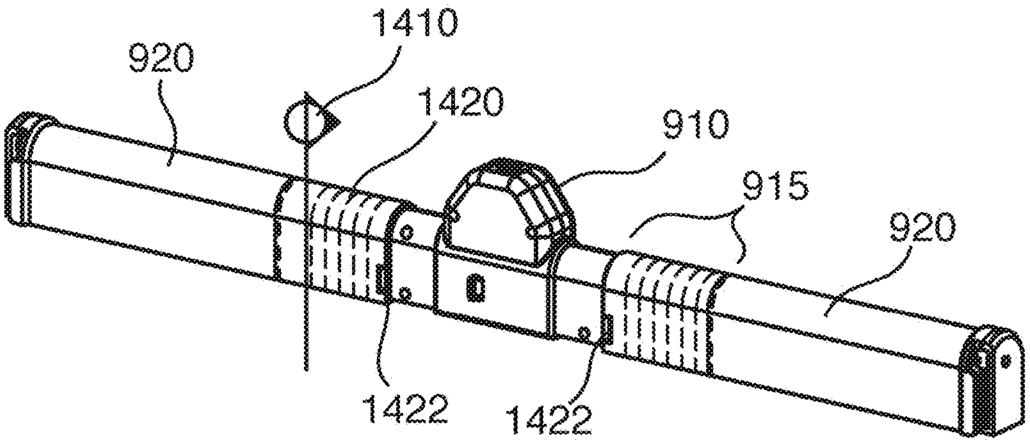
FIG. 14A is an isometric view an automated window mechanism.

FIG. 14A is an isometric view an automated window mechanism. Main body 910 of the mounting assembly is shown with telescoping arm extensions 915 mostly compressed and extending out from the main body 910. In this embodiment, telescoping arm extensions 915 are locked into place by frictional protrusions 1420 on an interior surface of the telescoping arm extensions 915. In addition to these frictional protrusions 1420, there are also locking mechanisms 1422 that may be activated by a user in order to further lock the arms in place. These locking mechanisms 1422 may also include a mechanical release allowing the user to release the lock if needed to reposition the telescoping arm extensions 915, or to remove the mounting assembly in order to uninstall the system if needed. Section view 1410 is further detailed in FIG. 14B.

Figure 14B:
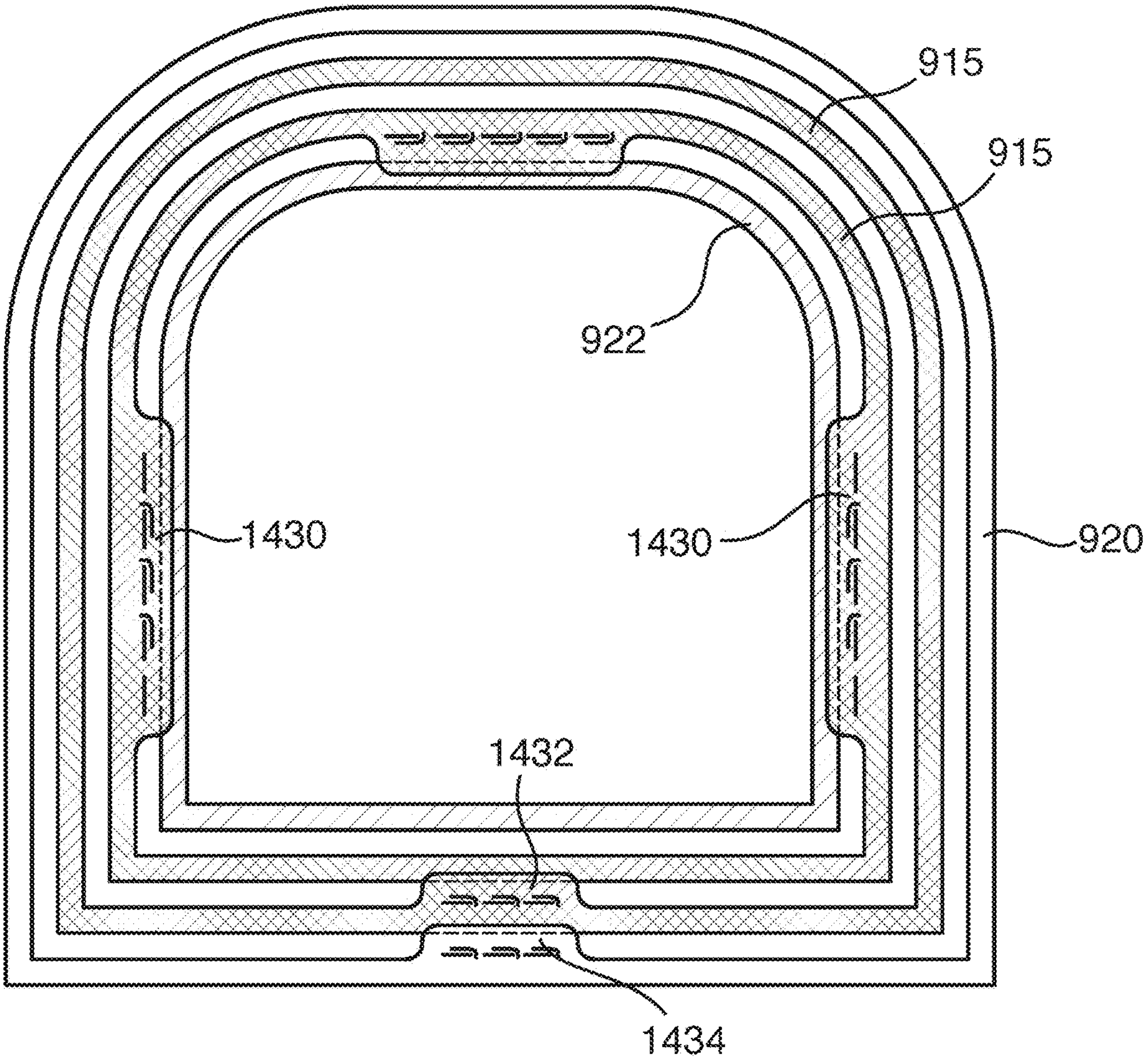
FIG. 14B is a section view of the extension arm assembly of FIG. 14A.

FIG. 14B is a section view of the extension arm assembly of FIG. 14A. This cross section of the extension arm assembly shows two telescoping arm extensions 915 interlocking to each other via locking mechanism 1432. Stationary arm 922 is shown with interfacing protrusions 1430 locking in with frictional protrusions on an interior surface of the telescoping arm extensions 915. Interface arm 920 locks in via similar locking mechanism 1434 with telescoping arm extension 915 as shown.

Figure 15:
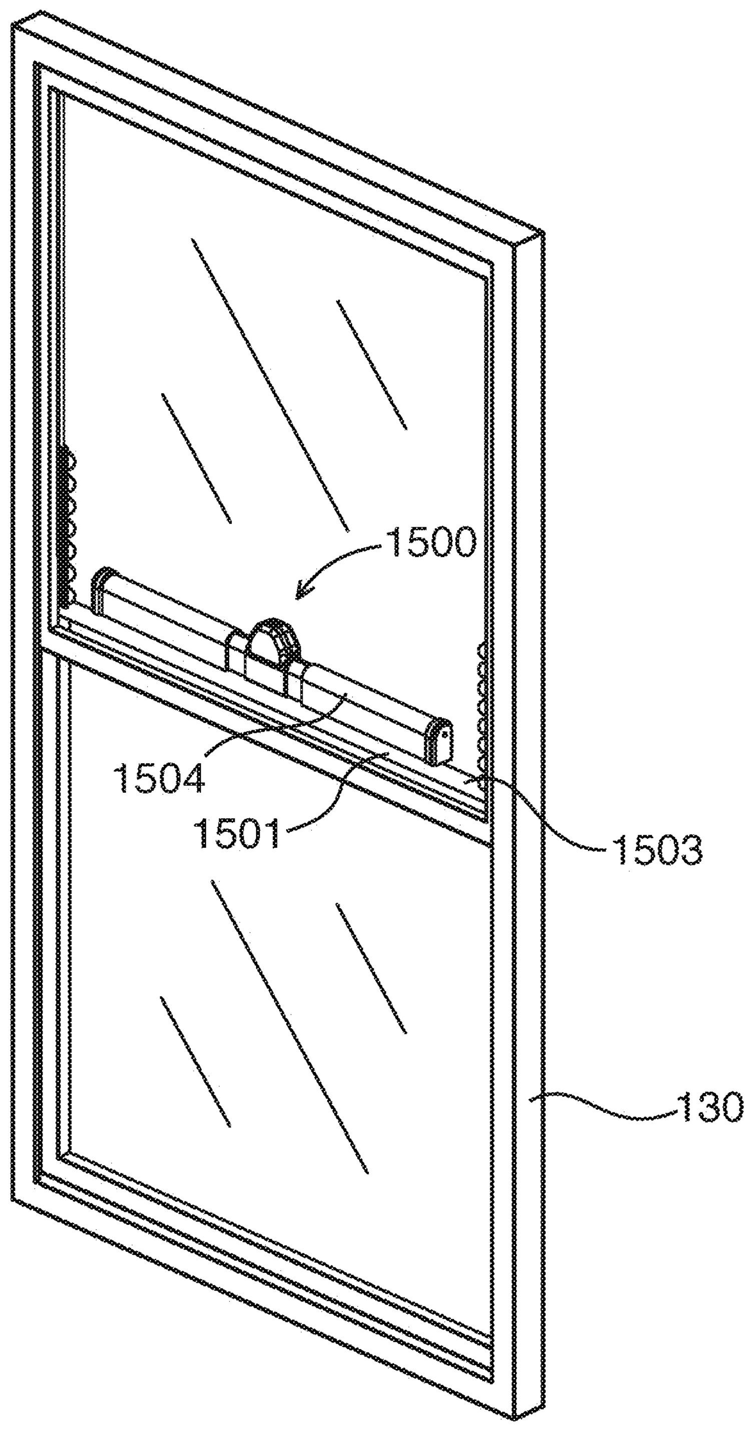
FIG. 15 is an isometric view of an automated window mechanism including anchors according to further embodiments of the present disclosure.

FIG. 15 is an isometric view of an automated window mechanism 1500 including anchors 1501 according to further embodiments of the present disclosure. The automated window mechanism 1500 includes a housing 1504 that surrounds components of the automated window mechanism 1500. The anchors 1501 secure the automated window mechanism 1500 to the window 130. The window 130 has an outer face 1503 that is perpendicular to the glass portion of the window and is a leading surface as the window is slid relative to the frame to open and close the window.

Figure 16:
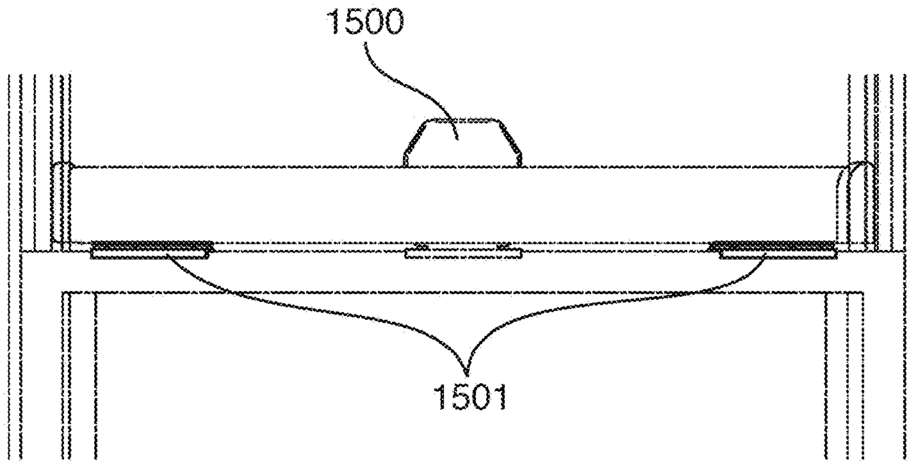
FIG. 16 shows the anchors of FIG. 15 according to embodiments of the present disclosure.

FIG. 16 shows the anchors 1501 of FIG. 15 according to embodiments of the present disclosure. In the shown embodiment there are two anchors 1501: one on each side of the assembly. In other embodiments there may be a different number of anchors including two or more on each side, or one side with no anchoring. The anchors 1501 have an L-shaped profile that will be shown in greater detail below. The L-shaped profile allows the anchors 1501 to be located on the surface of the window with a small lip on the front side and the larger portion on the upward-facing surface. The anchors 1501 can be flat, having no L-shaped component and can be secured to the outer face 1503 of the window 130. The anchors 1501 can be secured using glue, screws, adhesive, or using any suitable attachment mechanism.

Figure 17:
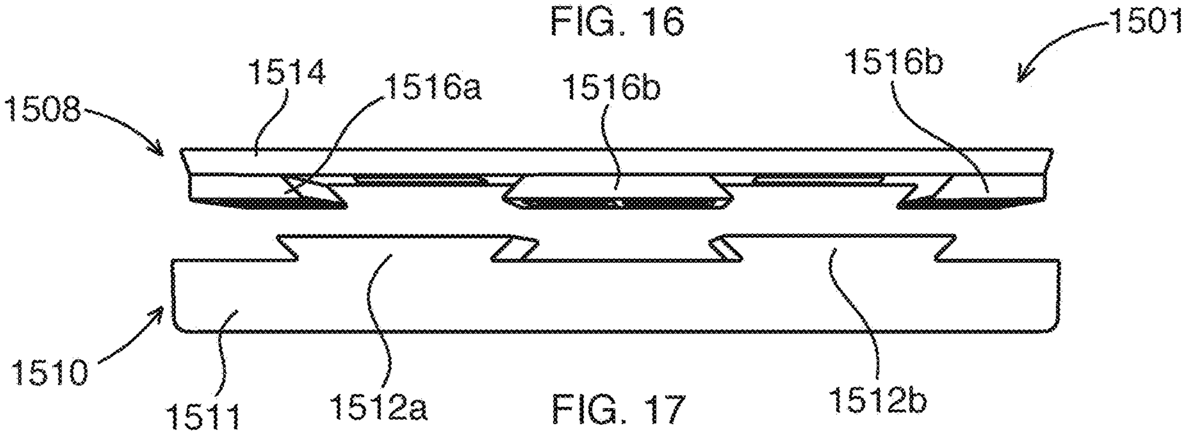
FIG. 17 is an exploded view of an anchor according to embodiments of the present disclosure.

FIG. 17 is an exploded view of an anchor 1501 according to embodiments of the present disclosure. The anchor 1501 comprises a mechanism piece 1508 and a window piece 1510. The mechanism piece 1508 attaches to the automated window mechanism 1500 shown in FIG. 15. The window piece 1510 attaches to the window 130. The window piece 1510 and mechanism piece 1508 interlock together to form the anchor 1501. The window piece 1510 includes a base member 1511, a first tongue-and-groove protrusion 1512*a*, and a second tongue-and-groove protrusion 1512*b* that each have an interlocking surface. The shape of the interlocking surfaces may vary and can include a trapezoidal shape or any other suitable interlocking shape. The mechanism piece 1508 includes a base member 1514, a first tongue-and-groove protrusion 1516*a*, a second tongue-and-groove protrusion 1516*b*, and a third tongue-and-groove protrusion 1516*c* extending downward from the base member 1514. The tongue-and-groove protrusions of the mechanism piece 1508 and the window piece 1510 interlock with one another to allow the anchor 1501 to slide in a transverse direction toward and away from the viewer. The transverse direction is defined in this context as a direction perpendicular to the plane of the window. The tongue-and-groove protrusions 1512*a-b* and 1516*a-c* allow the window piece 1510 to slide relative to the mechanism piece 1508 in the transverse direction, but prevents sliding in other directions. The shape of the tongue-and-groove protrusions can vary and still accomplish the desired effect. This motion allows the automated window mechanism 1500 to be installed and aligned properly in the transverse direction.

Figure 18:
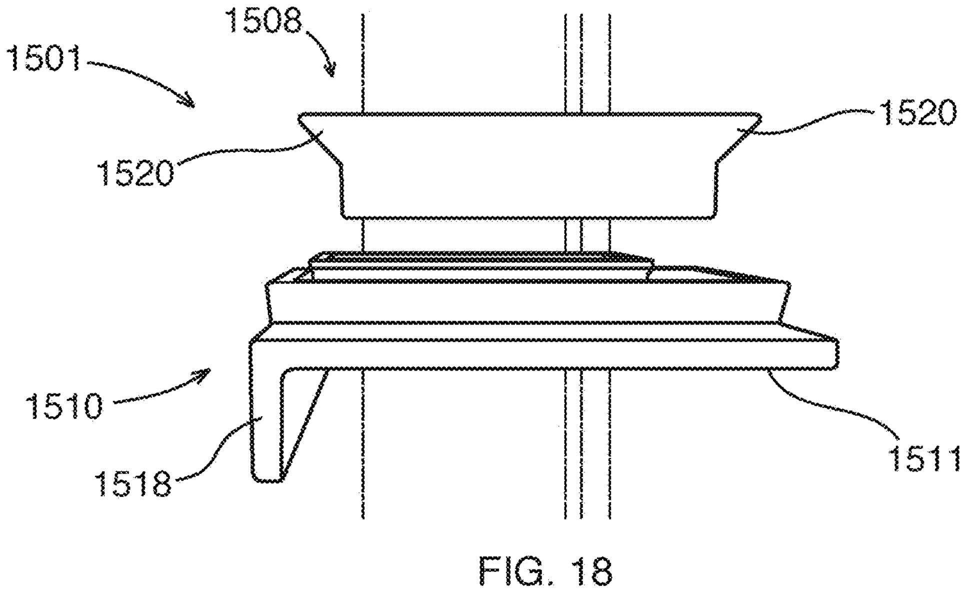
FIG. 18 shows an exploded end view of the anchor according to embodiments of the present disclosure.

FIG. 18 shows an exploded end view of the anchor 1501 according to embodiments of the present disclosure. The window piece 1510 is shown in this view revealing the L-shaped profile mentioned above. The window piece 1510 includes a lip 1518 and a base member 1511. The lip 1518 is smaller than the base member 1511 and helps align the anchor 1501 to the window.

The mechanism piece 1508 has a tongue-and-groove profile defined by protrusions 1520 that extend outwardly at an upper region. The precise shape of the keyed profile may vary and need not be equal to the shown angle and may have a more complex shape. The tongue-and-groove profile of the protrusions 1520 allows the mechanism piece 1508 to move relative to the automated window mechanism 1500 as will be shown in FIG. 19. The sliding permitted in a direction perpendicular to the transverse direction mentioned above, and perpendicular to the direction the window travels as it opens and closes.

Figure 19:
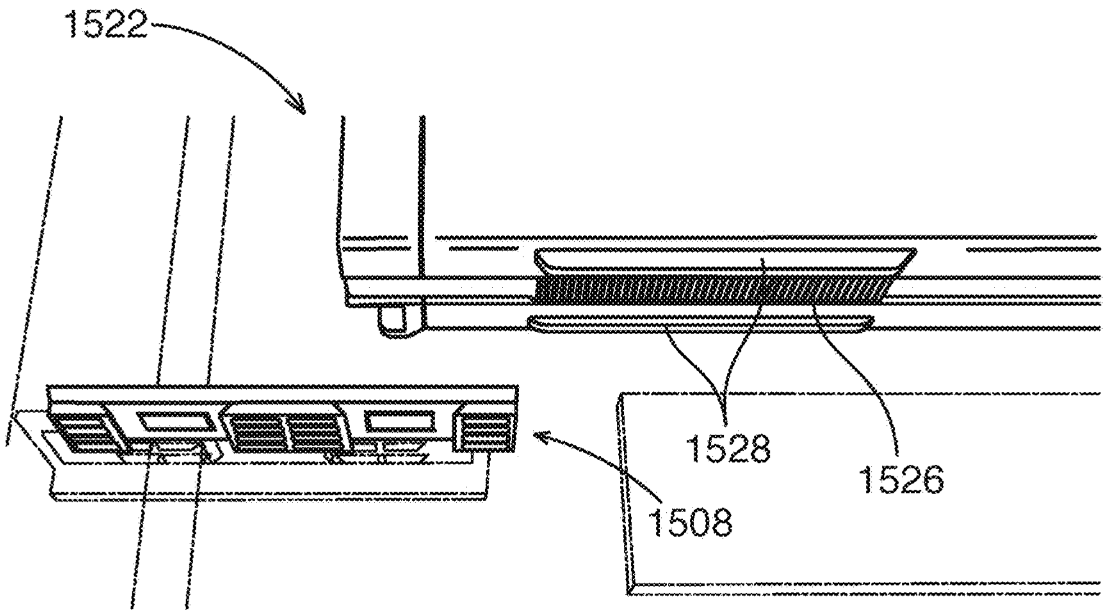
FIG. 19 is an exploded view of a tongue-and-groove track and anchor according to embodiments of the present disclosure.

FIG. 19 is an exploded view of a tongue-and-groove track 1522 (also referred to herein as "track 1522") and anchor 1501 according to embodiments of the present disclosure. The track 1522 can be found on an underside of the automated window mechanism 100. In some embodiments the track 1522 is integral to the mechanism. In other embodiments the track 1522 is a separate piece that is attached to the mechanism. The track 1522 comprises a toothed region 1526 and interlocking protrusions 1528. The interlocking 1528 complement the protrusions 1520 of the mechanism piece 1508 and allow the track 1522 to slide along the window frame. The length of the track 1522 can depend on the size of the automated window mechanism relative to the window into which it will be installed. In the shown embodiment the track 1522 is approximately as long as the anchor 1501.

Figure 20:
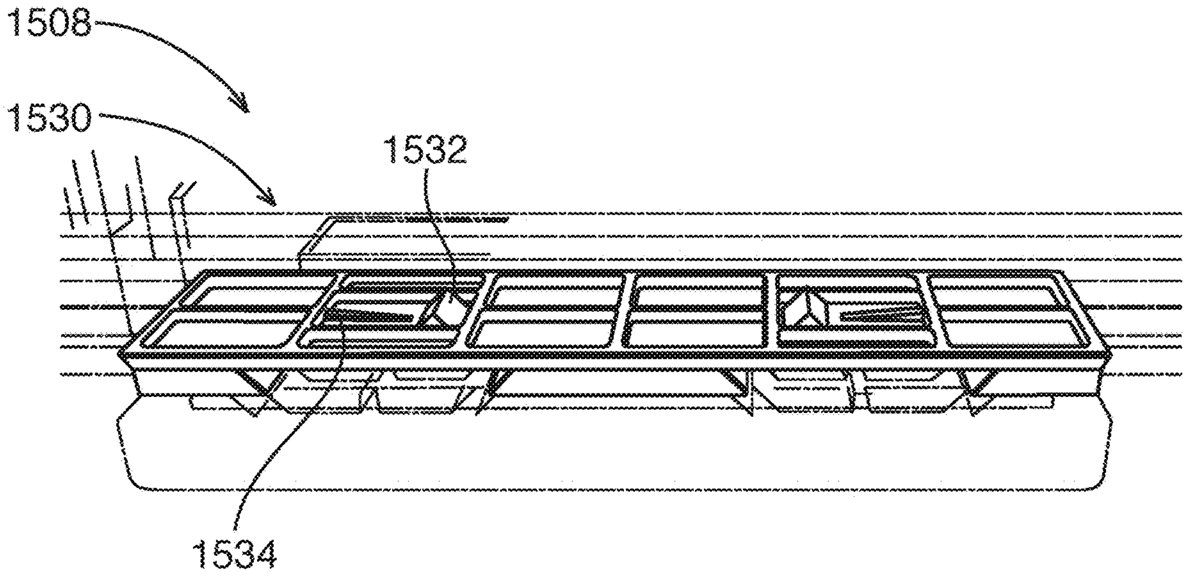
FIG. 20 shows a ratchet portion of the anchor according to embodiments of the present disclosure.

FIG. 20 shows a ratchet portion 1530 of the anchor 1501 according to embodiments of the present disclosure. The ratchet portion 1530 comprises a detent 1532 supported by a flexible arm 1534. When the anchor 1501 is installed between a window and an automated window mechanism the detent 1532 interacts with the toothed region 1526 shown in FIG. 19. The flexible arm 1534 allows the detent 1532 to deflect when it is moved along the toothed region 1526. The detent 1532 and toothed region 1526 provides some resistance to movement of the track 1522 relative to the anchor 1501. In some embodiments the profile of the detent 1532 and toothed region 1526 allow one-way movement only, similar to a zip tie. In other embodiments the detent 1532 allows the keyed anchor to move back and forth, but providing some resistance allows the keyed anchor to hold the components in place unless a sufficient force is applied to move them. In some embodiments the toothed region 1526 and detent 1532 require five pounds of pressure before moving.

The flexible arm 1534 and detent 1532 can be integral to the mechanism piece 1508 which can be made of a flexible material such as plastic. The mechanism piece 1508 can be molded or otherwise formed to define a three-sided perimeter around the flexible arm 1534. The is arrangement allows the flexible arm 1534 to move up and down as needed when the anchor 1501 slides relative to the automated window mechanism.

Figure 21:
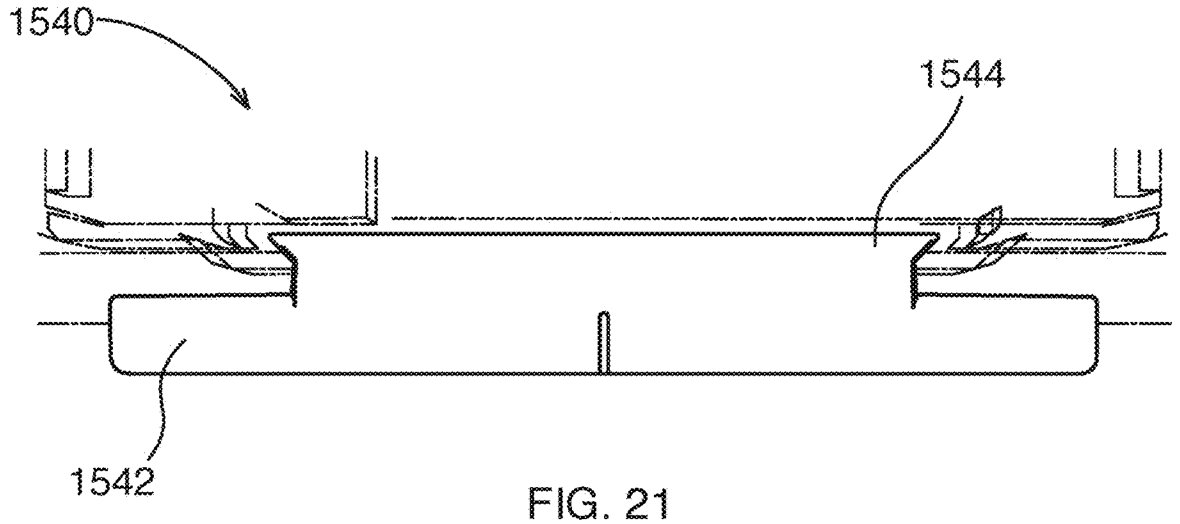
FIG. 21 shows a center alignment member according to embodiments of the present disclosure.

FIG. 21 shows a center alignment member 1540 according to embodiments of the present disclosure. The center alignment member 1540 has a base member 1542 and an interlocking protrusion 1544 that extends upward from the base member 1542 and has a keyed, interlocking profile similar to the protrusions 1520 of the mechanism piece 1508. The automatic window mechanism 1500 of the present disclosure can include a track on an underside that can receive the interlocking protrusion 1544 and allow the automatic window mechanism 1500 to slide along the interlocking protrusion 1544 in the transverse direction to align the automatic window mechanism 1500 relative to the window.

Figure 22:
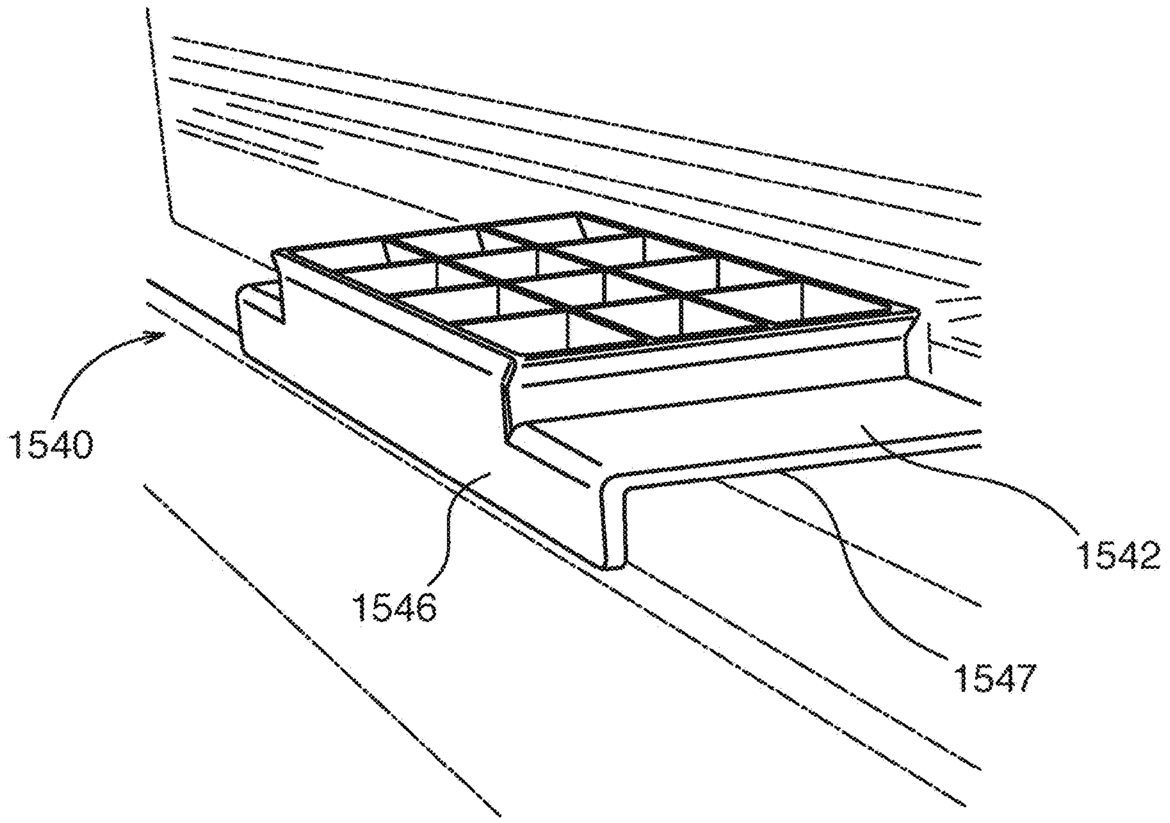
FIG. 22 is an isometric view of the center alignment member according to embodiments of the present disclosure.

FIG. 22 is an isometric view of the center alignment member 1540 according to embodiments of the present disclosure. The center alignment member 1540 has a lip 1546 and a base member 1542 similar to the window piece 1510 and interfaces with the window in a similar manner as well. The anchors 1501 of the present disclosure accordingly allow the automatic window mechanism 1500 to be aligned with the window for ease of installation and use. The anchors 1501 prevent the automatic window mechanism 1500 to move upward away from the window and ensure that movement of the automatic window mechanism 1500 causes movement of the window in the frame. Furthermore, the anchors 1501 and center alignment member 1540 allow movement along the keyed protrusions of the various pieces.

The anchors 1501 and center alignment member 1540 can be used to install the automated window mechanism 1500 to a portion of the window or window frame. The anchors 1501 and center alignment member 1540 have certain dimensions and proportions that are chosen according to a certain desired placement of the automated window mechanism 1500 relative to a window and frame. Referring to FIG. 22, the center alignment member 1540 can be placed onto the window with the base member 1542 flat against a top surface of the window with the lip 1546 against a front surface of the window. Similarly, as shown to advantage in FIG. 18, the anchors 1501 can be placed against the window with a base member 1511 flat against the top of the window and a lip 1518 against the front. The same procedure can be used in a horizontally sliding window, in which case the center alignment member 1540 and anchors 1501 can be held in place using an adhesive, suction, or any other suitable temporary or permanent attachment means.

With the lips and base members of the anchors 1501 and center alignment member 1540 in place relative to the window edge, the protrusions 1520 are in a desired location for installing the automated window mechanism 100, which can be keyed onto the protrusions on the center alignment member 1540 by moving the automated window mechanism 1500 transversely toward the window. The mechanism piece 1508 can also be keyedly engaged in a similar way. The top portion of the mechanism piece 1508 can then engage the telescoping arms of the automated window mechanism 1500 to keyedly engage in a parallel direction generally parallel with the edge of the window frame.

The anchors 1501 can include rack-engaging components 1547 that contact racks 220 (refer to FIGS. 2A and 2B). The rack-engaging components 1547 align the automated window mechanism 1500 with the racks 220. The automated window mechanism 1500 can be keyedly secured to the center alignment member 1540 and the mechanism piece 1508 (aka the end alignment members) to ensure the transmission components of the automated window mechanism 1500 (such as a gear) are properly aligned with the racks.

Accordingly, the anchors 1501 and center alignment member 1540 provide installation guidance and alignment to the automated window mechanism 100. The installer need not measure, cut, or align the pieces. With the anchors 1501 aligned with the telescoping arms, the automated window mechanism 1500 can operate without binding, twisting, or any other undue and unwanted torques or forces in the mechanism.

Figure 23:
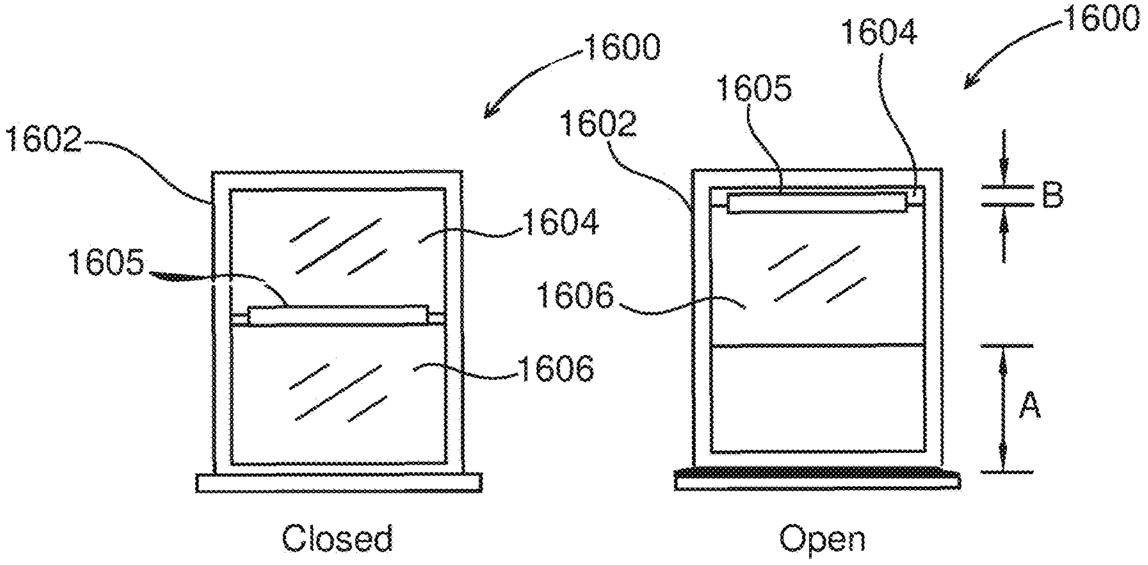
FIG. 23 illustrates a window for use with an automated window mechanism according to the present disclosure.

FIG. 23 illustrates a window 1600 for use with an automated window mechanism according to the present disclosure. The window 1600 includes a frame 1602, a bottom panel 1606, and a top panel 1604. The window 1600 has installed an automated window mechanism 1605 that is in this embodiment coupled to an upper frame of the lower panel 1606.

The window 1600 is shown in two states: closed, in which case the top panel 1604 and bottom panel 1606 do not overlap and each covers a portion of the window 1600; and open in which case the bottom panel 1606 has been raised and covers a portion of the top panel 1604. Referring to the window 1600 in the open state, the lower panel 1606 has been raised up a distance A, leaving a small remainder distance B above the window. The distance B represents a distance the lower panel 1606 may yet travel to open the window 1600 even further.

In other embodiments the window 1600 can have a different configuration, resulting in a different definition of open and closed. It is to be appreciated that features of the present disclosure described herein can be equally applied to windows having different configurations, such as a different number of panels, a horizontally moving window, etc. The window 1600 can also be replaced by another type of sliding segment such as a sliding door or shower panel or any other suitable type of movable panel that can be used with the automated window mechanism 1605 of the present disclosure. Furthermore, in some embodiments the top panel 1604 may carry the automated window mechanism 1605. In yet other embodiments both panels may carry an automated window mechanism that can operate independently or in concert to move the top panel 1604 and bottom panel 1606.

Figure 24:
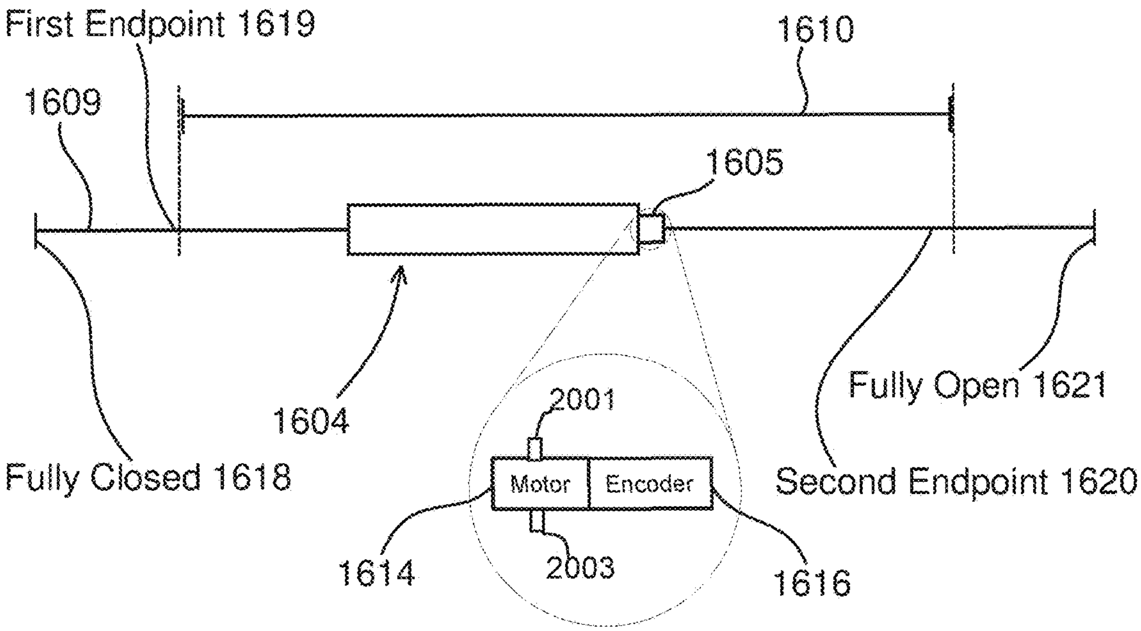
FIG. 24 is a schematic depiction of a linear path for a moving portion of a window.

FIG. 24 is a schematic depiction of a linear path 1609 for a moving portion of a window 1600. In the embodiment shown in FIG. 23, the moving portion is the bottom panel 1606 without loss of generality. The bottom panel 1606 has an automated window mechanism 1605 attached that moves the bottom panel 1606 along the path 1609. The path 1609 is defined by a fully closed position 1608 and a fully open position at 1621, defining the limits of possible movement of the bottom panel 1606 along the path 1609 as defined by the geometry of the frame itself. Windows are irregular, however, and may or may not be able to move from the fully open position 1621 to the fully closed position 1618. The path 1609 includes first end point 1619 and second end point 1620 which are defined as the actually movable path for the bottom panel 1606 to move along the path 1609. In some embodiments the bottom panel 1606 will be able to reach the fully open position 1621 and the fully closed position 1618 in which case the first end point 1619 coincides with the fully closed position 1618 and the second end point 1620 coincides with the fully open position 1621. Once the first end point 1619 and second end point 1620 have been identified, the actual path of motion 1610 for the bottom panel 1606 is defined. The automated window mechanism 1605 can therefore be calibrated to use the actual path of motion 1610 to define when the bottom panel 1606 is fully open and fully closed.

In order to determine the first end point 1619 and the second end point 1620, the following procedure can be executed. The automated window mechanism 1605 comprises a motor 1614 with a positive lead 2001 and a negative lead 2003 and comprises an encoder 1616. The encoder 1616 can record the position of the automated window mechanism 1605 by recording movement of the automated window mechanism 1605. Upon installing the automated window mechanism 1605, a calibration operation can be initiated using digital controls which may be initiated using a remote device or by a button or switch on the automated window mechanism 1605 itself. Initiating the calibration operation can cause a processor and non-volatile memory on the automated window mechanism 1605 to begin the calibration operation which includes monitoring values noted by the encoder 1616 and/or motor 1614.

In some embodiments the calibration operation is executed by disengaging the motor 1614 while the encoder 1616 remains engaged. Accordingly, the bottom panel 1606 with attached automated window mechanism 1605 can be manually moved along the path 1609. While the bottom panel 1606 is being moved, the encoder 1616 can record two values defining extreme values which correspond to the first end point 1619 and the second end point 1620. Once the user is satisfied that the bottom panel 1606 has been moved as far up and down as desired or possible, the user can instruct the automated window mechanism 1605 that the calibration operation is complete. In response to this instruction the automated window mechanism 1605 can engage the motor 1614 and use the two values as the first end point 1619 and second end point 1620 for purposes of defining the actual path of motion 1610 for the bottom panel 1606. Armed with this information, when requested to open or close the window, the automated window mechanism 1605 actuates the motor 1614 until reaching the first end point 1619 or second end point 1620 at which point the motor 1614 is stopped because the bottom panel 1606 has reached the end of the actual path of motion 1610.

The calibration operation can be executed at any desired time, such as to define new open and closed positions. For example, suppose the user has a pet who is prone to escape through an open window. The user can calibrate the window to open only a small amount to prevent escape.

In other embodiments the calibration operation can be executed using the motor 1614 to move the bottom panel 1606 along the path 1609 in order to define the first end point 1619 and second end point 1620. Upon receiving an instruction to calibrate, the motor 1614 can be used to move the bottom panel 1606 up and down. The limit of movement can be defined at points at which the motor 1614 meets sufficient resistance to conclude that the extent has been reached. In some embodiments the motor 1614 can have a predetermined current level and if the motor begins to draw more than the predetermined current level the extent has been reached. In some embodiments the encoder 1616 can also be used in addition to motor parameters to define the end points. For example, in order to conclude that the end point (first or second) has been reached, the encoder 1616 would report the bottom panel 1606 is no longer moving. This information in addition to the motor parameter (which may include current or any other motor parameter) is used to conclude that the end point has been reached.

In some embodiments the motor 1614 of the automated window mechanism 1605 can be used to execute the calibration. In this case the end points are defined according to physical limits of movement of the window. The user can give an instruction to the automated window mechanism 1605 to calibrate using the motor 1614. The motor 1614 can move in a first direction until it encounters sufficient resistance to conclude that a first physical limit has been reached. The automated window mechanism 1605 can record the current position using the encoder 1616 and set it as the first end point 1619. Then the motor 1614 moves in the opposite direction until it encounters sufficient resistance to conclude that a second physical limit has been reached. The automated window mechanism 1605 can record the current position using the encoder 1616 and set it as the second end point 1620. The automated window mechanism 1605 can alert the user that the calibration is complete by emitting a sound, a light, or other notification.

The resistance that defines physical limits can be determined using motor parameters such as current drawn, wattage, or any other suitable motor parameter. In other embodiments the resistance is measured using physical measurements such as stress and strain on components in a transmission between the motor 1614 and a rack or other such mechanism used to move the window. The amount of resistance can be set low enough to avoid injury to persons or objects.

Figure 25:
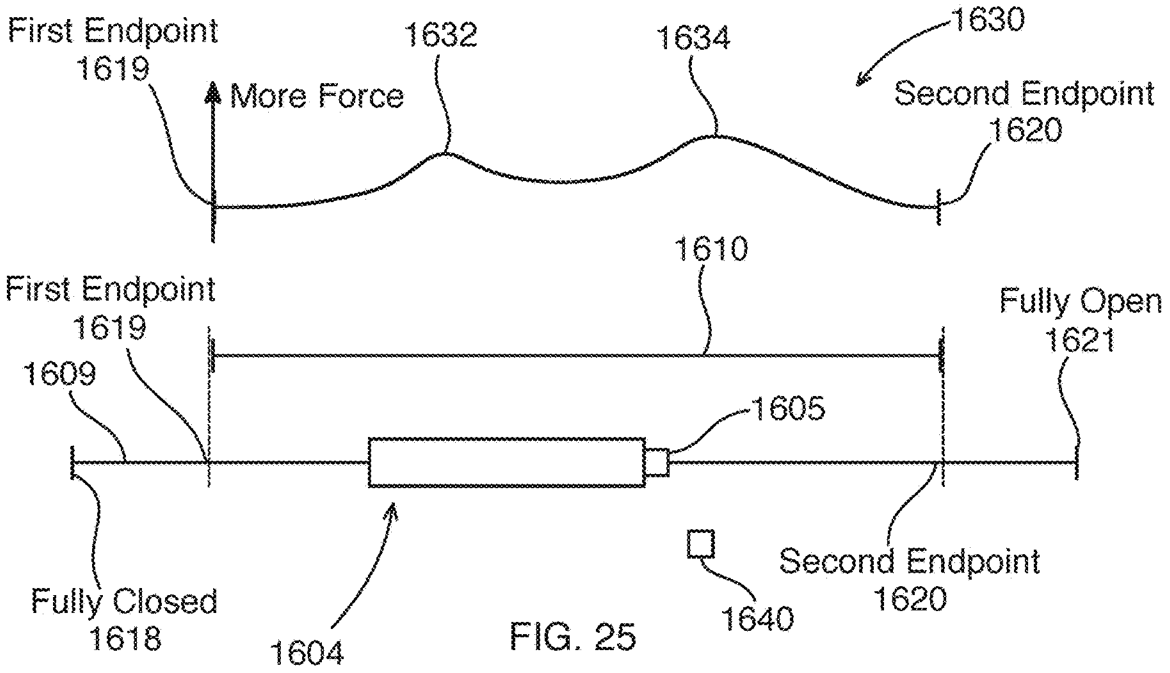
FIG. 25 is a schematic illustration of a force map according to embodiments of the present disclosure.

FIG. 25 is a schematic illustration of a force map 1630 according to embodiments of the present disclosure. The force map 1630 comprises a plot of force required to move the bottom panel 1606 between the first end point 1619 and second end point 1620. The force map 1630 can be used with the actual path of motion 1610, or it can be used between the fully closed position 1618 and fully open position 1621 without calibrating.

An automated window mechanism 1605 can plot the force map 1630 using the following procedure. The automated window mechanism 1605 can move between the endpoints (whether defined by a fully closed or open position, or by a calibrated end point) and as it moves, the automated window mechanism 1605 records the force required to move as a function of position along the path 1609 (or the actual path of motion 1610 if calibrated and using end points). The force can be plotted using any desired number of discrete points along the path 1609. In some embodiments there are a sufficiently high number of points that the force map 1630 is effectively a continuous line. The force map 1630 pictured in FIG. 25 is shown as one of infinitely many example plots. This force map 1630 has a first peak 1632 and a second peak 1634, and valleys between. It is to be understood that windows differ greatly in an amount of force required to move and that a force map 1630 for each window may be unique.

The automated window mechanism 1605 stores this force map 1630 and employs the force map 1630 to raise and lower the bottom panel 1606. That is, when an instruction is given to the automated window mechanism 1605 to raise or lower the bottom panel 1606, the automated window mechanism 1605 can identify its position along the path 1609, access in memory the force map 1603, and accordingly instruct a motor (1614 in FIG. 24) to exert a proportional amount of energy to move the bottom panel 1606.

In some embodiments if a sufficiently high slope of the force map 1630 is detected the automated window mechanism 1605 can cause the motor to create momentum by increasing the speed of movement of the bottom panel 1606 to assist with conquering the high peak. In other embodiments the automated window mechanism 1605 can exert pulses of intermittent impact to help overcome a high peak in the force map 1630. In some embodiments the automated window mechanism 1605 can include an impulse motor which can be a setting of the standard motor, or a separate device. The impulse motor can be configured to exert short, high energy pulses to overcome a high peak which may represent a sticking point in the path of the window.

In some embodiments the force map 1630 can be updated from time to time such that the force map 1630 remains accurate. To update the force map 1630 the automated window mechanism 1605 can be instructed manually to make the movements and calculations again. In other embodiments the updates can be on a schedule such as a weekly schedule. In other embodiments an update can be initiated by the automated window mechanism 1605 automatically upon detecting certain motor parameters. For example, if the automated window mechanism 1605 detects that the speed at which an open or close instruction is executed has become slower or faster than it has been in the past, the force map 1630 can be updated accordingly. Other motor parameters include current, temperature, etc. that can be used to conclude that the force map 1630 needs to be updated.

In other embodiments a condition sensor 1640 can be used in connection with the automated window mechanism 1605 to improve the force map 1630. The condition sensor 1640 can be part of the automated window mechanism 1605, or separate. The condition sensor 1640 can represent a plurality of such condition sensors. The condition sensors 1640 can represent temperature sensors, humidity sensors, weather sensors such as rain sensors, and any other condition-identifying sensor that may have a bearing on the force map 1630.

Figure 26:
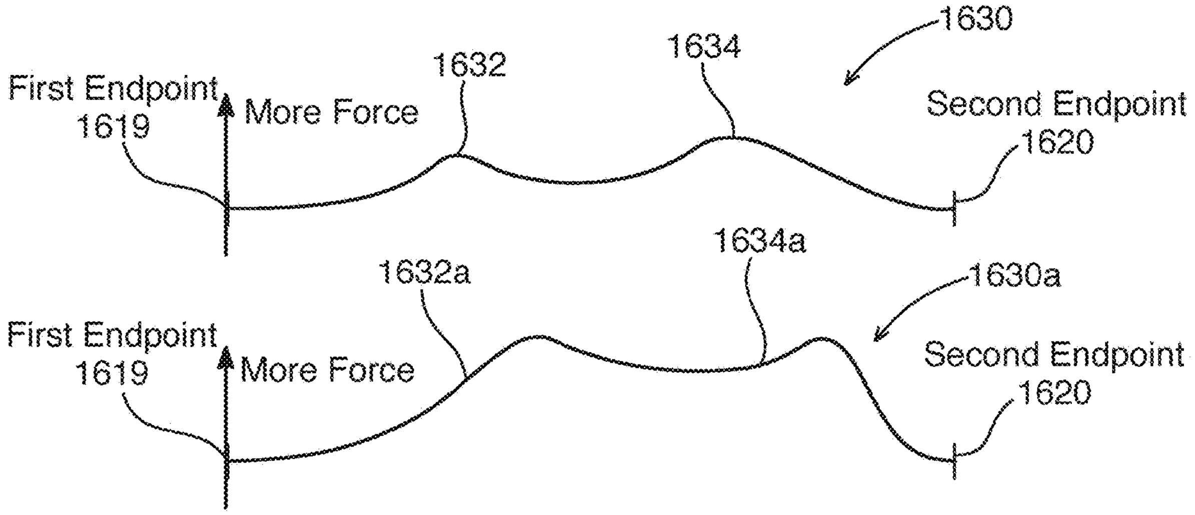
FIG. 26 shows the force map of FIG. 25 reproduced, and a second force map, which represents a deviation from the force map accounting for the different conditions according to embodiments of the present disclosure.

As conditions change, so may the force map 1630. FIG. 26 shows the force map 1630 of FIG. 25 reproduced, and a second force map 1630*a*; which represents a deviation from the force map 1630 accounting for the different conditions.

For example, in cold weather it is more likely that more energy is required to move the automated window mechanism 1605 along the path 1609. Peaks 1632*a* and 1634*a* are higher and further to the right toward the second end point 1620. It is to be appreciated that there is an infinite number of possible force maps and those shown here are for purposes of illustration and not limitation.

In some embodiments the condition sensors 1640 can determine that a sufficiently high change in conditions has occurred and therefore can initiate an update to the force map 1630. The automated window mechanism 1605 can record force maps according to the measured conditions and can employ the force map pertaining to a given set of conditions if and when the conditions arise again. To illustrate an example, consider a simple example of a summer force map and a winter force map. The automated window mechanism 1605 can select which force map to employ based on information from the condition sensors 1640. There may be any suitable number of force maps stored in memory that can be retrieved and employed as often as desired. In some embodiments each time the automated window mechanism 1605 is instructed to move in any way a proper force map can be identified and employed. In some embodiments a closest force map can be identified and employed. If a sufficient deviation between the current conditions based on the conditions sensors 1640 is identified, a new force map can be recorded during movement of the automated window mechanism 1605.

Figure 27:
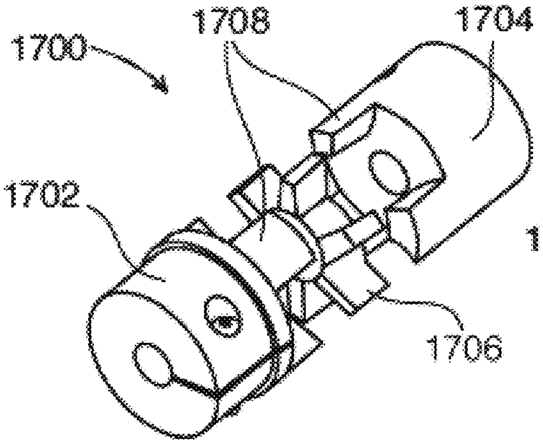
FIG. 27 is an isometric view of a coupled axial clutch that can be used with the automated window mechanisms shown and described herein.

FIG. 27 is an isometric view of a coupled axial clutch 1700 that can be used with the automated window mechanisms shown and described herein. The coupled axial clutch 1700 can be placed at any point on a shaft used by the automated window mechanism 1605 to transmit torque to the gears, pulleys, or other mechanisms used to move windows according to embodiments shown and described herein. The coupled axial clutch 1700 can be selectively engaged or disengaged by axial movement of portions of the coupled axial clutch 1700. In some embodiments the coupled axial clutch 1700 comprises a first component 1702, a second component 1704, and a coupler 1706 shaped to fit between the first component 1702 and second component 1704. The first component 1702 and second components 1704 each have teeth 1708 protruding axially toward one another. The coupler 1706 also has teeth and are shaped to engage the teeth 1708 such that moving the first component 1702 and second component toward one another causes the teeth to engage and torque to be transmitted along the coupled axial clutch 1700.

Figure 28:
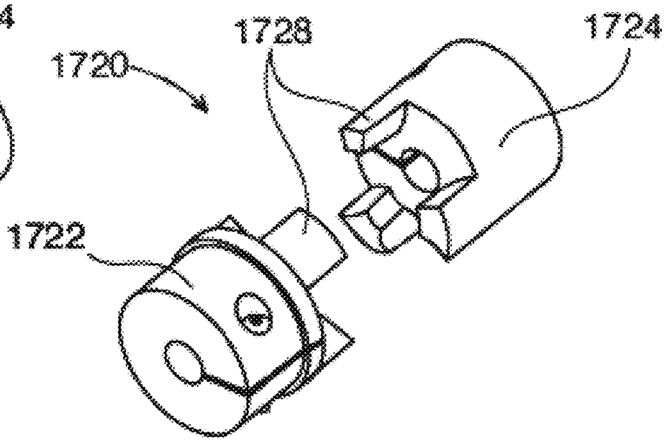
FIG. 28 shows another embodiment of an axial clutch having first component and second component which each have teeth and without a coupler.

FIG. 28 shows another embodiment of an axial clutch 1720 having first component 1722 and second component 1724 which each have teeth 1728, but there is no coupler. The teeth 1728 of the axial clutch 1720 engage directly with one another. The systems, devices, and methods of the present disclosure can be applied to either type of axial clutch: coupled or uncoupled. For purposes of brevity and conciseness, reference will be made to the axial clutch 1720 without loss of generality.

Figure 29:
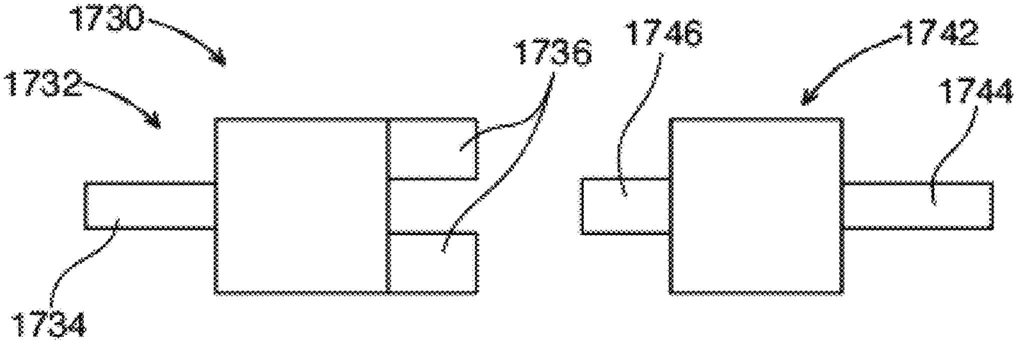
FIG. 29 is a side view of an axial clutch according to embodiments of the present disclosure.

FIG. 29 is a side view of an axial clutch 1730 according to embodiments of the present disclosure. The axial clutch 1730 includes a first component 1732 having a first shaft 1734 and first teeth 1736. The axial clutch 1730 also includes a second component 1742 having a second shaft 1744 and second teeth 1746. Axial movement of the first component 1732 and second component 1742 toward one another will cause the first teeth 1736 to engage with the second teeth 1746. With the teeth engaged the axial clutch can transmit torque which is used by the automated window mechanism 1605 to open and close a window. Rotational movement and axial movement of the first component 1732 and/or the second component 1742 can be accomplished via a motor shown and described elsewhere herein. In some embodiments one of the first component 1732 and second component 1742 are capable of being rotated and/or moved axially. In other embodiments both the first component 1732 and second component 1742 are capable of being rotated and/or moved axially.

Figure 30:
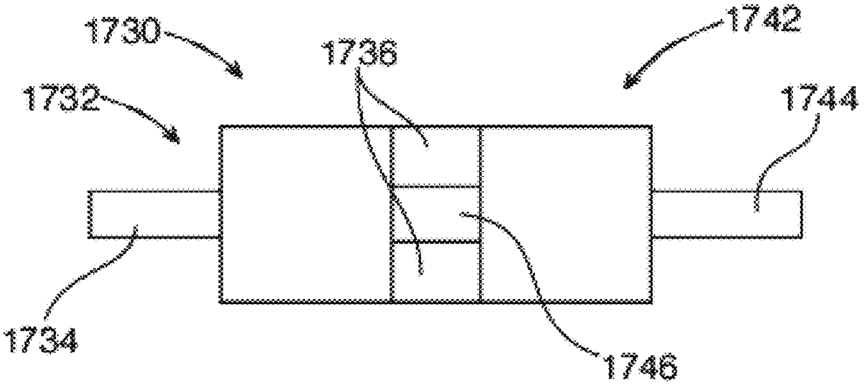
FIG. 30 shows the axial clutch of FIG. 29 after axial movement causes engagement between teeth and teeth according to embodiments of the present disclosure.

FIG. 30 shows the axial clutch 1730 of FIG. 29 after axial movement causes engagement between teeth 1736 and teeth 1746. With the teeth so engaged the axial clutch 1730 can transmit torque to perform useful work such as raising or lowering an automated window.

The polar position of the first teeth 1736 and second teeth 1746 as measured around an axis parallel with the shafts 1734, 1744 as shown in FIGS. 29 and 30 has the teeth aligned and the engagement can take place. If, however, the teeth are not aligned with one another, the teeth may not engage. In certain embodiments one of the first component 1732 and second component 1742 can be rotationally oscillated until the teeth are in position to engage. The oscillation can be caused by the motor (not shown) that actuates the axial clutch 1730. In some embodiments the oscillation can be repeated, back and forth rotation of the first component 1732, the second component 1742, or both the first and second components. In some embodiments the magnitude of movement of the oscillation as measured in a circumferential dimension is approximately equal to or slightly greater than a circumferential dimension of the teeth 1736, 1746. Oscillating the teeth by a circumferential distance equal to or slightly greater than the circumferential width of the teeth ensures that the teeth 1736, 1746 will merge. In some embodiments where both the first component 1732 and the second component 1742 are oscillated, each can be oscillated by approximately half the circumferential width of the teeth. The oscillation can be cyclical, achieving a back-and-forth rotation to encourage the front faces of the teeth 1736, 1746 from sticking.

In some embodiments the oscillation can be executed when the axial clutch 1730 is activated without measuring for interference of the teeth. In other embodiments the axial movement can be monitored for interference, and if there is interference the oscillation can be initiated. There are many ways in which the motor can determine whether or not the axial clutch 1730 has been properly engaged, such as measuring position of the first component 1732 and second component 1742, measuring relative rotation of the first component 1732 and second component 1742, measuring motor parameters such as current or temperature during the axial motion to engage the first component 1732 and second component 1742 or during rotation after moving the first component 1732 and second component 1742 axially toward one another. In some embodiments the axial and oscillation can take place at the same time, causing a spiral motion to encourage proper engagement of the teeth. In some embodiments the oscillation may comprise movement in one rotational direction, and as such may not be oscillation at all, but simply rotation.

Figure 31:
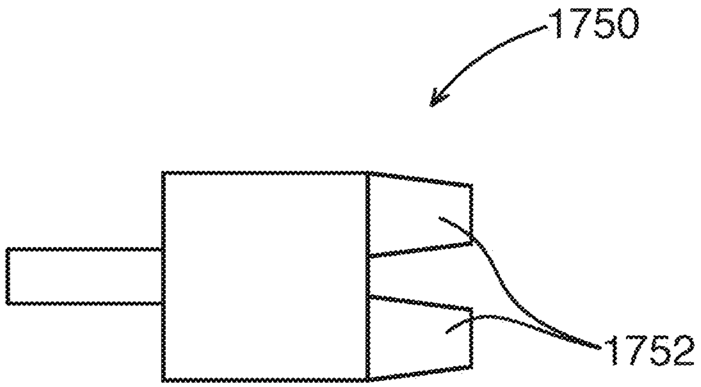
FIG. 31 shows one component of an axial clutch according to further embodiments of the present disclosure in which the teeth are tapered to allow for engagement with corresponding teeth on the other component.

FIG. 31 shows one component 1750 of an axial clutch according to further embodiments of the present disclosure in which the teeth 1752 are tapered to allow for engagement with corresponding teeth on the other component 1750. The degree of taper can be slight such that the radially facing surfaces of the teeth are still able to transmit torque without slipping.

Figure 32:
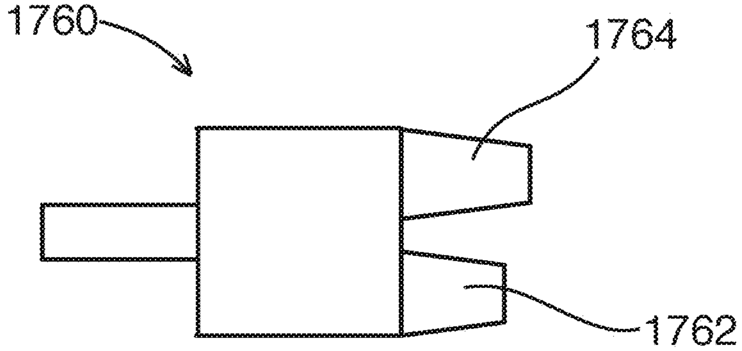
FIG. 32 shows one component of an axial clutch according to embodiments of the present disclosure.

FIG. 32 shows one component 1760 of an axial clutch according to embodiments of the present disclosure. The component 1760 has one tooth 1764 that is longer than another tooth 1762. There may be any suitable number of teeth, and any number of them may be longer than the others. In certain embodiments one tooth is longer to promote proper engagement with corresponding teeth on the other component (not shown).

Figure 33:
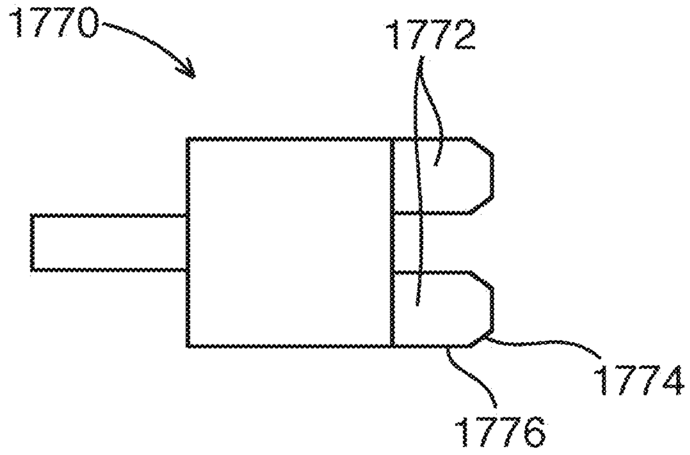
FIG. 33 is an illustration of an axial clutch and clutch switch assembly according to embodiments of the present disclosure.

FIG. 33 shows one component 1770 of an axial clutch according to further embodiments of the present disclosure. The component 1770 has teeth 1772 that each have a tapered leading surface 1774 and a flat surface 1776. The tapered surface 1774 promotes proper engagement with the other component, and the flat surface 1776 transfers torque without slipping that may be associated with a tapered surface.

These features of the teeth shown in FIGS. 29-33 can be found in various combinations of embodiments. For example, in one embodiment there may be teeth having a tapered leading surface, and one or more of the teeth may be longer than the others. Any suitable combination of these features can be employed in various embodiments.

Figure 34:
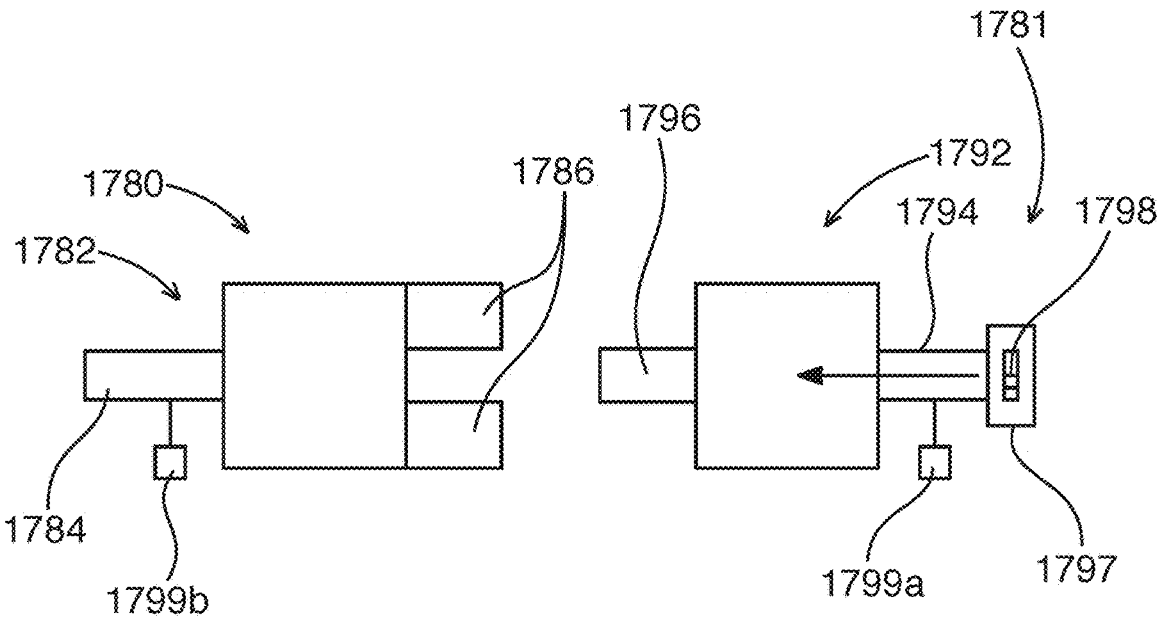
FIG. 34 is an illustration of an axial clutch and clutch switch assembly according to embodiments of the present disclosure.

FIG. 34 is an illustration of an axial clutch 1780 and clutch switch assembly 1781 according to embodiments of the present disclosure. The axial clutch 1780 includes components generally similar to those of other axial clutches shown and described herein, such as first component 1782 and second component 1792. The first component 1782 includes a shaft 1784 and teeth 1786. The second component 1792 includes a shaft 1794 and teeth 1796. The axial clutch 1780 operates by moving the first component 1782 and second component 1792 together to engage the teeth 1786 and 1796. With the teeth engaged torque can be transmitted through the axial clutch 1780 to raise and lower a window to which the axial clutch 1780 is coupled.

The clutch switch assembly 1781 includes a clutch actuator 1797 coupled to the shaft 1794. The clutch actuator 1797 is configured to move the second component 1792 toward and away from the first component 1782 to engage and disengage them. The clutch actuator 1797 may comprise a solenoid, a magnet, a motor, or any other suitable mechanism to actuate the axial clutch 1780 by axial movement. The clutch actuator 1797 may be coupled to the shaft 1794 or the second component 1792. In some embodiments the clutch actuator 1797 may be coupled to the first component 1782. In some embodiments each component has a clutch actuator 1797. In some embodiments the clutch actuator 1797 is configured to execute the oscillations discussed above with respect to FIGS. 29-32.

The clutch switch assembly 1781 also includes encoders **1799*a* and 1799*b* that are coupled to the one or both the first component 1782 or the second component 1792. In some embodiments the encoder comprises a single encoder 1799*a* attached to the second component 1792 on the same side as the clutch actuator 1797. In other embodiments the encoder comprises a single encoder 1799*b* attached to the first component 1782 opposite the clutch actuator 1797. The encoders 1799*a* and 1799*b* may be referred to collectively herein as the encoder 1799 or the encoders 1799. The encoders 1799 are configured to monitor axial and/or rotational movement of the components relative to one another. The encoder 1799 plays a role in calibrating the automated window mechanism shown and discussed above with respect to FIGS. 23-26. The rotational position of the axial clutch 1780** can be mapped to the position of the window segment moved during calibration.

The clutch switch assembly 1781 also includes a switch 1798 shown here coupled to the clutch actuator 1797 and operable to engage or disengage the clutch actuator 1797 from the axial clutch 1780. A user can manually operate the switch 1798, or it can be operated automatically using signals from the controller or from a remote device according to embodiments of the present disclosure. Operating the switch 1789 renders the clutch actuator 1797 unable to engage the axial clutch 1780, so that the window may be raised and lowered without the axial clutch 1797 interfering. A user can operate the switch 1789 to move the window by hand for any desired reason. The switch 1798 can include a timer after which time the switch 1798 returns to the engaged position such that the window can be raised and lowered using the motor (not shown) and axial clutch 1780 to do so. The timer may include a schedule that the user can input or customize as desired.

The encoder 1799 remains operational regardless of the position of the switch 1798. By so doing, the encoder 1799 maintains the calibration of the automated window mechanism regardless of the switch 1798 coupling or uncoupling the clutch actuator 1797. A user can disengage the clutch switch 1798, move the window up and down however they like, and upon flipping the switch 1798 again the motor is once again engaged and due to the calibration still contains end points for movement.

In some embodiments the encoder **1799*b* is opposite the motor and is on the same side as the window. Rotation of the second component 1792 while the axial clutch 1780 is not engaged does not affect the position of the window and is not monitored by the encoder 1799*b*, so the encoder 1799*b* can remain engaged and monitoring rotational position of the first component 1782. In other embodiments the encoder 1799*a* is attached to the motor side, opposite the window side. Accordingly, the encoder 1799*a* can be configured to selectively monitor position of the second component 1792, such that the encoder 1799*a* records movement for purposes of maintaining the calibration end points only when the axial clutch 1780 is engaged. If for any reason the axial clutch 1780 is not engaged the encoder 1799*a* does not record movement. Accordingly, the calibration end points are maintained regardless of using the switch 1798 to render the clutch actuator 1797** inoperable.

In some embodiments the encoder 1799 can account for rotational deviation caused by the oscillations described above. In some embodiments the encoder 1799 can maintain an oscillation zero point to which the axial clutch 1780 can return after the oscillations are complete and the axial clutch 1780 is engaged. In other embodiments the encoder 1799 can monitor the position of the axial clutch 1780 throughout the oscillations and therefore no return to zero point is required.

The clutch switch assembly 1781 also operates as a lock. With the switch 1798 in the engaged position, and axial clutch 1780 engaged, the motor (not shown) will prevent the window from moving unless the motor receives specific instruction to move to raise or lower the window. It is to be appreciated that the axial clutch 1780 can be placed at any point along a power transmission mechanism between a motor and the window.

The calibration can result in any arbitrary limits on window movement which can be useful to define window movement limits. In some cases, these limits are not based on a physical limitation but rather on a desired limit. If the clutch switch assembly 1781 is used to release the motor and the window is moved manually outside of the calibration range, that is, beyond the first or second end points in either direction (refer to FIGS. 24-26). The clutch switch assembly 1781 may be reengaged outside of the end points. In this the automated window mechanism 1605 can take one of three possible actions given in no particular order. First, the automated window mechanism 1605 can request a recalibration by issuing a signal to an electronic device, emitting a sound, a light, or a pre-recorded voice message instructing the user to recalibrate. Second, the automated window mechanism 1605 can move back into the calibration range by calculating a distance from the nearest end point, and by moving the window that distance to reach the nearest end point. This can be done upon reengaging the clutch switch assembly 1781. Third, the current value can be redefined as the new end point, whether first or second, depending on which is the nearest end point. In this case a notice can be issued to alert the user that the calibration has been reset.

Figure 35:
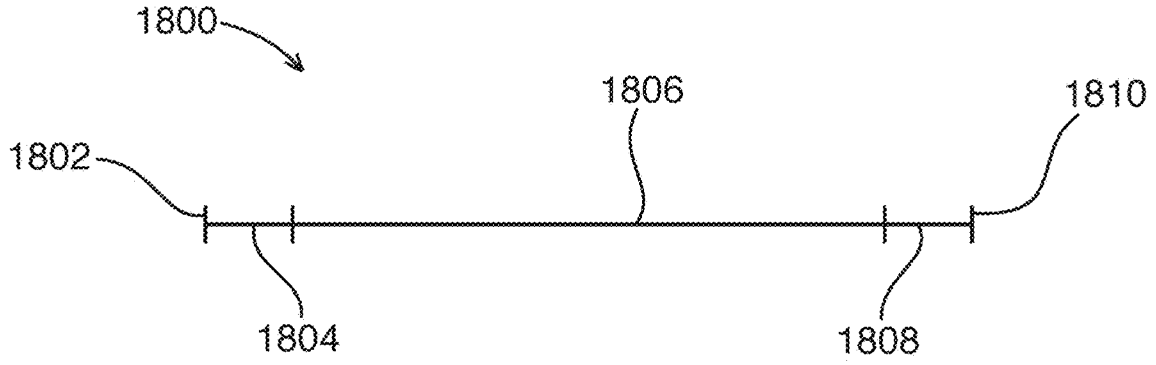
FIG. 35 is a plot of window position according to embodiments of the present disclosure.

FIG. 35 is a plot 1800 of window position according to embodiments of the present disclosure. The plot 1800 can represent distance between end points along an actual path of motion as determining using calibration operations disclosed and shown elsewhere herein. The plot 1800 will be used to describe a feature called "backlash" or "backup." As the window is moved along the path of motion and reaches one of the end points, there may be an obstacle such as the end of the frame or another object physically preventing the window from moving further. Such may be used to define end points according to the calibration. Referring back to the axial clutches shown and described above, at the end points there may be stored energy in the axial clutch between teeth of cooperating components of the clutch. In other embodiments using a different power transmission mechanism there may still be stored energy. For purposes of brevity this discussion will refer to the axial clutch. However, it is to be understood that other transmission mechanisms may be possible and will benefit from the backlash equally.

The stored energy in the axial clutch may present a problem of making it difficult or impossible to release the axial clutch because of friction between the teeth. In order to prevent this, the motor driving the automated window mechanism can be configured to retreat a certain distance, defined as the backlash, when the motor stops. Referring again to the plot 1800, a left extreme 1802 represents the farthest point to the left; a right extreme 1810 represents the farthest point to the right. It is to be appreciated that left and right are used with respect to FIG. 35 and in an actual window the extremes may be up and down, right and left, left and right, or any other possible configuration. The left backlash is at 1804; the right backlash 1808 is at 1808. The path in the middle is at 1806.

The distance of the backlash can be equal to a rotational movement that would begin to exert pressure on the axial clutch in the opposite direction. The backlash can account for any play in the axial clutch. Suppose for example that there are 4 degrees of play in the axial clutch. The backlash can be equal to a rotational movement sufficient to release the stored energy in a first direction, plus the 4 degrees of play in the axial clutch, plus an additional movement to press on the axial clutch in the opposite direction just before the window begins movement in the opposite direction. The backlash may be known in the manufacturing stage and can be built into the controller(s) operating the motor. Accordingly, a move command may include the following steps: engage (or confirm engagement of) axial clutch; operate motor to move window; reach endpoint; reverse movement for backlash. Accordingly, the axial clutch rests without stored energy, allowing for release.

In some embodiments a neutral point can be defined as equal to half the backlash. If the backlash is defined as a distance between moving the window in either direction, the neutral point is halfway between backlash end points.

In some embodiments the motor can be configured to reverse to release energy using the backlash no matter where the window stops. In these embodiments the motor may receive a command to open partway, and upon reaching the desired stopping point, whether or not the window is abutting a frame or other obstacle, the motor can release using backlash. In embodiments in which the window moves horizontally and the weight of the window does not directly bear on the axial clutch, the backlash can be equal in both directions. In embodiments in which the axial clutch bears the weight of the window, the backlash can account for this and release energy using backlash when the motor moves downward and can maintain energy if the movement is upward.

Figure 36:
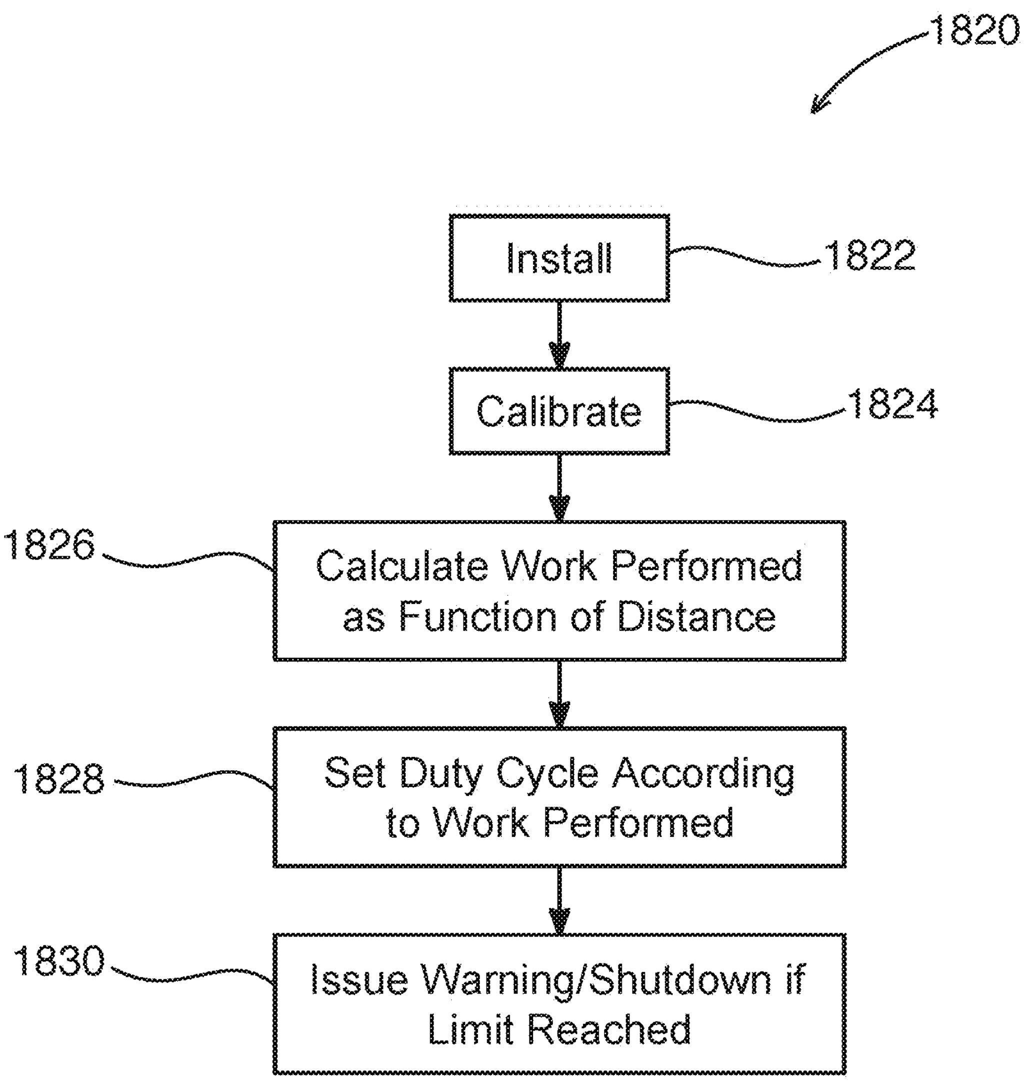
FIG. 36 is a flow chart diagram of a method for determining and implementing an automatic, intelligent duty cycle according to embodiments of the present disclosure.

FIG. 36 is a flow chart diagram of a method 1820 for determining and implementing an automatic, intelligent duty cycle according to embodiments of the present disclosure. A duty cycle is defined as an amount of time a given machine can operate before overheating or reaching some other work-stopping condition. The automatic window mechanisms, motors, actuators, controllers, and transmission mechanisms shown and described herein generate heat when operated, and as with all machinery, too much heat can damage the machinery. One approach to duty cycle is to build in extra capacity such that there are sufficiently heat-dissipating systems that a duty cycle is never met. This approach can lead to machinery that is overqualified and therefore more expensive than could be. This approach also depends on knowing the loads on the system and building accordingly.

The method 1820 of the present disclosure improves on conventional duty cycle methods as will be shown and described herein. At 1822 the automatic window mechanism is installed, and at 1824 it is calibrated according to the calibration operations shown and described herein. A force map may be created. At 1826 a calculation is performed of the actual work performed as a function of distance. The force map may be position-sensitive according to the force map. The higher the force on the force map, the more energy required to move along that portion of the map. By analogy, the work performed is equal to the integral of the force map. The area under the force map curve defines the work performed. At 1828 the duty cycle is set according to the work performed. At 1830 if a limit is reached, a warning can be issued, or a shutdown can be triggered.

Accordingly, the duty cycle is automatic and intelligent, being based upon an actual calculation of work performed at the specific window in question.

Referring back to FIG. 23 which shows a window 1600 in an open state and in a closed state according to embodiments of the present disclosure. The window 1600 includes a lower panel 1606 which moves up and down in response to instructions given to an automated window mechanism 1605 attached to the lower panel 1606. In the open state the lower panel 1606 has a distance A between the lower panel and the frame or sill or another lower boundary. Referring to FIG. 24, a first end point 1619 and second end point 1620 are shown and are defined by calibrating the automated window mechanism 1605 to move between the first and second end points.

The automated window mechanism 1605 of the present disclosure can avoid pinching fingers or any other object or obstacle in the window 1600. The automated window mechanism 1605 can operate in a first state during normal operation and during the intermediate portion of the actual path of motion 1610. Nearing the end points, the automated window mechanism 1605 can enter a second state in which certain precautions are taken and parameters changed to avoid pinching. The region near the end points can bne referred to as a proximate closing zone. The second state can be a reduced state. Operation in the safe or reduced state can include slowing down a rate of movement of the lower panel 1606. In some embodiments the speed of the motor of the automated window mechanism 1605 can be reduced such as by reducing actual rotations per minute of the motor, reducing the electrical current drawn by the motor, or by reducing the voltage to the motor. In embodiments the encoder 1616, which monitors the position of the lower panel 1606 relative to the actual path of motion 1610, can monitor position of the lower panel 1606 relative to the first or second end points. The automated window mechanism 1605 can include a pinch tolerance defined as a distance from one or the other end point at which point the automated window mechanism 1605 enters the second state. When the encoder 1616 determines that the lower panel 1606 has reached the pinch tolerance, the automated window mechanism 1605 can be configured to enter the second state.

In some embodiments another trigger to enter the second state can be any departure greater than a predetermined threshold from the force map. That is, if an unusually large or small force is exerted by the automated window mechanism 1605 that represents too large of a departure from expected, the automated window mechanism 1605 can enter the second state.

During operation, the automated window mechanism 1605 can continuously check the force map and forces. The check can be discrete check instances that can take place on a regular basis, such as every 0.1 second. More or less frequent polling rates are possible. In some embodiments the second state can be defined as a reduced speed. Maintaining the same polling rate, while slowing down movement, results in a higher resolution per unit distance. It effectively increases the resolution. In other embodiments the map can be checked at predetermined time intervals. Moving slower makes for higher resolution. In other embodiments the automated window mechanism can maintain speed and change time intervals. In other embodiments both the speed of the window and the polling rate can be increased during the second state. In other embodiments a tolerance for deviation from the force map can be reduced in the second state. In some embodiments the tolerance for deviation from the force map is a proportional to distance from closed.

In some embodiments the size of the window is accounted for by the calibration. That is, the position of the automated window mechanism 1605 relative to the window component that it is attached to is determined by the calibration. The automated window mechanism 1605 need not know the dimensions of the window—the calibration process described above provides the information sufficient to execute pinch protection precautions. Accordingly, the window 1600 can be opened or closed without undue fear of pinching fingers or any other item in the window.

Figure 37:
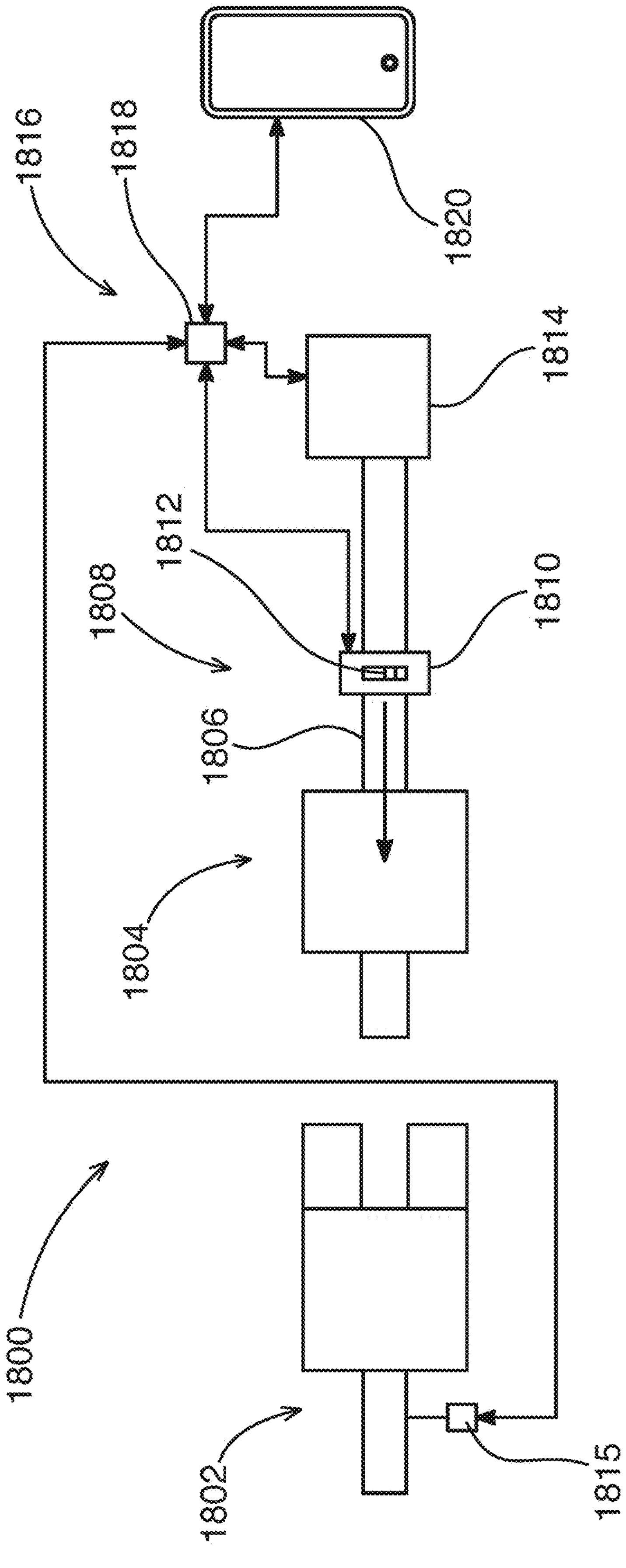
FIG. 37 illustrates a transmission assembly including an axial clutch formed of a first component and a second component and including a tattletale unit according to embodiments of the present disclosure.

FIG. 37 illustrates a transmission assembly 1800 including an axial clutch formed of a first component 1802 and a second component 1804 and including a tattletale unit 1816 according to embodiments of the present disclosure. The axial clutch operates generally similarly to other axial clutches shown and described herein. It is also to be appreciated that in other embodiments a different form of transmission component can be employed with the tattletale unit. The transmission assembly 1800 includes a clutch switch assembly 1808 including a clutch actuator 1810 and a clutch switch 1812 that can engage or disengage the transmission assembly 1800 by manually flipping the clutch switch 1812 or by receiving an electronic instruction to do so from a remote unit. The transmission assembly 1800 may include an encoder 1815 configured to monitor movement of the transmission assembly 1800. The encoder 1815 may be coupled to the window side of the transmission assembly 1800 as shown here. In other embodiments there may be an encoder attached to the motor side as shown in FIG. 33. A motor 1814 is shown attached to a shaft 1806. The motor 1814 provides power to rotate the shaft 1806 and if the transmission assembly is engaged, this will result in the window moving relative to a window frame as shown and described in detail with respect to FIGS. 1 and 2 and other herein.

The tattletale unit 1816 monitors engagement or disengagement of the clutch switch assembly 1808 to inform a user of activity relating to the clutch switch assembly 1808. The tattletale unit 1816 includes a transmitter 1818 that is operatively coupled to the clutch switch assembly 1808 and the motor 1814 and is configured to receive information describing actions of these items. The transmitter 1818 is connected to a remote device 1820 which can include a mobile phone, a smart phone, or a remote server configured to manage such information in a useful way. The tattle tale unit 1816 can record instances of movement of the clutch switch 1812, the clutch actuator, the encoder 1815, or the motor 1814.

The tattletale unit 1816 may include a processor and memory to perform instructions and logic to determine how to report the information to the user. The processor and memory may reside in the transmitter 1818, or in the remote device 1820. The user may instruct the processor and memory to provide information how and when it is desired. In some embodiments a notification can be given any time there is movement in any of the monitored components. In other embodiments a notification can be given only if the window actually moves. In some embodiments the tattletale unit 1816 can issue loud alarm locally to the window to alert those nearby of the movement which may be from a would-be intruder or a would-be escapist. In some embodiments the tattletale unit may store information in an accessible way without providing notifications for certain observed events, so the user can use the stored information after the fact to determine what has happened with the window in a precise way. The tattletale unit 1816 accordingly operates as a security device.

Figure 38:
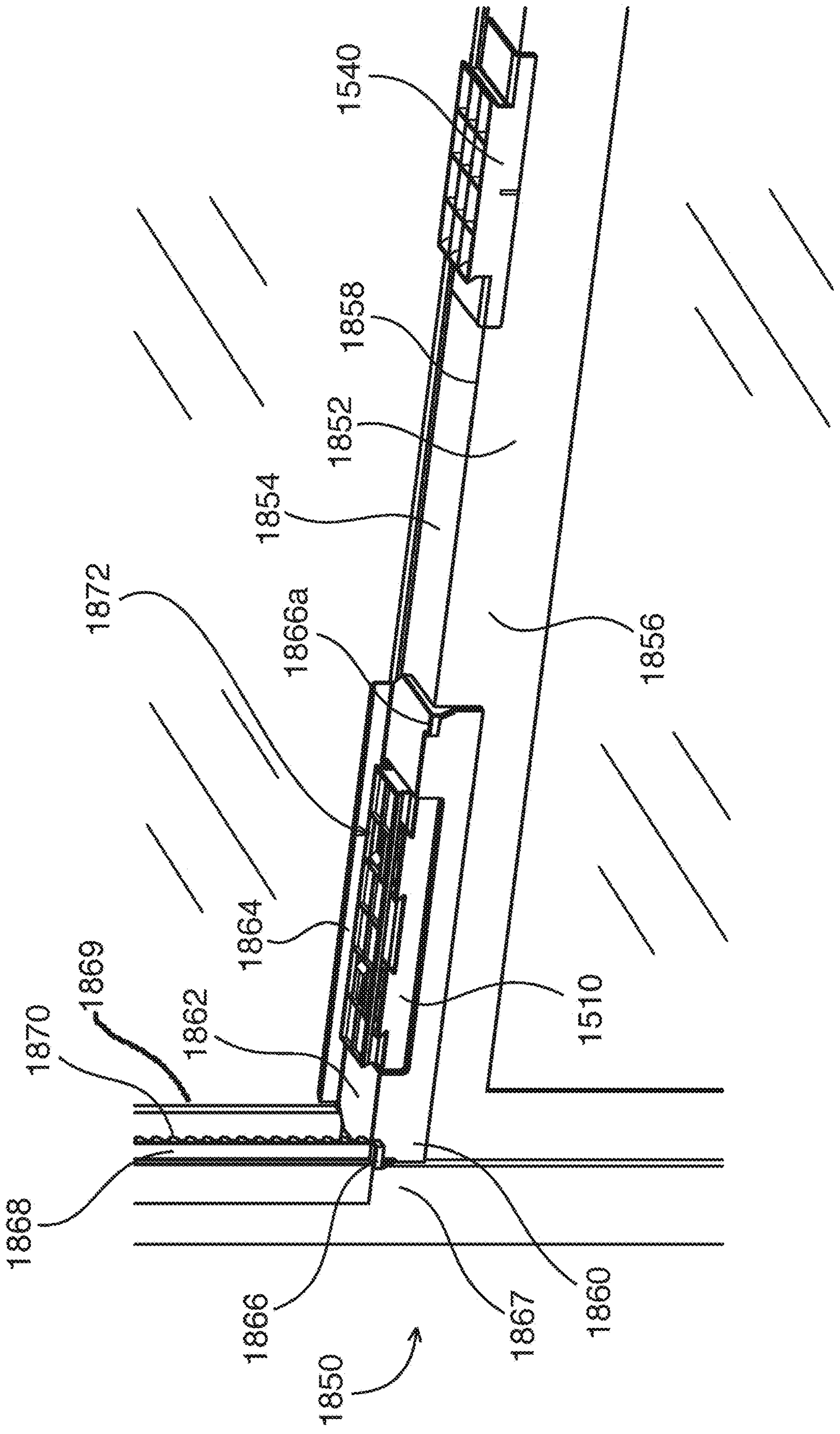
FIG. 38 shows an alignment tool according to embodiments of the present disclosure.

FIG. 38 shows an alignment tool 1850 according to embodiments of the present disclosure. The alignment tool 1850 enables placement of a window piece 1510 shown and described above with respect to FIGS. 16-22. The alignment tool 1850 enables placement of the window piece 1510 with respect to a window 1852. The window 1852 has an outer face 1854, a window front surface 1856, and a window front edge 1858 defined as where the window front surface 1856 and front edge 1858 meet. The alignment tool 1850 has a lip 1860 and a base 1862 similar to the window piece 1510 itself. The alignment tool 1850 may also have a back wall 1864 that extends upwardly from the base 1862. The alignment tool 1850 also has a mounting ledge 1866 that extends outwardly from the base 1862.

As shown and described in greater detail above, the automated window mechanisms of the present disclosure include a rack 1868 having rack teeth 1870. The rack 1868 provides a way for the automated window mechanism to move the window 1852. In some embodiments the alignment tool 1850 is placed onto the window 1852 onto the window front edge 1858 with the alignment tool against a side frame 1867. The side frame 1867 has a parallel surface 1869 that in the shown embodiment is a vertical surface and the movement of the window is vertical. The parallel surface 1869 may be horizontal in a horizontally-oriented window. The lip 1860 and base 1862 can be placed onto the window front edge 1858 as shown. The rack 1868 can then be placed onto the mounting ledge 1866. The dimensions of the alignment tool 1850 ensure that the automated window mechanism, when installed, will mate properly with the teeth 1870 of the rack 1868 both in terms of position relative to the window, and in terms of timing of the gears of the automated window mechanism. The alignment tool 1850 can have a second mounting ledge **1866*a*** on the opposite side that is used for installing on the other side of the window.

The alignment tool 1850 has a void 1872 that defines a placement guide for the window piece 1510. The void 1872 includes one or more anchor-receiving contours. In some embodiments the void 1872 is substantially the same shape as the anchor and receives the anchor 1501 snugly within the anchor-receiving contour. The user simply places the window piece 1510 into the void 1872. An adhesive or other fastening mechanism can secure the window piece 1510 to the window 1852. The alignment tool 1850 can be removed once the rack 1868 and window piece 1510 are in place. The user can then install the automated window mechanism onto the center alignment member 1540 which is shown and described in greater detail in FIGS. 16-22.

In some embodiments of the present disclosure an automated window mechanism is equipped to resist an unauthorized attempt to open the window. In some embodiments the automated window mechanism can render a motor of the automated window mechanism inoperable thereby preventing unauthorized movement of the window. In other embodiments the automated window mechanism can oppose the unauthorized movement to maintain the position of the window before the unauthorized movement began, or to close the window.

Figure 39:
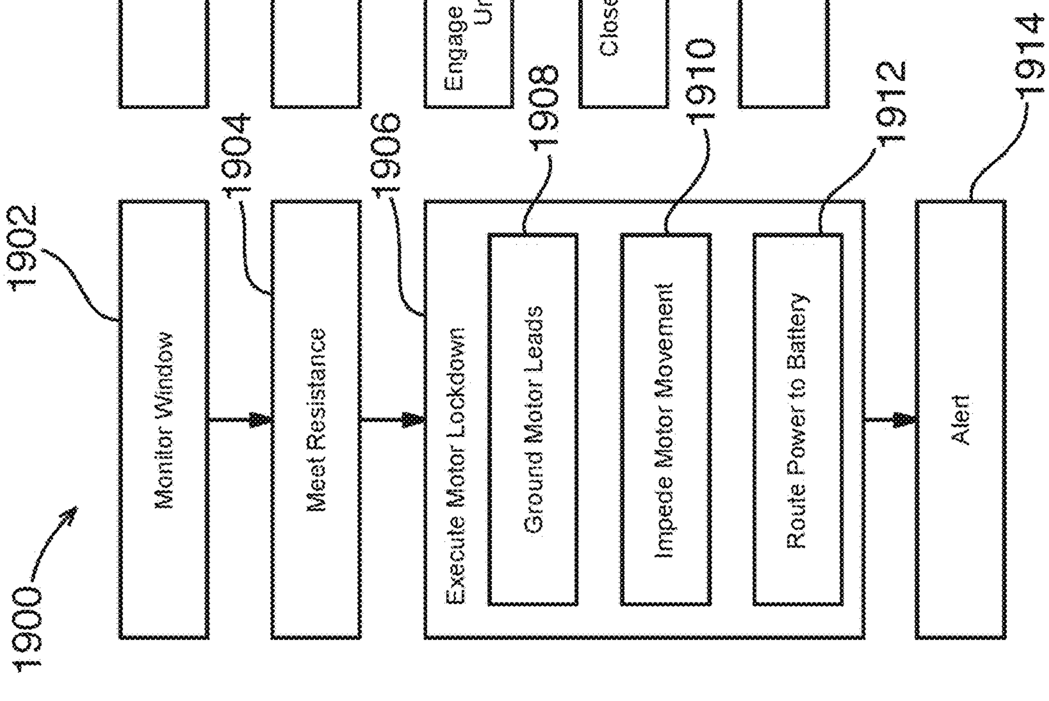
FIG. 39 is a block diagram of a method for executing a window motor lockdown according to embodiments of the present disclosure.

FIG. 39 is a block diagram of a method 1900 for executing a window motor lockdown according to embodiments of the present disclosure. The automated window mechanism can have the ability to monitor the status of the window and the automated window mechanism using one or more of a variety of monitors such as a rotary encoder 730, a position indicator at 742, a position sensor at 740, and a sensor at 810, shown and described herein above at least in FIGS. 7A, 7B, and 8. Any one or more of these components can monitor the window at 1902 of the method 1900. The position of the window can be monitored directly, the position of the motor or components thereof can be monitored, or both the window position and motor position can be monitored. In some embodiments the monitors comprise two or more monitor components such as a first monitor component for monitoring movement in a first direction and a second monitor component for monitoring movement in a second direction. At 1904 the window meets resistance which may be in the form of a blockage, an unexpected attempt to open the window, or any unexpected resistance to movement. The resistance may be encountered during movement or while the window is stationary. In other embodiments the automated window mechanism can be manually operated using buttons that are pressed from an inside of the window, and the absence of such a button being pressed can indicate that the movement is unauthorized. In other embodiments the window can be set to a "locked" status during which any attempts to move the window in either direction (toward open or toward closed) are considered unauthorized. In this locked state all resistances to movement can be met with a reaction. The automated window mechanism can be in motion under power from the motor when the external force is encountered and the reaction can be the same as when the window is stationary. Accordingly the automated window mechanism in the locked state is able to react to any impediment with one or more of these actions.

At 1906 a motor lockdown is executed. The motor lockdown can be one or more of several actions. At 1908 the motor is an electric motor having a positive and a negative terminal, and grounding these two terminals to the same potential energy renders the motor inoperative. The connection of the automated window mechanism to the window and/or window frame is maintained by the gear(s) and driveshaft(s) such that the motor's inability to move renders the window incapable of opening. At 1910 the motor lockdown can comprise a physical impediment to the motor's movement and/or movement of other components of the automated window mechanism. The physical impediment can be a clutch or a brake that grasps or blocks one or more moving parts to prevent movement. At 1912 the motor lockdown includes routing power to a battery for storage. The unauthorized movement of the window can be used to turn components of the motor which can then be routed to a battery for storage and later use. Use of the battery in this way can be done in combination with other motor lockdown measures.

At 1914 an alert can be delivered to notify of the unauthorized movement of the window. The alert can be audible and/or visual and can be executed by the automated window mechanism itself, or it can be sent via electronic communication to a remote device such as a phone or a home security system. Accordingly the method 1900 can resist potential theft and burglary by these measures.

Figure 40:
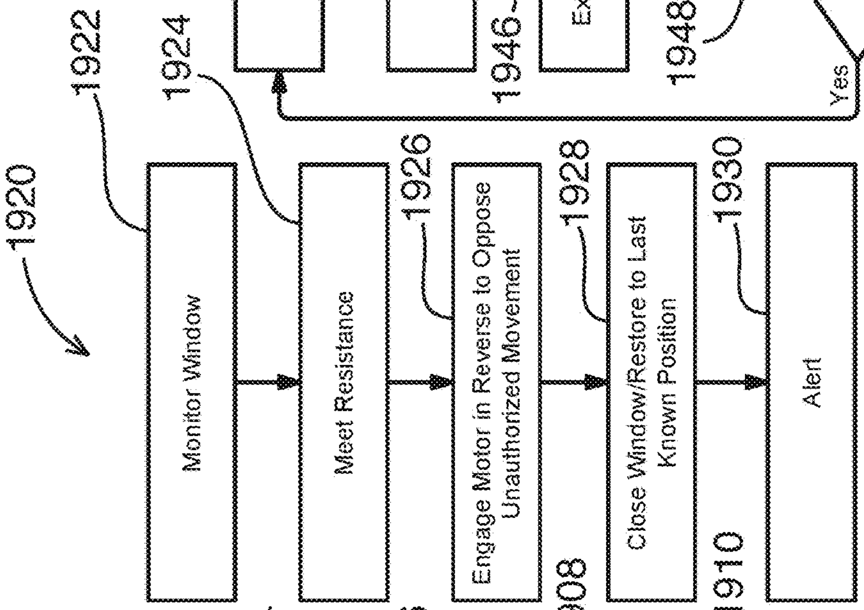
FIG. 40 is a block diagram of a method according to further embodiments of the present disclosure in which an unauthorized movement of a window causes a motor response.

FIG. 40 is a block diagram of a method 1920 according to further embodiments of the present disclosure in which an unauthorized movement of a window causes a motor response. At 1922 the window is monitored and at 1924 the window meets resistance. At 1926 the automated window mechanism can, in response to the resistance, operate in the reverse direction. For example if window were opened by an authorized user to be open two inches. If an unauthorized movement attempt is made to open the window further, the motor can switch on and drive against the opening force to maintain the current position of the window. If the resistance is an unauthorized movement to close the window, the motor can detect this direction of movement and the motor can oppose the closing movement. At 1928 the method can include a further step of moving the window after the unauthorized movement is no longer detected. The window can be moved to return to the previous position, or it can be closed because the unauthorized opening attempt may present a threat and in a preemptive measure the window can close. At 1930 an alert can be delivered to instruct the user of the unauthorized movement, the actions taken by the automated window mechanism, and the current position and lock status of the window.

Figure 41:
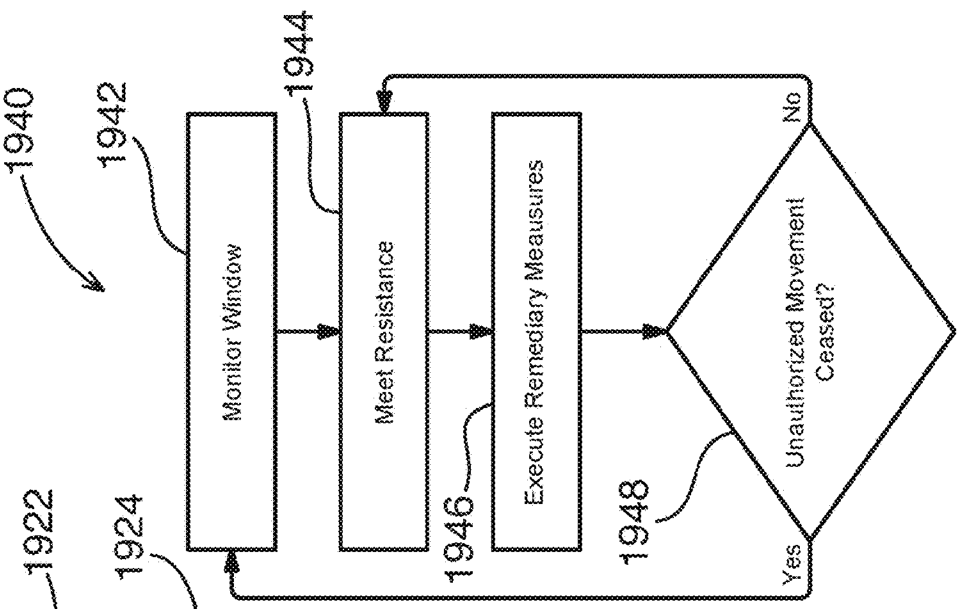
FIG. 41 shows a method for managing unauthorized window movement according to embodiments of the present disclosure.

FIG. 41 shows a method 1940 for managing unauthorized window movement according to embodiments of the present disclosure. The method 1940 includes at 1942 monitoring the window and at 1944 meeting resistance. At 1946 remediary measures can be taken that may include features shown in FIG. 39 involving a motor lockdown and/or in FIG. 40 involving a counter movement of the window. At 1948 the method includes determining whether or not the resistance persists. If it has not, the method returns to 1944. If the resistance has ceased, the method can return to 1942 where the window is monitored for the next unauthorized movement.

The gear ratios of the automated window mechanisms shown and described herein throughout can be chosen so that the mechanical advantage favors the automated window mechanism exerting an opening or closing force on the window, and disfavors the window exerting a force onto the automated window mechanism. Manually grasping and raising or lowering the window is not readily able to rotate the gears and driveshaft(s) of the automated window mechanism. This natural resistance to such an opening or closing movement enables the motor lockdown and motor opposition operations to seize the window in place in the event of an unauthorized movement from an attempted burglary.

The automated window mechanism of the present disclosure can detect an unauthorized movement in one or more of several ways. In some embodiments the incoming instruction to move the window creates a temporary authorization window during which movement of the window and/or the automated window mechanism is not recognized as unauthorized. Any movement outside of the temporary authorization windows is considered unauthorized. In other embodiments the sensing components such as the encoder, position sensor, position indicator or sensor, can detect a movement of the window or automated window mechanism components and can query whether or not an instruction to move has been received recently within the last few seconds. If not, the movement can then be identified as unauthorized.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. An automated window mechanism for a window of a building, the automated window mechanism comprising:

an electric motor configured to connect to a sliding panel of a window and configured to open and close the window by moving the sliding panel relative to a window frame of a building via a drive shaft connected to the electric motor, the electric motor having a locked state, wherein in the locked state, the electric motor and the sliding panel are stationary; and a monitor configured to detect an external force applied to the sliding panel and a direction of the external force while the electric motor is in the locked state, wherein, in response to the monitor detecting the external force while the electric motor is in the locked state, the electric motor applies a counter force in a direction opposite the external force to counteract the external force.

2. The automated window mechanism of claim 1, wherein the monitor comprises an encoder configured to monitor one or more components of the electric motor or the sliding panel.

3. The automated window mechanism of claim 1, wherein the monitor comprises a position sensor configured to monitor a position of one or more components of the electric motor or the sliding panel.

4. The automated window mechanism of claim 1, wherein the monitor comprises the electric motor itself, wherein the external force causes an electromechanical force in the electric motor that the monitor detects.

5. The automated window mechanism of claim 1, wherein the monitor comprises a first monitor component configured to detect a first external force in a first direction and a second monitor component configured to detect a second external force in a second direction opposite the first direction.

6. The automated window mechanism of claim 1, further comprising a processor and a memory storing computer-readable instructions, the processor in communication with the memory and configured to execute the computer-readable instructions to at least:

store in the memory an initial position of the sliding panel at a time of the external force being applied; and after the external force is removed, cause the electric motor to move the sliding panel to the initial position.

7. The automated window mechanism of claim 6, wherein the processor is further configured to, after the external force is applied, cause the electric motor to close the window by moving the sliding panel to a closed position.

8. The automated window mechanism of claim 1, wherein, in response to the monitor detecting the external force while the electric motor is in the locked state, the electric motor moves the sliding panel to an initial position before the external force was applied.

9. The automated window mechanism of claim 1, further comprising a clutch or a brake configured to prevent movement of components of the electric motor, wherein, in response to the monitor detecting the external force while the electric motor is in the locked state, the clutch or the brake prevent movement of the components of the automated window mechanism to counteract the external force.

10. The automated window mechanism of claim 9, further comprising a processor and a memory storing computer-readable instructions, the processor in communication with the memory and configured to execute the computer-readable instructions to at least:

monitor engagement or disengagement of the clutch or the brake; and store data in the memory associated with instances of engagement or disengagement of the clutch or the brake.

11. A method for inhibiting unwanted movement of a sliding panel of a window relative to a window frame of a building with an automated window mechanism having an electric motor connected to the sliding panel of the window, the method comprising:

placing the automated window mechanism into a locked state, wherein in the locked state, the electric motor and the sliding panel are stationary;

while the automated window mechanism is in the locked state, monitoring for an external force applied to the sliding panel; and in response to the external force, opposing the external force via a drive shaft connected to the electric motor by applying power to the electric motor.

12. The method of claim 11, wherein monitoring for the external force comprises monitoring for physical movement of the sliding panel or the electric motor.

13. The method of claim 11, wherein monitoring for the external force comprises monitoring an electrical characteristic in the electric motor.

14. The method of claim 11, wherein monitoring for the external force is performed by one or more of an encoder or a position sensor.

15. The method of claim 11, further comprising, in response to the external force, closing the window by moving the sliding panel to a closed position.

16. The method of claim 11, further comprising determining that application of the external force to the sliding panel is unauthorized based on incoming instructions not having been received within a last predetermined time period.

17. A system for automating a window of a building, the system comprising:

an automated window mechanism comprising an electric motor, the automated window mechanism configured connect to a sliding panel of a window in a window frame of a building, the automated window mechanism configured to open and close the sliding panel of the window via a drive shaft connected to the electric motor, and the automated window mechanism having a locked state, wherein in the locked state, the electric motor and the sliding panel are stationary;

a monitor configured to detect an external force applied to the sliding panel while the automated window mechanism is in the locked state;

a memory storing computer-readable instructions; and a processor in communication with the memory and configured to execute the computer-readable instructions to at least:

in response to the external force, cause the automated window mechanism to apply a counter force to the sliding panel to oppose the external force.

18. The system of claim 17, wherein the monitor comprises at least one of an encoder or a position sensor.

19. The system of claim 17, wherein the monitor is configured to monitor at least one of the sliding panel or the electric motor.

20. The system of claim 17, wherein the monitor comprises the electric motor and the external force causes an electromagnetic force in the electric motor that the monitor is configured to detect.

21. The system of claim 17, wherein the monitor is configured to detect a direction of the external force, and the counter force is applied in an opposite direction.

22. The system of claim 17, wherein the processor is further configured to, in response to the external force, cause the automated window mechanism to move the sliding panel to a closed position to close the window from an initial position.

23. The system of claim 17, wherein the processor is further configured to, in response to the external force, activate an alarm to notify of an unauthorized movement of the window.

* * * * *